(12) United States Patent
Li et al.

(10) Patent No.: US 12,229,679 B1
(45) Date of Patent: Feb. 18, 2025

(54) UPSAMPLING OF COMPRESSED FINANCIAL TIME-SERIES DATA USING A JOINTLY TRAINED VECTOR QUANTIZED VARIATIONAL AUTOENCODER NEURAL NETWORK

(71) Applicant: AtomBeam Technologies Inc., Moraga, CA (US)

(72) Inventors: Zhu Li, Overland Park, KS (US); Brian Galvin, Silverdale, WA (US); Paras Maharjan, Kansas City, MO (US)

(73) Assignee: ATOMBEAM TECHNOLOGIES INC, Moraga, CA (US)

( * ) Notice: Subject to any disclaimer, the term of this patent is extended or adjusted under 35 U.S.C. 154(b) by 0 days.

(21) Appl. No.: 18/822,203

(22) Filed: Sep. 1, 2024

Related U.S. Application Data

(63) Continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(51) Int. Cl.
*G06N 3/08* (2023.01)
*G06N 3/0455* (2023.01)
*G06N 3/0495* (2023.01)

(52) U.S. Cl.
CPC ............ *G06N 3/08* (2013.01); *G06N 3/0455* (2023.01); *G06N 3/0495* (2023.01)

(58) Field of Classification Search
CPC ....... G06N 3/08; G06N 3/0455; G06N 3/0495
See application file for complete search history.

(56) References Cited

U.S. PATENT DOCUMENTS

| | | | |
|---|---|---|---|
| 7,629,922 B2 | 12/2009 | Winstead et al. | |
| 7,876,257 B2 | 1/2011 | Vetro et al. | |
| 10,499,069 B2 | 12/2019 | Wang et al. | |
| 10,701,394 B1 | 6/2020 | Caballero et al. | |
| 10,956,787 B2 * | 3/2021 | Rothberg | G06N 3/045 |
| 11,656,353 B2 | 5/2023 | Li et al. | |

(Continued)

*Primary Examiner* — Jean B Jeanglaude
(74) *Attorney, Agent, or Firm* — Galvin Patent Law LLC; Brian R. Galvin

(57) ABSTRACT

A system and methods for upsampling compressed data using a jointly trained Vector Quantized Variational Autoencoder (VQ-VAE) and neural upsampler. The system compresses input data into a discrete latent space using a VQ-VAE encoder, reconstructs the data using a VQ-VAE decoder, and enhances the reconstructed data using a neural upsampler. The VQ-VAE and neural upsampler are jointly trained using a combined loss function, enabling end-to-end optimization. The system allows for efficient compression and high-quality reconstruction of various data types, including financial time-series, images, audio, video, sensor data, and text. The learned discrete latent space can be explored and manipulated using techniques such as interpolation, extrapolation, and vector arithmetic to generate new or modified data samples. The system finds applications in data storage, transmission, analysis, and generation across multiple domains.

20 Claims, 31 Drawing Sheets

(56) References Cited

U.S. PATENT DOCUMENTS

| | | |
|---|---|---|
| 2014/0022099 A1 | 1/2014 | Fallon et al. |
| 2019/0121884 A1* | 4/2019 | Swaminathan ..... H03M 7/6088 |
| 2022/0086463 A1 | 3/2022 | Coban et al. |
| 2023/0154055 A1 | 5/2023 | Besenbruch et al. |

* cited by examiner

UPSAMPLING OF COMPRESSED FINANCIAL TIME-SERIES DATA USING A JOINTLY TRAINED VECTOR QUANTIZED VARIATIONAL AUTOENCODER NEURAL NETWORK

CROSS-REFERENCE TO RELATED APPLICATIONS

Priority is claimed in the application data sheet to the following patents or patent applications, each of which is expressly incorporated herein by reference in its entirety:
Ser. No. 18/427,716
Ser. No. 18/410,980
Ser. No. 18/537,728

BACKGROUND OF THE INVENTION

Field of the Art

The present invention is in the field of data compression, and more particularly is directed to the problem of recovering data lost from lossy compression and decompression.

Discussion of the State of the Art

For many applications, such as video compression for streaming video, lossy compression techniques such as HEVC (high-efficiency video coding) to optimize the use of available bandwidth and for other purposes. By definition, lossy compression involves the loss of some of the data being transmitted in the process of compression; in the video compression example, this results in lower-resolution video and provides the reason for pixelated video in low-bandwidth situations. Clearly it would be desirable to recover as much of the lost data as possible, but of course this is impossible in a single compressed channel for the method of compression results in a true loss of information.

For example, it is quite common for financial time-series data to be correlated (between two time series, such as the prices of two related financial instruments), and thus able to be restored via upsampling after decompression subsequent to lossy compression. The size of financial time-series data can vary widely depending on factors such as the frequency of observations, the number of variables, and the duration of the time series. In many cases, financial time-series datasets can be large, especially when dealing with high-frequency data or datasets spanning long time periods. Financial markets generate a significant amount of data at high frequencies, such as tick data or intraday data. High-frequency trading can result in a large volume of observations, and managing and storing this data efficiently may be a concern, so compression is often used when transmitting or storing financial time-series data. However, it is also important to ensure that the data is accurate, and therefore lossy compression techniques are not without risk.

What is needed is a system and methods for upsampling of decompressed financial time-series data after lossy compression using a jointly trained vector quantized variational autoencoder neural upsampler.

SUMMARY OF THE INVENTION

The present invention introduces a novel system and method that extends the capabilities of the previous disclosure by incorporating a jointly trained Vector Quantized Variational Autoencoder (VQ-VAE) and neural upsampler architecture. This joint training approach enables the VQ-VAE and neural upsampler to learn and adapt to each other's strengths and weaknesses, resulting in improved compression efficiency and reconstruction quality.

Accordingly, the inventor has conceived and reduced to practice, a system and methods for upsampling compressed data using a jointly trained Vector Quantized Variational Autoencoder and neural upsampler. The system compresses input data into a discrete latent space using a VQ-VAE encoder, reconstructs the data using a VQ-VAE decoder, and enhances the reconstructed data using a neural upsampler. The VQ-VAE and neural upsampler are jointly trained using a combined loss function, enabling end-to-end optimization. The system allows for efficient compression and high-quality reconstruction of various data types, including financial time-series, images, audio, video, sensor data, and text. The learned discrete latent space can be explored and manipulated using techniques such as interpolation, extrapolation, and vector arithmetic to generate new or modified data samples. The system finds applications in data storage, transmission, analysis, and generation across multiple domains.

According to a preferred embodiment, a system for upsampling compressed data using a jointly trained vector quantized variational autoencoder (VQ-VAE) neural upsampler is disclosed, comprising: a computing device comprising at least a memory and a processor; a plurality of programming instructions stored in the memory and operable on the processor, wherein the plurality of programming instructions, when operating on the processor, cause the computing device to: compress input data into a discrete latent representation using a VQ-VAE encoder; store the compressed representation in a discrete latent space; reconstruct the compressed data from the latent representation using a VQ-VAE decoder; enhance the reconstructed data using a neural upsampler to recover information lost during compression; jointly train the VQ-VAE and neural upsampler by iteratively updating their parameters based on a joint loss function that combines the reconstruction loss of the VQ-VAE and the upsampling loss of the neural upsampler; and explore and manipulate the discrete latent space learned by the VQ-VAE to generate new or modified data using techniques comprising interpolation, extrapolation, and vector arithmetic.

According to another preferred embodiment, a method for upsampling compressed data using a jointly trained vector quantized variational autoencoder (VQ-VAE) neural upsampler is disclosed, comprising the steps of: compressing input data into a discrete latent representation using a VQ-VAE encoder; storing the compressed representation in a discrete latent space; reconstructing the compressed data from the latent representation using a VQ-VAE decoder; enhancing the reconstructed data using a neural upsampler to recover information lost during compression; jointly training the VQ-VAE and neural upsampler by iteratively updating their parameters based on a joint loss function that combines the reconstruction loss of the VQ-VAE and the upsampling loss of the neural upsampler; and exploring and manipulating the discrete latent space learned by the VQ-VAE to generate new or modified data using techniques comprising interpolation, extrapolation, and vector arithmetic.

According to another preferred embodiment, non-transitory, computer-readable storage media having computer-executable instructions embodied thereon that, when executed by one or more processors of a computing system employing a jointly trained vector quantized variational autoencoder (VQ-VAE) neural upsampler, cause the computing system to: compress input data into a discrete latent representation using a VQ-VAE encoder; store the compressed representation in a discrete latent space; reconstruct the compressed data from the latent representation using a VQ-VAE decoder; enhance the reconstructed data using a neural upsampler to recover information lost during compression; jointly train the VQ-VAE and neural upsampler by iteratively updating their parameters based on a joint loss function that combines the reconstruction loss of the VQ-VAE and the upsampling loss of the neural upsampler; and explore and manipulate the discrete latent space learned by the VQ-VAE to generate new or modified data using techniques comprising interpolation, extrapolation, and vector arithmetic.

According to an aspect of an embodiment, the input data comprises financial time-series data, the financial time-series data comprising stock prices, economic indicators, and other relevant data.

According to an aspect of an embodiment, the input data comprises one or more of image data, audio data, video data, sensor data, or text data.

According to an aspect of an embodiment, the joint training allows gradients to flow from the neural upsampler back to the VQ-VAE, enabling end-to-end training of the entire system.

According to an aspect of an embodiment, the joint loss function takes into account both compression efficiency and reconstruction quality.

According to an aspect of an embodiment, the VQ-VAE encoder comprises one or more convolutional layers, one or more pooling layers, and one or more fully connected layers.

According to an aspect of an embodiment, the VQ-VAE decoder comprises one or more transposed convolutional layers, one or more upsampling layers, and one or more fully connected layers.

According to an aspect of an embodiment, the neural upsampler comprises one or more convolutional layers, one or more residual blocks, and one or more attention mechanisms.

According to an aspect of an embodiment, the discrete latent space is learned using a vector quantization technique that maps the continuous latent representations to a finite set of discrete codes.

According to an aspect of an embodiment, the system further comprises a data preprocessing module for normalizing, scaling, and transforming the input data before compression.

BRIEF DESCRIPTION OF THE DRAWING FIGURES

DETAILED DESCRIPTION OF THE INVENTION

Figure 1:
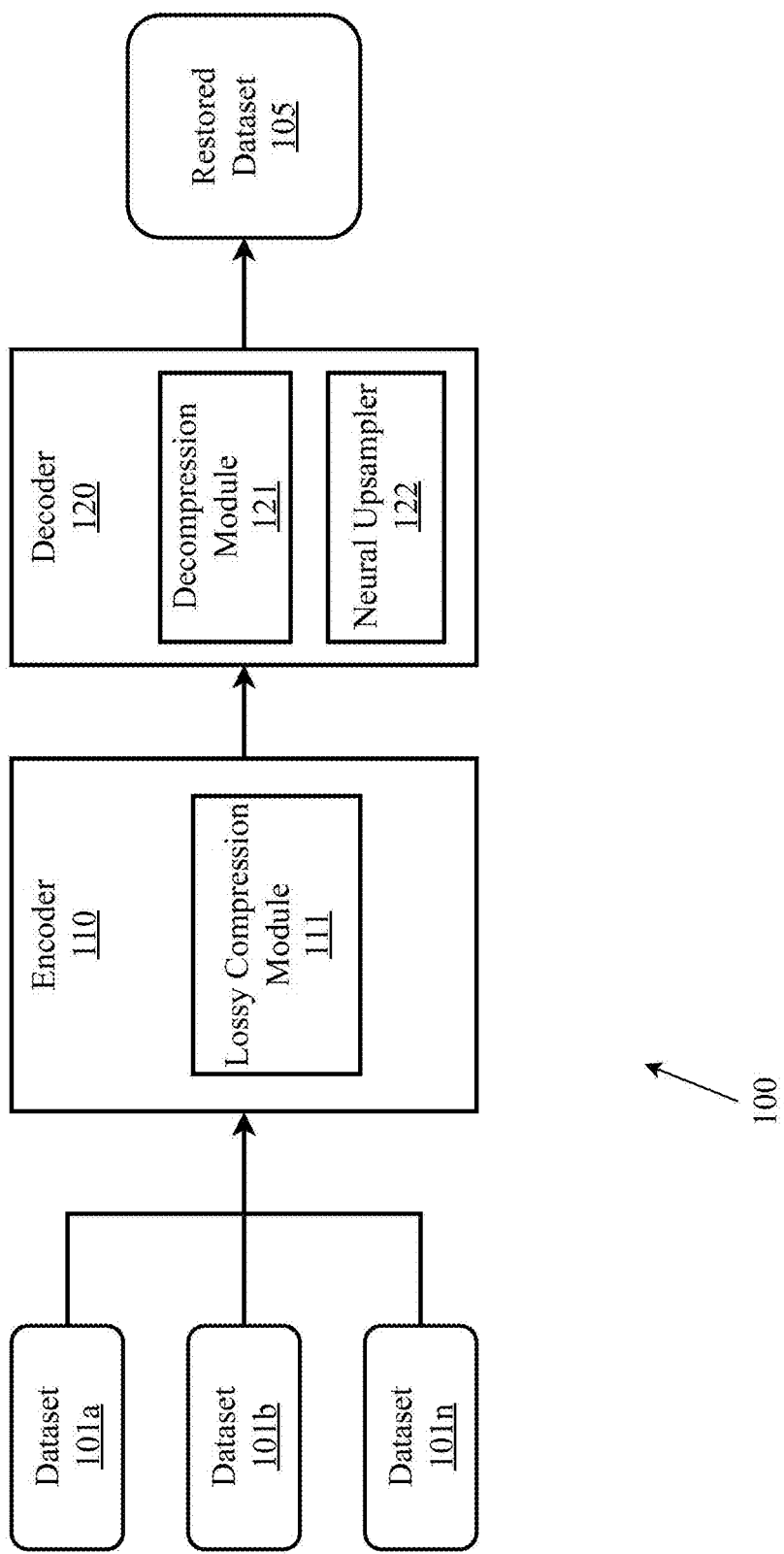
FIG. 1 is a block diagram illustrating an exemplary system architecture for upsampling of decompressed data after lossy compression using a neural network, according to an embodiment.

The inventor has conceived, and reduced to practice, a system and methods for upsampling compressed data using a jointly trained Vector Quantized Variational Autoencoder and neural upsampler. The system compresses input data into a discrete latent space using a VQ-VAE encoder, reconstructs the data using a VQ-VAE decoder, and enhances the reconstructed data using a neural upsampler. The VQ-VAE and neural upsampler are jointly trained using a combined loss function, enabling end-to-end optimization. The system allows for efficient compression and high-quality reconstruction of various data types, including financial time-series, images, audio, video, sensor data, and text. The learned discrete latent space can be explored and manipulated using techniques such as interpolation, extrapolation, and vector arithmetic to generate new or modified data samples. The system finds applications in data storage, transmission, analysis, and generation across multiple domains.

According to some embodiments, the system comprises a VQ-VAE encoder, a discrete latent space, a VQ-VAE decoder, and a neural upsampler. The VQ-VAE encoder compresses the input financial time-series data into a discrete latent representation, while the VQ-VAE decoder reconstructs the compressed data from the latent representation. The neural upsampler is responsible for enhancing the reconstructed data to recover information lost during compression.

A key aspect of the present system and methods is the joint training of the VQ-VAE and neural upsampler components. This is achieved through the following modifications to the architecture and training process. The architecture is modified to allow gradients to flow from the neural upsampler back to the VQ-VAE. This can be accomplished by using techniques such as straight-through estimators or differentiable quantization methods, enabling end-to-end training of the entire system. A joint loss function is defined, combining the reconstruction loss of the VQ-VAE and the upsampling loss of the neural upsampler. This loss function takes into account both the compression efficiency and the reconstruction quality, allowing for a balanced optimization of the two components. The training process involves iteratively feeding the input data through the VQ-VAE and neural upsampler, computing the joint loss, and updating the parameters of both components using backpropagation. This iterative training enables the VQ-VAE and neural upsampler to learn and adapt to each other's capabilities. The discrete latent space learned by the VQ-VAE can be explored and manipulated to generate new or modified financial time-series data. Techniques such as interpolation, extrapolation, and vector arithmetic can be applied to the latent vectors to create novel patterns or simulate different scenarios.

By jointly training the VQ-VAE and neural upsampler, the system achieves improved compression efficiency and reconstruction quality compared to training the components separately. The VQ-VAE learns to compress the data in a way that is more amenable to upsampling, while the neural upsampler learns to effectively reconstruct the data from the compressed representations. The system can be applied to various financial time-series datasets, including stock prices, economic indicators, and other relevant data. It enables efficient storage and transmission of financial data while preserving the important patterns and correlations necessary for analysis and decision-making.

SAR images provide an excellent exemplary use case for a system and methods for upsampling of decompressed data after lossy compression. Synthetic Aperture Radar technology is used to capture detailed images of the Earth's surface by emitting microwave signals and measuring their reflections. Unlike traditional grayscale images that use a single intensity value per pixel, SAR images are more complex. Each pixel in a SAR image contains not just one value but a complex number (I+Qi). A complex number consists of two components: magnitude (or amplitude) and phase. In the context of SAR, the complex value at each pixel represents the strength of the radar signal's reflection (magnitude) and the phase shift (phase) of the signal after interacting with the terrain. This information is crucial for understanding the properties of the surface and the objects present. In a complex-value SAR image, the magnitude of the complex number indicates the intensity of the radar reflection, essentially representing how strong the radar signal bounced back from the surface. Higher magnitudes usually correspond to stronger reflections, which may indicate dense or reflective materials on the ground.

The complex nature of SAR images stems from the interference and coherence properties of radar waves. When radar waves bounce off various features on the Earth's surface, they can interfere with each other. This interference pattern depends on the radar's wavelength, the angle of incidence, and the distances the waves travel. As a result, the radar waves can combine constructively (amplifying the signal) or destructively (canceling out the signal). This interference phenomenon contributes to the complex nature of SAR images. The phase of the complex value encodes information about the distance the radar signal traveled and any changes it underwent during the round-trip journey. For instance, if the radar signal encounters a surface that's slightly elevated or depressed, the phase of the returning signal will be shifted accordingly. Phase information is crucial for generating accurate topographic maps and understanding the geometry of the terrain.

Coherence refers to the consistency of the phase relationship between different pixels in a SAR image. Regions with high coherence have similar phase patterns and are likely to represent stable surfaces or structures, while regions with low coherence might indicate changes or disturbances in the terrain.

Complex-value SAR image compression is important for several reasons such as data volume reduction, bandwidth and transmission efficiency, real-time applications, and archiving and retrieval. SAR images can be quite large due to their high resolution and complex nature. Compression helps reduce the storage and transmission requirements, making it more feasible to handle and process the data. When SAR images need to be transmitted over limited bandwidth channels, compression can help optimize data transmission and minimize communication costs. Some SAR applications, such as disaster response and surveillance, require real-time processing. Compressed data can be processed faster, enabling quicker decision-making. Additionally, compressed SAR images take up less storage space, making long-term archiving and retrieval more manageable.

According to various embodiments, a system is proposed which provides a novel pipeline for compressing and subsequently recovering complex-valued SAR image data (or any other dataset comprising substantially correlated multi-channel data) using a prediction recovery framework that utilizes a conventional image compression algorithm to encode the original image to a bitstream. In an embodiment, a lossless compaction method may be applied to the encoded bitstream, further reducing the size of the SAR image data for both storage and transmission. Subsequently, the system decodes a prediction of the I/Q channels and then recovers the phase and amplitude via a deep-learning based network to effectively remove compression artifacts and recover information of the SAR image as part of the loss function in the training. The deep-learning based network may be referred to herein as an artificial intelligence (AI) deblocking network.

Deblocking refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames.

According to various embodiments, the disclosed system and methods may utilize a SAR recovery network configured to perform data deblocking during the data decoding process. Amplitude and phase images exhibit a non-linear relationship, while I and Q images demonstrate a linear relationship. The SAR recovery network is designed to leverage this linear relationship by utilizing the I/Q images to enhance the decoded SAR image. In an embodiment, the SAR recovery network is a deep learned neural network. According to an aspect of an embodiment, the SAR recovery network utilizes residual learning techniques. According to an aspect of an embodiment, the SAR recovery network comprises a channel-wise transformer with attention. According to an aspect of an embodiment, the SAR recovery network comprises Multi-Scale Attention Blocks (MSAB).

A channel-wise transformer with attention is a neural network architecture that combines elements of both the transformer architecture and channel-wise attention mechanisms. It's designed to process multi-channel data, such as SAR images (or financial time series data), where each channel corresponds to a specific feature map or modality. The transformer architecture is a powerful neural network architecture initially designed for natural language processing (NLP) tasks. It consists of self-attention mechanisms that allow each element in a sequence to capture relationships with other elements, regardless of their position. The transformer has two main components: the self-attention mechanism (multi-head self-attention) and feedforward neural networks (position-wise feedforward layers). Channel-wise attention, also known as "Squeeze-and-Excitation" (SE) attention, is a mechanism commonly used in convolutional neural networks (CNNs) to model the interdependencies between channels (feature maps) within a single layer. It assigns different weights to different channels to emphasize important channels and suppress less informative ones. At each layer of the network, a channel-wise attention mechanism is applied to the input data. This mechanism captures the relationships between different channels within the same layer and assigns importance scores to each channel based on its contribution to the overall representation. After the channel-wise attention, a transformer-style self-attention mechanism is applied to the output of the channel-wise attention. This allows each channel to capture dependencies with other channels in a more global context, similar to how the transformer captures relationships between elements in a sequence. Following the transformer self-attention, feedforward neural network layers (position-wise feedforward layers) can be applied to further process the transformed data.

The system and methods described herein in various embodiments may be directed to the processing of audio data such as, for example, speech channels associated with one or more individuals.

The system and methods described herein in various embodiments may be directed to the processing of financial time series data. Financial times series data may refer to a sequence of observations on variables related to financial market such as stock prices, interest rates, exchange rates, and other economic indicators. Some exemplary financial time series datasets can include, but are not limited to, stock prices (e.g., financial data providers offer historical stock price data. This includes information such as opening price, closing price, high and low prices, and trading volume), market indices (e.g., data on major market indices like the S&P 500, Dow Jones Industrial Average, and NASDAQ Composite can be valuable for analyzing overall market trends, foreign exchange rates), foreign exchange (Forex) rates (e.g., datasets containing currency exchange rates, such as USD to EUR or JPY to GBP), commodities prices (e.g., time series data on commodities like gold, silver, oil, and agricultural products can be obtained from various sources), interest rates (e.g., historical data on interest rates, such as the Federal Reserve's interest rate decisions or LIBOR rates, can be crucial for understanding monetary policy and economic trends), cryptocurrency prices (given the rise of cryptocurrencies, datasets on Bitcoin, Ethereum, and other digital assets are widely available), economic indicators (e.g., data on economic indicators like GDP growth rates, unemployment rates, and inflation rates are essential for understanding the broader economic context), options and futures data (e.g., data on options and futures contracts, including details on contract prices and trading volumes, are necessary for derivatives analysis), bond yields, (e.g., time series data on government bond yields, corporate bond yields, and yield spreads can be important for fixed-income analysis), sentiment analysis (e.g., textual data from financial news, social media, and other sources can be used for sentiment analysis to gauge market sentiment), credit ratings (e.g., historical credit ratings of companies and countries provide insights into credit risk and financial stability), mergers and acquisitions data (e.g., information on mergers, acquisitions, and corporate actions can be important for understanding market dynamics and investor sentiment), volatility index (VIX) (e.g., data on the VIX, also known as the "fear index," measures market volatility and is widely used by traders and investors), and real estate prices (e.g., time series data on real estate prices in specific regions can be valuable for understanding trends in the real estate market), and/or the like. These datasets are often used in financial research, algorithmic trading, risk management, and other areas of finance for making informed decisions. Many financial data providers offer APIs or downloadable datasets for research purposes and which can be leveraged to provide training datasets to train a neural upsampler to restore financial time series data which has been compressed by a lossy compression technique.

Financial time series datasets can be correlated in various ways, reflecting relationships and interactions in the broader economic and financial environment. For example, stock prices are often correlated with economic indicators such as GDP growth, unemployment rates, and inflation. Positive economic data may lead to higher stock prices, while negative economic indicators can result in stock market declines. As another example, interest rates and bond yields are closely related. When interest rates rise, bond prices tend to fall, leading to an inverse correlation between interest rates and bond yields. There is often a positive correlation between commodity prices (such as oil and metals) and inflation. Rising commodity prices can contribute to higher production costs and, subsequently, inflationary pressures An example most are familiar with is that real estate prices are often inversely correlated with interest rates. When interest rates rise, borrowing costs increase, leading to potentially lower demand for real estate and affecting property prices. In yet another example, options prices and stock prices are closely related. Changes in stock prices impact the value of options contracts, and option pricing models often consider stock price movements.

Cryptocurrency prices can be influenced by market sentiment, which can be inferred from news sentiment analysis or social media activity. Positive sentiment may lead to higher cryptocurrency prices, and vice versa.

Exchange rates can be correlated with trade balances. Countries with trade surpluses may experience currency appreciation, while those with trade deficits may see currency depreciation.

Understanding these correlations is crucial for investors, analysts, and policymakers to make informed decisions and manage risks effectively in the dynamic financial markets. Keep in mind that correlations can change over time due to shifts in market conditions, economic factors, and other variables.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data set" refers to a grouping of data for a particular purpose. One example of a data set might be a word processing file containing text and formatting information. Another example of a data set might comprise data gathered/generated as the result of one or more radars in operation.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

The term "deblocking" as used herein refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames. A primary goal of deblocking is to enhance the perceptual quality of the compressed content, making it more visually appealing to viewers. It's important to note that deblocking is just one of many post-processing steps applied during the decoding and playback of compressed images and videos to improve their quality.

Conceptual Architecture

Figure 21:
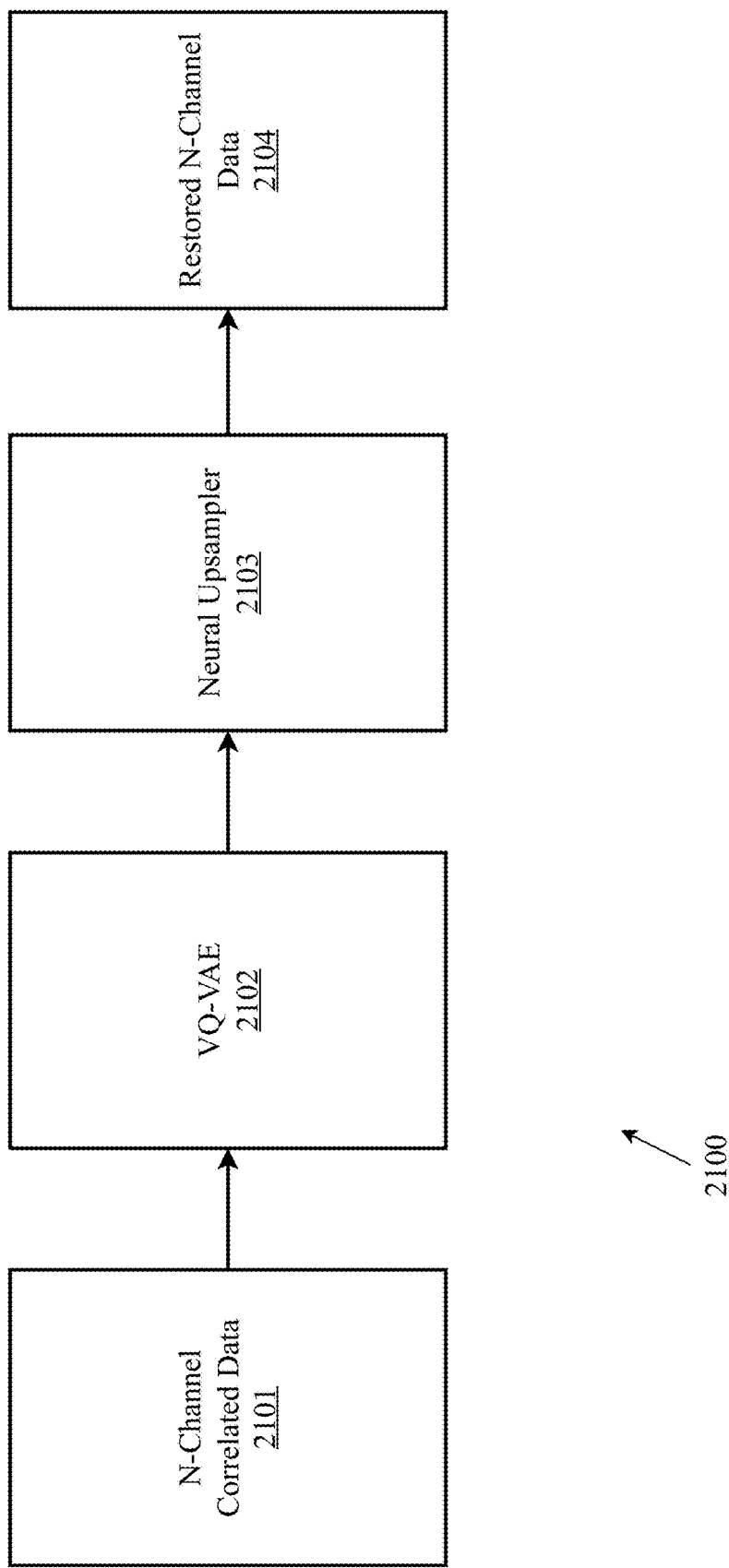
FIG. 21 is a block diagram illustrating an exemplary system architecture for neural upsampling of N-channel correlated datasets utilizing a trained vector quantized variational autoencoder (VQ-VAE), according to an embodiment.

FIG. 21 is a block diagram illustrating an exemplary system architecture 2100 for neural upsampling of N-channel correlated datasets utilizing a trained vector quantized variational autoencoder (VQ-VAE), according to an embodiment. The term "N-channel" refers to data that is composed of multiple distinct channels or modalities, where each channel represents a different aspect of type of information. These channels can exist in various forms, such as, for example, sensor readings, image color channels, or data streams, and they are often used together to provide a more comprehensive understanding of the underlying phenomenon. Examples of N-channel data 2101 can include, but are not limited to, RGB images (e.g., in digital images, the red, green, and blue channels represent different color information; combining these channels allows for the representation of a wide range of colors), medical imaging (e.g., may include Magnetic Resonance Imaging scans with multiple channels representing different tissue properties, or Computed Tomography scans with channels for various types of X-ray attenuation), audio data (e.g., stereo or multi-channel audio recordings where each channel corresponds to a different microphone or audio source), radar and lidar (e.g., in autonomous vehicles, radar and lidar sensors provide multi-channel data, with each channel capturing information about objects' positions, distances, and reflectivity) SAR image data, text data (e.g., in natural language processing, N-channel data might involve multiple sources of text, such as social media posts and news articles, each treated as a separate channel to capture different textual contexts), sensor networks (e.g., environmental monitoring systems often employ sensor networks with multiple sensors measuring various parameters like temperature, humidity, air quality, wherein each sensor represents a channel), climate data, financial data, and social network data.

The VQ-VAE based neural upsampler system 2100 will be described herein with respect to a use case directed to neural upsampling of N-channel data 2101 comprising financial data, but the extent of the data which may be processed by system 2100 should not be construed or limited to only financial data.

As shown, system 2100 comprises a plurality of input data 2101 which is fed into a VQ-VAE 2102 which can perform lossy compression on the input data. VQ-VAEs have shown promising results in achieving high compression ratios while preserving perceptual quality in various domains, such as images, audio, and sequential data. The output of VQ-VAE 2102 can be received, retrieved, or otherwise obtained by a neural upsampler 2103 which is trained to recover most of the lost data which was lost during the lossy compression process as performed by VQ-VAE 2102. In one embodiment, neural upsampler 2103 is configured to accept the quantized latent representations from VQ-VAE 2102 as input, rather than the directly compressed/reconstructed data. The output of neural upsampler 2103 is the restored N-channel data 2104. VQ-VAEs learn discrete latent representations of the input data, which can capture meaningful patterns and structures. These learned representations may be leveraged by neural upsampler 2103 to better reconstruct the compressed data by exploiting the inherent correlations and dependencies.

Figure 22:
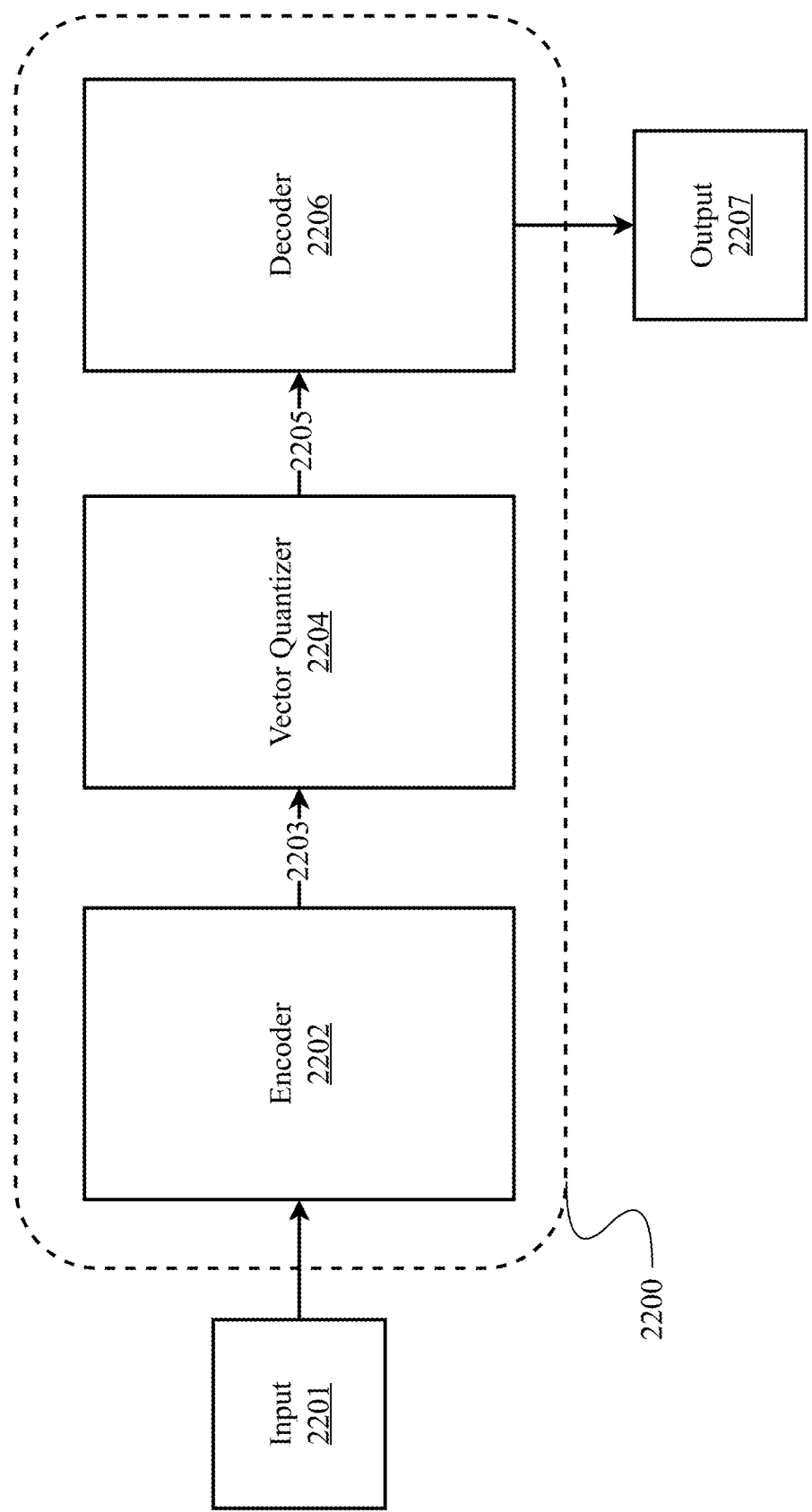
FIG. 22 is a block diagram illustrating an exemplary architecture of a vector quantized variational autoencoder, according to an embodiment.

FIG. 22 is a block diagram illustrating an exemplary architecture of a vector quantized variational autoencoder, according to an embodiment. According to the embodiment, the VQ-VAE 2200 architecture comprises three main components: an encoder 2202, a vector quantizer 2204, and a decoder 2206. VQ-VAEs have shown promising results in various domains, including image generation, speech synthesis, and unsupervised representation learning. They have the advantage of learning a discrete latent representation, which can be useful for tasks such as compression, clustering, and interpretability.

According to an embodiment, encoder 2202 is a neural network that maps the input data 2201 (e.g., N-channel correlated data such as, for example, financial data) to a continuous latent representation. Encoder may be implemented using various neural network architectures, such as convolutional neural networks (CNNs) for image data or recurrent neural networks (RNNs) for sequential data. The output 2203 of encoder 2202 is a continuous vector representation of the input.

According to an embodiment, vector quantizer 2204 is responsible for mapping the continuous latent representation from the encoder to a discrete latent space. It may utilize a codebook, which is a set of learnable vector embeddings. The continuous latent representation is compared with the codebook vectors using, for example, a nearest-neighbor lookup. Vector quantizer 2204 outputs 2205 the index of the nearest codebook vector and the corresponding vector itself.

According to an embodiment, decoder 2206 takes the quantized vector from the vector quantizer and reconstructs the original input data. Decoder 2206 may be implemented using various neural network architectures, depending on the type of data being reconstructed. The decoder is designed to generate an output 2207 that closely resembles the original input. Output 2207 may be stored in a suitable database or data storage system. Output 2207 may transmitted to another system, service, application, device, and/or the like for further processing. Output 2207 may be sent to or retrieved by a neural upsampler to enhance/reconstruct the output data to nearly its original input form.

The reconstructed output data 2207 can be considered lossy compressed output. The VQ-VAE architecture inherently performs a form of compression. The encoder maps the input data to a lower-dimensional latent representation, effectively reducing the size of the original data. The vector quantizer further compresses the latent representation by mapping it to a discrete codebook vector. This compression step allows for a more compact representation of the input data. The compression performed by the VQ-VAE is lossy, meaning that some information is lost during the encoding and quantization process. The continuous latent representation generated by the encoder is approximated by the nearest codebook vector in the vector quantizer. This quantization step introduces a certain level of information loss because the selected codebook vector may not perfectly match the original latent representation. The decoder takes the quantized vector from the vector quantizer and attempts to reconstruct the original input data. However, due to the lossy compression in the encoding and quantization steps, the reconstructed output is generally not be an exact match to the original input. There may be some loss of detail or slight variations in the reconstructed data compared to the original.

The extent of the information loss and the quality of the reconstructed output depend on various factors, such as the size of the codebook, the dimensionality of the latent space, and the complexity of the input data. The choice of the reconstruction loss function also plays a role in determining the quality of the reconstructed output. It's worth noting that while the compression in VQ-VAEs is lossy, the goal is to strike a balance between compression efficiency and the quality of the reconstructed output. The VQ-VAE architecture aims to learn a compressed representation that captures the most salient features and patterns of the input data while minimizing the perceptual loss in the reconstructed output.

According to an embodiment, VQ-VAE 2200 is trained using a combination of reconstruction loss and regularization terms. The main loss functions and optimization techniques that may be used are reconstruction loss, codebook loss, and straight-through estimator. It's important to note that the specific details of the VQ-VAE architecture, loss functions, and optimization techniques may vary depending on the implementation and the problem at hand. The reconstruction loss measures the dissimilarity between the original input and the reconstructed output from the decoder. Common choices for the reconstruction loss include mean squared error (MSE) for continuous data and cross-entropy loss for discrete data. The reconstruction loss encourages the decoder to generate outputs that closely match the original inputs.

The codebook loss is specific to VQ-VAEs and is used to update the codebook vectors. It consists of two terms: the codebook loss and the commitment loss. The codebook loss measures the distance between the continuous latent representation and the nearest codebook vector. It is typically computed using the L2 distance or the squared L2 distance. The commitment loss encourages the encoder to produce latent representations that are close to the codebook vectors. It is computed as the L2 distance between the encoder's output and the selected codebook vector. The codebook loss and commitment loss are balanced by a hyperparameter called the commitment cost.

In some implementations, during the backward pass of the gradient descent optimization, the gradients cannot be directly propagated through the discrete vector quantizer. To address this, VQ-VAEs employ the straight-through estimator, which treats the quantization operation as an identity function during the backward pass. This allows gradients to flow from the decoder to the encoder, enabling end-to-end training of the VQ-VAE.

According to some embodiments, the quantized latent representations produced by VQ-VAE 2200 can enable latent space exploration which opens up capabilities for data augmentation, scenario simulation, forecasting, and synthetic data generation, to name a few. By leveraging the discrete latent space learned by the VQ-VAE, the systems and methods described herein can manipulate and explore different configurations to generate new or modified financial (or other) time series data.

After training (either jointly or separately) the VQ-VAE and the neural upsampler, analysis of the learned discrete latent space is performed. This may comprise visualizing the latent space using techniques such as t-SNE or uniform manifold approximation and projection (UMAP) for dimension reduction to understand the structure and clustering of the latent representations. Such analysis can identify meaningful patterns, clusters, or trajectories in the latent space that correspond to different characteristics or behaviors of the financial time series data, and better enable latent space manipulation tasks.

To perform latent space manipulation, various methods may be developed and deployed to manipulate and navigate the latent space to generate new or modified financial time series data. According to various embodiments, the system may implement techniques such as interpolation, extrapolation, vector arithmetic, attribute manipulation, or latent space sampling in the latent space to create intermediate or extrapolated representations. For example, interpolating between two latent vectors can generate smooth transitions between different financial time series patterns, while extrapolating beyond existing latent vectors can generate novel or unseen patterns. Interpolation involves generating intermediate latent representations between two or more existing latent vectors, and may be realized via linear or spherical linear interpolation (Slerp), for example. Given two latent vectors $z1$ and $z2$, linear interpolation generates intermediate vectors by taking weighted averages: $z\_inter = \alpha*z1 + (1-\alpha)*z2$, where $\alpha$ is a interpolation factor between 0 and 1. Slerp is a technique used to interpolate between points on a sphere. It ensures that the interpolated vectors maintain constant angular velocity and follow the shortest path between the two points. Interpolation allows for smooth transitions and morphing between different data samples in the latent space.

Extrapolation involves extending the latent space beyond the range of existing latent vectors to generate novel or unseen data samples. Given two latent vectors $z1$ and $z2$, linear extrapolation generates new vectors by extending the line connecting them: $z\_extra = z1 + \alpha*(z2-z1)$, where $\alpha$ is an extrapolation factor. Extrapolation allows for the generation of new data samples that go beyond the patterns present in the training data. For example, extrapolating the latent representations of a sequence of financial time series patterns can generate future patterns that continue the trend or exhibit novel behaviors.

Vector arithmetic involves performing mathematical operations (e.g., addition or subtraction) on latent vectors to manipulate their properties or combine different attributes. Adding two latent vectors can combine their characteristics or properties. For example, $z\_new = z1 + z2$ can generate a new latent vector that exhibits a combination of the patterns or attributes represented by $z1$ and $z2$. Subtracting one latent vector from another can isolate specific attributes or remove unwanted characteristics. For example, $z\_new = z1 - z2$ can generate a new latent vector that removes the patterns or attributes represented by $z2$ from $z1$. For example, performing vector arithmetic on latent representations of financial time series data can allow for the combination or separation of specific market conditions, economic indicators, or event-related patterns.

Attribute manipulation involves modifying specific attributes or dimensions of the latent vectors to control certain aspects of the generated data samples. Identifying attribute dimensions may comprise analyzing the latent space to identify dimensions or directions that correspond to specific attributes or properties of the data. Modifying the values of the identified attribute dimensions can control the presence or intensity of specific attributes in the generated data samples. For instance, identifying a latent dimension that corresponds to market volatility and modifying its value can allow for the generation of financial time series data with controlled levels of volatility.

Latent space sampling involves randomly sampling latent vectors from the learned latent space to generate diverse and novel data samples. Random sampling may be implemented comprising sampling latent vectors from a chosen distribution (e.g., Gaussian) to generate random variations or combinations of patterns. Conditional sampling may comprise sampling latent vectors based on specific conditions or constraints to generate data samples that satisfy certain requirements or belong to specific categories. As an example, sampling latent vectors from regions of the latent space associated with specific market regimes or economic conditions can generate financial time series data that reflects those specific scenarios.

These are just a few examples of the methods used for latent space manipulation. The specific techniques employed may vary depending on the characteristics of the latent space, the desired manipulations, and the goals of the generated data samples. It's important to note that the effectiveness and interpretability of latent space manipulation depend on the quality and structure of the learned latent space. Techniques like disentanglement learning, which aims to learn latent representations where individual dimensions correspond to specific attributes or factors of variation, can enhance the interpretability and controllability of latent space manipulation. Additionally, domain knowledge and expert guidance may be implemented in interpreting the results of latent space manipulation and ensuring that the generated data samples are meaningful and aligned with real-world financial dynamics.

Performing conditional generation may comprise incorporating conditional information into the latent space exploration process to guide the generation of specific types of financial time series data. The system may condition the generation process on external factors such as market conditions, economic indicators, or specific events. For example, a modified VQ-VAE architecture can be implemented to include conditional inputs that can influence the latent representations and the subsequent generation process. This allows for targeted generation of financial time series data based on specific conditions or scenarios.

According to an embodiment, the system can leverage the learned correlations and patterns in the latent space to enable forecasting and prediction capabilities. This may comprise training a separate predictive model, such as a recurrent neural network or a transformer-based model, to learn the temporal dynamics in the latent space, and then using the predictive model to forecast future latent representations based on the historical latent vectors. The system may decode the forecasted latent representations using the neural upsampler to generate predicted financial time series data for future time steps.

According to an embodiment, the system can utilize the latent space exploration capabilities to simulate different scenarios and assess their impact on the financial time series data. This may comprise manipulating the latent vectors to reflect specific market conditions, policy changes, or economic events, generating multiple simulated trajectories in the latent space and decoding them using the neural upsampler to obtain corresponding financial time series scenarios, and analyzing the simulated scenarios to gain insights into potential outcomes and assess the robustness of financial strategies or models.

According to an embodiment, the system may employ the latent space exploration techniques to generate synthetic financial time series data for training and testing purposes. This may comprise sampling latent vectors from the learned latent space and decoding them using the neural upsampler to generate realistic and diverse synthetic data, augmenting the existing training data with the generated synthetic data to improve the robustness and generalization capabilities of financial models, and evaluating the quality and statistical properties of the generated synthetic data to ensure its validity and usefulness.

To enable these various latent space exploration features, some embodiments of the system may develop and deploy user-friendly interfaces and visualization tools to facilitate latent space exploration and manipulation and allow users to interactively navigate the latent space, select specific regions or patterns, and generate corresponding financial time series data. Additionally, such a user interface can provide intuitive controls for adjusting conditional inputs, interpolation parameters, or scenario settings. For example, system users can visualize the generated financial time series data alongside the original data to highlight the effects of latent space manipulation. By enabling latent space exploration, the system can provide powerful capabilities for data augmentation, scenario simulation, forecasting, and synthetic data generation. It allows users to leverage the learned correlations and patterns in the financial time series data to generate new insights, assess potential outcomes, and improve the robustness of financial models.

Figure 23:
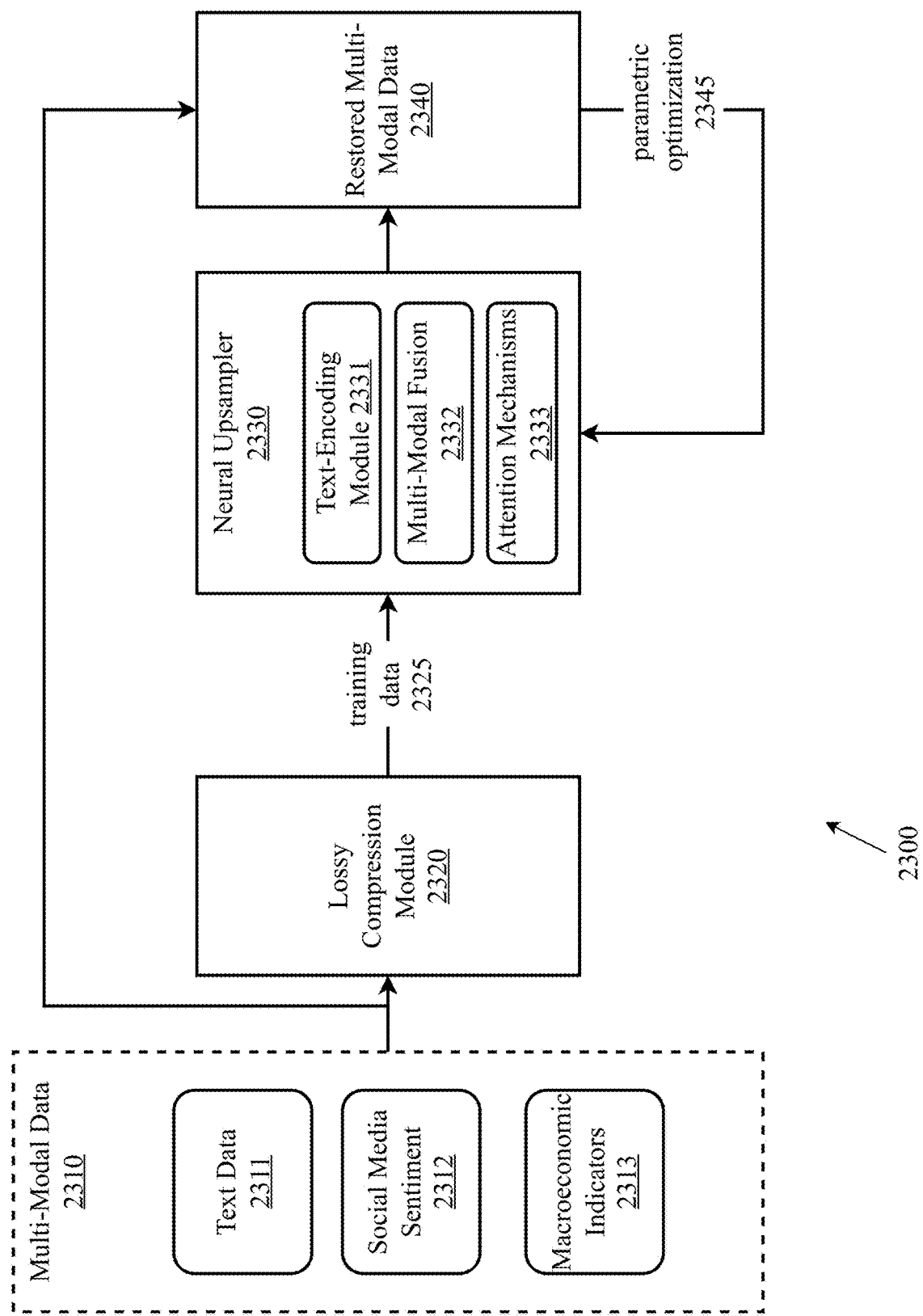
FIG. 23 is a block diagram illustrating a system for training a neural network to perform upsampling of decompressed non-time-series multi-modality data after lossy compression, according to an embodiment.

FIG. 23 is a block diagram illustrating a system 2300 for training a neural network to perform upsampling of decompressed non-time-series multi-modality data after lossy compression, according to an embodiment. The neural network may be referred to herein as a neural upsampler. According to the embodiment, a neural upsampler 2330 may be trained by taking training data 2325 which may comprise datasets of various modalities 2310 and performing whatever processing that is done to compress the data via a lossy compression module 2320. This processing is dependent upon the type of data and may be different in various embodiments of the disclosed system and methods.

Neural upsampler 2330 may process the training data 2325 to generate model training output in the form of a restored multi-modal dataset 2340. The neural network output may be compared against the original dataset to check the model's precision and performance. If the model output does not satisfy a given criteria or some performance threshold, then parametric optimization 2345 may occur wherein the training parameters and/or network hyperparameters may be updated and applied to the next round of neural network training.

Using financial data as an exemplary use case, multi-modal data 2310 can include text data 2311 integration, social media sentiment 2312 analysis, and macroeconomic indicators 2313. System 2300 may modify the input data pipeline to include text data from financial news articles, press releases, earnings reports, and other relevant sources, and preprocess the text data using techniques like tokenization, embedding (e.g., word2vec, GloVe), and feature extraction (e.g., TF-IDF, named entity recognition). According to an embodiment, system 2300 may incorporate a text encoding module 2331 in the neural network architecture 2330 to learn meaningful representations of the text data. This could be based on recurrent neural networks (RNNs), long short-term memory (LSTM) networks, or transformer models like BERT or GPT-2. The system may be further configured to combine the encoded text representations with time-series data representations using fusion techniques (e.g., concatenation, attention mechanisms) to capture cross-modal correlations.

To perform social media sentiment analysis, the system can collect financial sentiment data from social media platforms like Twitter, StockTwits, or financial forums by connecting to their respective servers, use sentiment analysis techniques (e.g., lexicon-based approaches, machine learning classifiers) to extract sentiment scores or labels from the social media posts, and then incorporate the sentiment information as additional input channels or features in the neural network of upsampler 2330.

System 2300 may integrate macroeconomic indicators 2313 such as GDP growth, inflation rates, unemployment rates, or consumer confidence indices into the system and preprocess and normalize the macroeconomic data to align with the temporal resolution of the financial time-series data. This may comprise including the macroeconomic indicators as additional input channels or features in the neural network. The system can design the network architecture to capture the dependencies and correlations between the macroeconomic factors and the financial time-series data.

As shown, a multi-modal fusion module 2332 can be integrated in the neural network to effectively combine the representations from different data modalities (time-series, text, sentiment, macroeconomic indicators, etc.). This may employ attention mechanisms 2333 to weigh the importance of different modalities and their interactions in the upsampling and reconstruction process. For example, techniques like cross-attention or multi-head attention may be implemented to model the relationships between different data modalities. The training process may be modified to accommodate the additional data modalities and their corresponding loss functions that capture the reconstruction quality of the upsampled data across different modalities. In some embodiments, the training process may comprise multi-task learning or transfer learning approaches to leverage knowledge from related tasks or domains.

According to an embodiment, the systems and methods described herein may be leveraged to develop specialized neural network architectures tailored to specific financial (for example, but can be extended to other industries/ domains) domains to capture the unique characteristics and correlations present in each domain. For example, consider a stock market domain. An approach may develop a hierarchical attention-based neural network (i.e., upsampler) that captures the relationships between individual stocks, sectors, and market indices and incorporates fundamental data (e.g., financial ratios, earnings reports) and technical indicators (e.g., moving averages, volume) as input features. This may make use of graph neural networks (GNNs) to model the complex relationships and dependencies among stocks based on their co-movement patterns or industry connections. Additionally, or alternatively, a stock market specific architecture can employ convolutional neural networks (CNNs) to analyze stock price charts and detect patterns or anomalies.

With respect to a foreign exchange (Forex) domain, a neural network architecture may be designed that considers the interactions between currency pairs and their historical patterns, and which incorporates macroeconomic factors (e.g., interest rates, inflation, GDP) and geopolitical events as input features to capture their impact on exchange rates. For example, such a neural network upsampler architecture may use recurrent neural networks (RNNs) or long short-term memory (LSTM) networks to model the temporal dependencies and long-term trends in forex data, and/or develop a multi-scale architecture that captures both short-term fluctuations and long-term trends in exchange rates.

With respect to a commodities domain, a neural network architecture may be built that incorporates supply and demand dynamics, seasonal patterns, and global economic factors affecting commodity prices and external data sources such as weather data, production levels, and inventory reports as input features. For example, this architecture may comprise convolutional neural networks (CNNs) to analyze price charts and detect patterns or trends specific to different commodities, and/or develop a multi-task learning framework to jointly predict prices of related commodities and capture their interdependencies.

With respect to a cryptocurrency domain, a neural network architecture may be designed that captures the unique characteristics of cryptocurrency markets, such as high volatility, 24/7 trading, and decentralized nature, and incorporates blockchain data (e.g., transaction volumes, hash rates) and sentiment data from social media and online forums as input features. For example, the architecture may use GNNs to model the relationships and influences among different cryptocurrencies and their underlying blockchain networks, and/or develop a multi-scale architecture that captures both short-term price fluctuations and long-term adoption trends.

With respect to cross-domain correlations, the system may develop a unified neural network architecture that captures the correlations and interactions among different financial domains. This may comprise the use of multimodal fusion techniques to combine data from various domains (e.g., stock markets, forex, commodities) and learn joint representations, and may further comprise attention mechanisms to weigh the importance of different domains and their contributions to the overall market dynamics.

Training a cross-domain correlation neural upsampling architecture may also leverage transfer learning techniques to leverage knowledge learned from one domain to improve predictions in another domain. Transfer learning is a powerful technique that allows the system to leverage knowledge gained from pre-training a model on a large corpus of data and apply it to specific datasets or applications. In the context of the neural upsampler for financial data, transfer learning can be employed to improve performance and reduce training time. For example, a jointly trained VQ-VAE and neural upsampler could be fine-tuned or adapted to new financial datasets or domains more efficiently, as they have already learned to work together to compress and reconstruct data with similar characteristics.

Transfer learning can be applied by first pre-training on a large financial corpus. An exemplary process for applying transfer learning may comprise the following steps: collect a large and diverse dataset of financial data, including time-series data, news articles, social media sentiment, and macroeconomic indicators; preprocess and normalize the data to ensure consistency and compatibility across different sources and formats; design a neural network architecture suitable for the pre-training task, such as an autoencoder or a masked language model (e.g., BERT-style architecture); train the neural network on the large financial corpus using unsupervised or self-supervised learning techniques wherein the objective is to capture general patterns, correlations, and representations in the financial data; and save the pre-trained model weights and architecture for future use.

An exemplary process for fine-tuning a transfer learning model for specific datasets or applications may comprise the following steps: identify the specific dataset or application for which to apply the neural upsampler (e.g., stock market prediction, portfolio optimization); load the pre-trained model weights and architecture obtained from the previous step; modify the neural network architecture to suit the specific task or dataset which may involve adding or removing layers, adjusting the input and output dimensions, or incorporating domain-specific features; initialize the model with the pre-trained weights, except for the newly added or modified layers, which can be initialized randomly or using domain-specific initialization techniques; fine-tune the model on the specific dataset or application using supervised learning techniques using the pre-trained weights as a starting point, allowing the model to quickly adapt to the new task with minimal training; and monitor the model's performance and make necessary adjustments to the architecture or hyperparameters to optimize its performance on the specific task. Different fine-tuning strategies may be used, such as freezing certain layers during fine-tuning, using different learning rates for different layers, or employing domain-specific loss functions.

Figure 24:
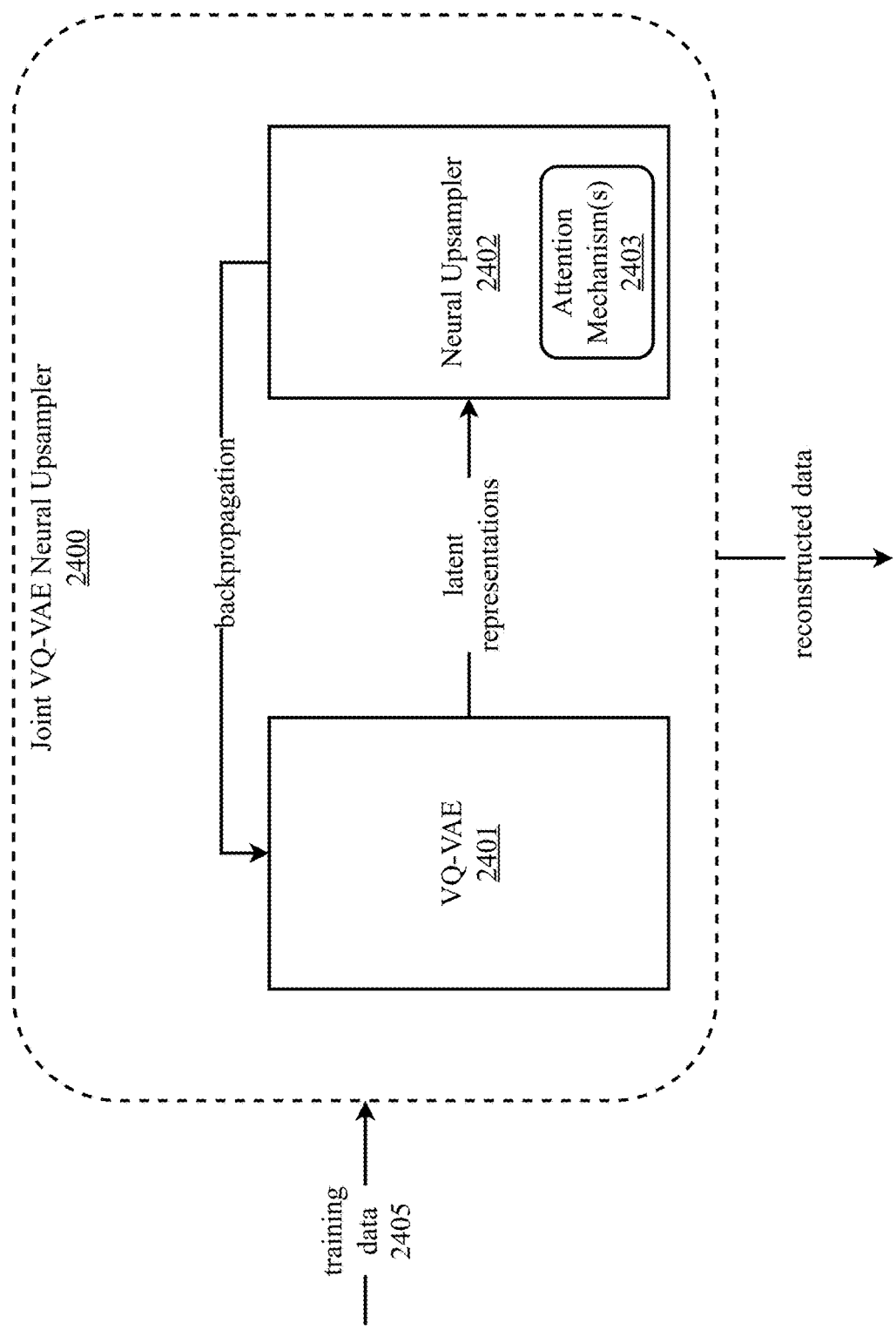
FIG. 24 is a block diagram illustrating an exemplary system architecture for performing joint optimization of a VQ-VAE and a neural upsampler, according to an embodiment.

FIG. 24 is a block diagram illustrating an exemplary system architecture for performing joint optimization of a VQ-VAE and a neural upsampler, according to an embodiment. Performing joint optimization on the VQ-VAE and the neural upsampler enables them to learn and adapt to each other's strengths and weaknesses. By jointly training these components, the systems and methods described herein can achieve better compression and reconstruction performance.

To facilitate joint optimization the VQ-VAE 2401 and neural upsampler 2402 architectures may be integrated or otherwise combined into a single end-to-end trainable model 2400. This modified architecture allows gradients to flow from neural upsampler 2402 back to VQ-VAE 2401 during backpropagation. To further enable the joint architecture the output of the VQ-VAE (i.e., the quantized latent representation) is made compatible with the input of the neural upsampler. The main challenge in allowing gradients to flow from the neural upsampler to the VQ-VAE lies in the quantization step in the VQ-VAE. Quantization is a non-differentiable operation, which prevents gradients from being propagated back through it. According to an embodiment, to overcome this, system 2400 can use the Straight-Through Estimator (STE) technique. STE allows gradients to pass through the quantization step unchanged during the backward pass, while still performing quantization during the forward pass. Mathematically, let $z\_q$ be the quantized latent representation and $z\_e$ be the continuous latent representation before quantization. The forward and backward computations can be defined as follows: Forward: $z\_q = \text{quantize}(z\_e)$; Backward: $\partial z\_e = \partial z\_q$. By using STE, gradients can flow from the neural upsampler back to the VQ-VAE, enabling end-to-end training.

According to an embodiment, an alternative approach is to use a differentiable quantization mechanism. Instead of using a hard quantization step, system 2400 can employ a soft quantization technique that approximates the quantization operation using differentiable functions. One approach is to use the Gumbel-Softmax trick or its variant, the Straight-Through Gumbel-Softmax (ST-Gumbel-Softmax). The Gumbel-Softmax trick allows for differentiable sampling from a categorical distribution, which can be used to approximate the quantization step. During the forward pass, the Gumbel-Softmax trick produces a continuous relaxation of the quantized representation, allowing gradients to flow through it. During the backward pass, the ST-Gumbel-Softmax variant uses the STE technique to pass gradients unchanged, similar to the previous approach.

In the VQ-VAE 2401, the codebook (i.e., the set of quantized vectors) is typically learned using a separate optimization process, such as the exponential moving average (EMA) of the latent representations. According to an embodiment, to allow gradients to flow from the neural upsampler to the codebook, system 2400 can make the codebook learnable parameters of the model. Instead of using a separate optimization process, system 2400 can define the codebook as learnable embeddings and update them using gradients during the joint optimization process. This allows the codebook to adapt based on the gradients from the neural upsampler, enabling it to learn representations that are more amenable to upsampling.

According to some embodiments, to further enhance the interaction between VQ-VAE 2401 and neural upsampler 2402, system 2400 may incorporate an attention mechanism 2403. Attention mechanisms allow the neural upsampler to focus on specific parts of the compressed representations during the reconstruction process. By incorporating attention, the neural upsampler can provide feedback to the VQ-VAE about which aspects of the compressed representations are most important for accurate upsampling. This information can be propagated back to the VQ-VAE through gradients, guiding it to learn more informative and upsampling-friendly compressed representations.

By incorporating one or more of these modifications into the architecture, system 2400 can enable gradients to flow from the neural upsampler back to the VQ-VAE, allowing for end-to-end joint optimization. The STE or differentiable quantization techniques address the non-differentiability of the quantization step, while codebook learning and attention mechanisms enhance the interaction and adaptation between the two components.

To further support joint optimization of VQ-VAE 2401 and neural upsampler 2402 a joint loss function can be defined or designed that combines the reconstruction loss of the VQ-VAE and the upsampling loss of the neural upsampler. The reconstruction loss measures how well the VQ-VAE can reconstruct the original data from the compressed representations. The upsampling loss measures how well the neural upsampler can restore the compressed data to its original quality. Part of defining/designing the joint loss function may comprise assigning appropriate weights to each loss component to balance their contributions during training. To define/design a joint loss function that combines the reconstruction loss and the upsampling loss, system 2400 needs to consider the objectives of both components and find a way to balance their contributions.

VQ-VAE reconstruction loss can be defined, for example, as L_vq_recon. The reconstruction loss of the VQ-VAE measures how well the model can reconstruct the original input data from the quantized latent representations. Commonly used reconstruction loss functions include MSE or mean absolute error (MAE) between the original input (x) and the reconstructed input (x_recon). Which results in L_vq_recon=MSE(x, x_recon) or L_vq_recon=MAE(x, x_recon). This loss encourages the VQ-VAE to learn compact and informative latent representations that can be used to reconstruct the original data accurately.

Neural upsampler loss can be defined, for example, as L_upsample. The upsampling loss of the neural upsampler measures how well the model can restore the compressed data to its original quality. Similar to the VQ-VAE reconstruction loss, the upsampling loss can be computed using MSE or MAE between the original input (x) and the upsampled output (x_upsample). Which results in L_upsample=MSE(x, x_upsample) or L_upsample=MAE (x, x_upsample). This loss guides the neural upsampler to effectively reconstruct the high-quality data from the compressed representations.

Codebook loss can be defined, for example, as L_codebook. In addition to the reconstruction and upsampling losses, system 2400 may include a codebook loss to encourage the VQ-VAE to learn a diverse and representative codebook. The codebook loss measures the discrepancy between the continuous latent representations (z_e) and their nearest codebook vectors (z_q). It consists of two terms: commitment loss and codebook loss. Commitment loss: L_commit=$\|sg[z\_e]-z\_q\|^2$, where sg[.] denotes the stop-gradient operation. This term encourages the encoder to produce latent representations close to the codebook vectors. Codebook loss: L_codebook=$\|z\_e-sg[z\_q]\|^2$. This term encourages the codebook vectors to move towards the latent representations. The codebook loss may be computed as: L_codebook=L_commit+$\beta$*L_codebook, where $\beta$ is a hyperparameter controlling the balance between the two terms.

Accordingly, the joint loss function can combine the VQ-VAE reconstruction loss, the neural upsampler loss, and the codebook loss. It may be defined as a weighted sum of these individual loss components: L_joint=$\alpha$*L_vq_recon+$\beta$*L_upsample+$\gamma$*L_codebook. The hyperparameters $\alpha$, $\beta$, and $\gamma$ control the relative importance of each loss component in the overall joint loss. These hyperparameters can be tuned based on the specific requirements and characteristics of the data and the desired balance between compression and reconstruction quality. It's important to carefully balance the contributions of each loss component in the joint loss function. The values of $\alpha$, $\beta$, and $\gamma$ should be chosen based on experimentation and validation. For example, a higher weight for the VQ-VAE reconstruction loss ($\alpha$) will prioritize the compression aspect, while a higher weight for the neural upsampler loss ($\beta$) will prioritize the reconstruction quality. The codebook loss weight ($\gamma$) can be adjusted to control the diversity and representativeness of the learned codebook. Additionally, it may be beneficial to experiment with different loss functions or variations of the reconstruction and upsampling losses (e.g., using perceptual losses or adversarial losses) to further enhance the visual quality of the reconstructed data.

By defining the joint loss function as a weighted sum of the VQ-VAE reconstruction loss, the neural upsampler loss, and the codebook loss, system 2400 can effectively combine the objectives of both components 2401, 2402. During the joint optimization process, the model will learn to minimize this joint loss, leading to improved compression and reconstruction performance.

Jointly optimizing the VQ-VAE 2401 and neural upsampler 2402 models may follow a training procedure that can be described with respect to a financial data use case, which starts with the preparation of a large dataset 2405 of financial time-series data and other relevant data modalities (e.g., text data, sentiment analysis, macroeconomic indicators, etc.) for training. Model training implements a training loop that iteratively feeds the data through VQ-VAE 2401 and neural upsampler 2402. During each iteration, system 2400 may perform the following steps: forward pass wherein the input data is passed through the VQ-VAE to obtain the compressed representations, then pass the compressed representations through the neural upsampler to obtain the reconstructed data; calculate the joint loss wherein system 2400 computes the reconstruction loss of the VQ-VAE and the upsampling loss of the neural upsampler, and combines them according to the defined loss function; backpropagation wherein system 2400 computes the gradients of the joint loss with respect to the parameters of both the VQ-VAE and the neural upsampler; and update the parameters via use of an optimization algorithm (e.g., Adam, stochastic gradient descent) to update the parameters of the VQ-VAE and the neural upsampler based on the computed gradients. System 2400 may iterate the training process for a sufficient number of epochs until convergence or until a satisfactory level of performance is achieved.

During model evaluation, system 2400 can evaluate the jointly trained model on a separate test dataset to assess its performance and measure relevant metrics such as reconstruction quality, compression ratio, and upsampling accuracy. To quantify the benefits of joint optimization system 2400 can compare the performance of the jointly optimized model with the performance of separately trained VQ-VAE and neural upsampler models. If necessary, fine-tune the jointly optimized model 2400 on specific financial datasets or applications to further improve its performance and adapt the model architecture or training procedure based on the characteristics and requirements of the target domain.

By implementing these steps, system 2400 can enable the joint optimization of the VQ-VAE and the neural upsampler. The VQ-VAE will learn to compress the financial data in a way that is more conducive to upsampling, while the neural upsampler will learn to effectively reconstruct the data from the compressed representations. This joint optimization process can lead to improved overall performance, as the two components learn to work together synergistically.

Figure 25:
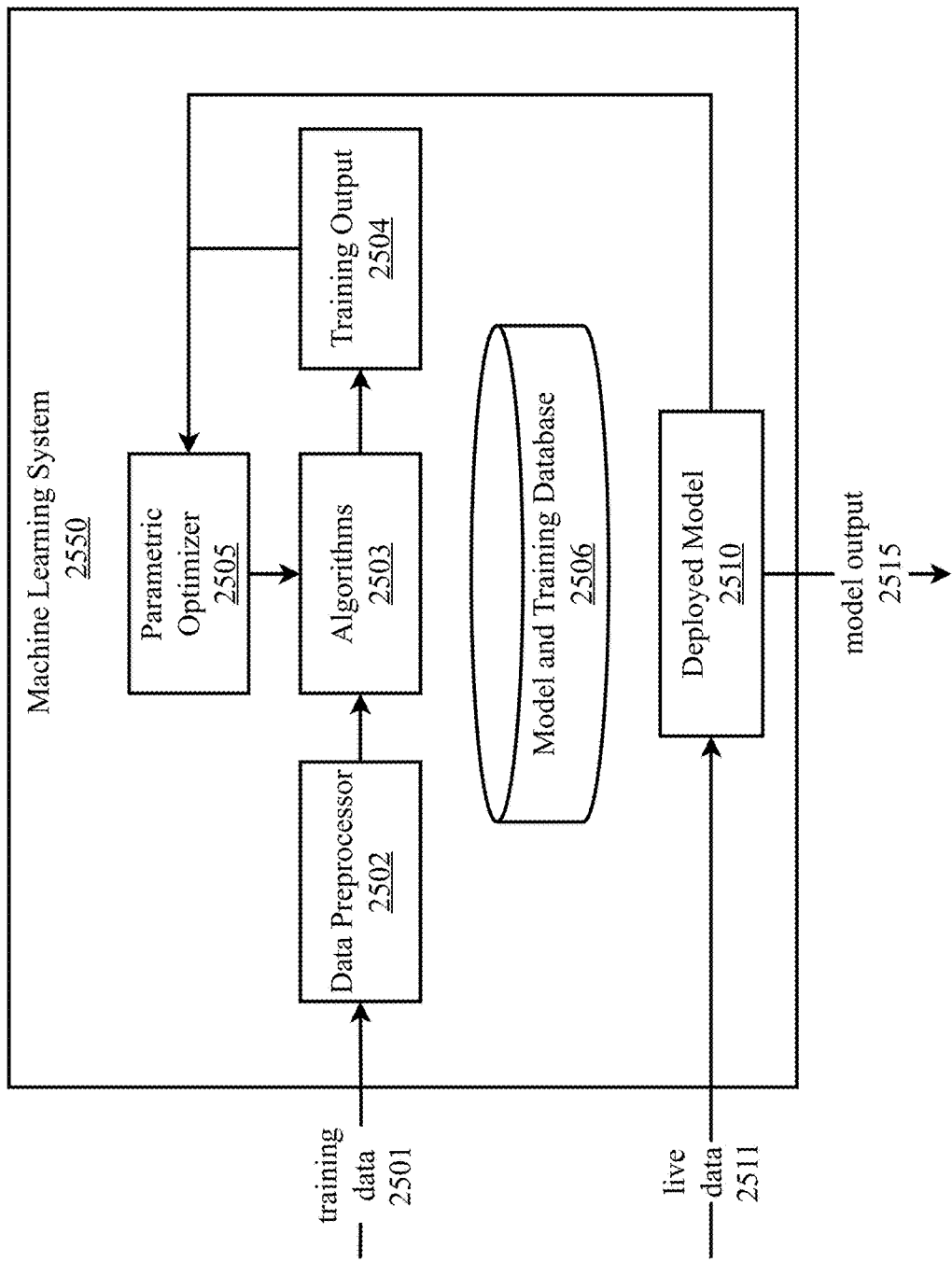
FIG. 25 is a block diagram illustrating an exemplary system architecture for training machine and deep learning models, according to an embodiment.

FIG. 25 is a block diagram illustrating an exemplary system architecture for training machine and deep learning models, according to an embodiment. According to the embodiment, machine learning engine 2550 may comprise a model training stage comprising a data preprocessor 2502, one or more machine and/or deep learning algorithms 2503, training output 2504, and a parametric optimizer 2505, and a model deployment stage comprising a deployed and fully trained model 2510 configured to perform tasks described herein such as transcription, summarization, agent coaching, and agent guidance.

At the model training stage, a plurality of training data 2501 may be received at machine learning engine 2550. In some embodiments, the plurality of training data may be obtained from one or more databases and/or directly from various sources such as but not limited to a financial databases, social media, news publications, and/or the like. Data preprocessor 2502 may receive the input data (e.g., time-series data) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 2502 may also be configured to create a training dataset, a validation dataset, and a test set from the plurality of input data 2501. For example, a training dataset may comprise 80% of the preprocessed input data, the validation set 10%, and the test dataset may comprise the remaining 10% of the data. The preprocessed training dataset may be fed as input into one or more machine and/or deep learning algorithms 2503 to train a predictive model for object monitoring and detection.

Machine learning engine 2550 may be fine-tuned to ensure each model performed in accordance with a desired outcome. Fine-tuning involves adjusting the model's parameters to make it perform better on specific tasks or data. In the use case of a jointly trained VQ-VAE neural upsampler, the goal is to improve the model's performance latent space compression and data reconstruction. Additionally, by using the smaller, fine-tuned models instead of a larger model for routine tasks, the machine learning system 2550 reduces computational costs associated with AI processing.

During model training, training output 2504 is produced and used to measure the accuracy and usefulness of the predictive outputs. During this process a parametric optimizer 2505 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation units in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by machine learning engine 2550 to evaluate a model's performance. Metrics may include, but are not limited to latency between a user input and a generated game state, quality of generated game states, and the realism of generated game states.

The test dataset can be used to test the accuracy of the model outputs. If the training model is making predictions that satisfy a certain criterion then it can be moved to the model deployment stage as a fully trained and deployed model 2510 in a production environment making predictions based on live input data 2511 (e.g., financial time-series data, SAR data, etc.). Further, model predictions made by a deployed model can be used as feedback and applied to model training in the training stage, wherein the model is continuously learning over time using both training data and live data and predictions.

A model and training database 2506 is present and configured to store training/test datasets and developed models. Database 2506 may also store previous versions of models.

According to some embodiments, the one or more machine and/or deep learning models may comprise any suitable algorithm known to those with skill in the art including, but not limited to: LLMs, generative transformers, VQ-VAEs, neural upsamplers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 2503 may comprise a deep learning algorithm such as neural networks (e.g., recurrent, convolutional, long short-term memory networks, etc.).

In some implementations, ML engine 2550 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 2506.

FIG. 1 is a block diagram illustrating an exemplary system architecture 100 for upsampling of decompressed data after lossy compression using a neural network, according to an embodiment. According to the embodiment, the system 100 comprises an encoder module 110 configured to receive two or more datasets 101a-n which are substantially correlated and perform lossy compression on the received dataset, and a decoder module 120 configured to receive a compressed bit stream and use a trained neural network to output a reconstructed dataset which can restore most of the "lost" data due to the lossy compression. Datasets 101a-n may comprise streaming data or data received in a batch format. Datasets 101a-n may comprise one or more datasets, data streams, data files, or various other types of data structures which may be compressed. Furthermore, dataset 101a-n may comprise n-channel data comprising a plurality of data channels sent via a single data stream.

Encoder 110 may utilize a lossy compression module 111 to perform lossy compression on a received dataset 101a-n. The type of lossy compression implemented by lossy compression module 111 may be dependent upon the data type being processed. For example, for SAR imagery data, High Efficiency Video Coding (HEVC) may be used to compress the dataset. In another example, if the data being processed is time-series data, then delta encoding may be used to compress the dataset. The encoder 110 may then send the compressed data as a compressed data stream to a decoder 120 which can receive the compressed data stream and decompress the data using a decompression module 121.

The decompression module 121 may be configured to perform data decompression a compressed data stream using an appropriate data decompression algorithm. The decompressed data may then be used as input to a neural upsampler 122 which utilizes a trained neural network to restore the decompressed data to nearly its original state 105 by taking advantage of the information embedded in the correlation between the two or more datasets 101a-n.

Figure 2A:
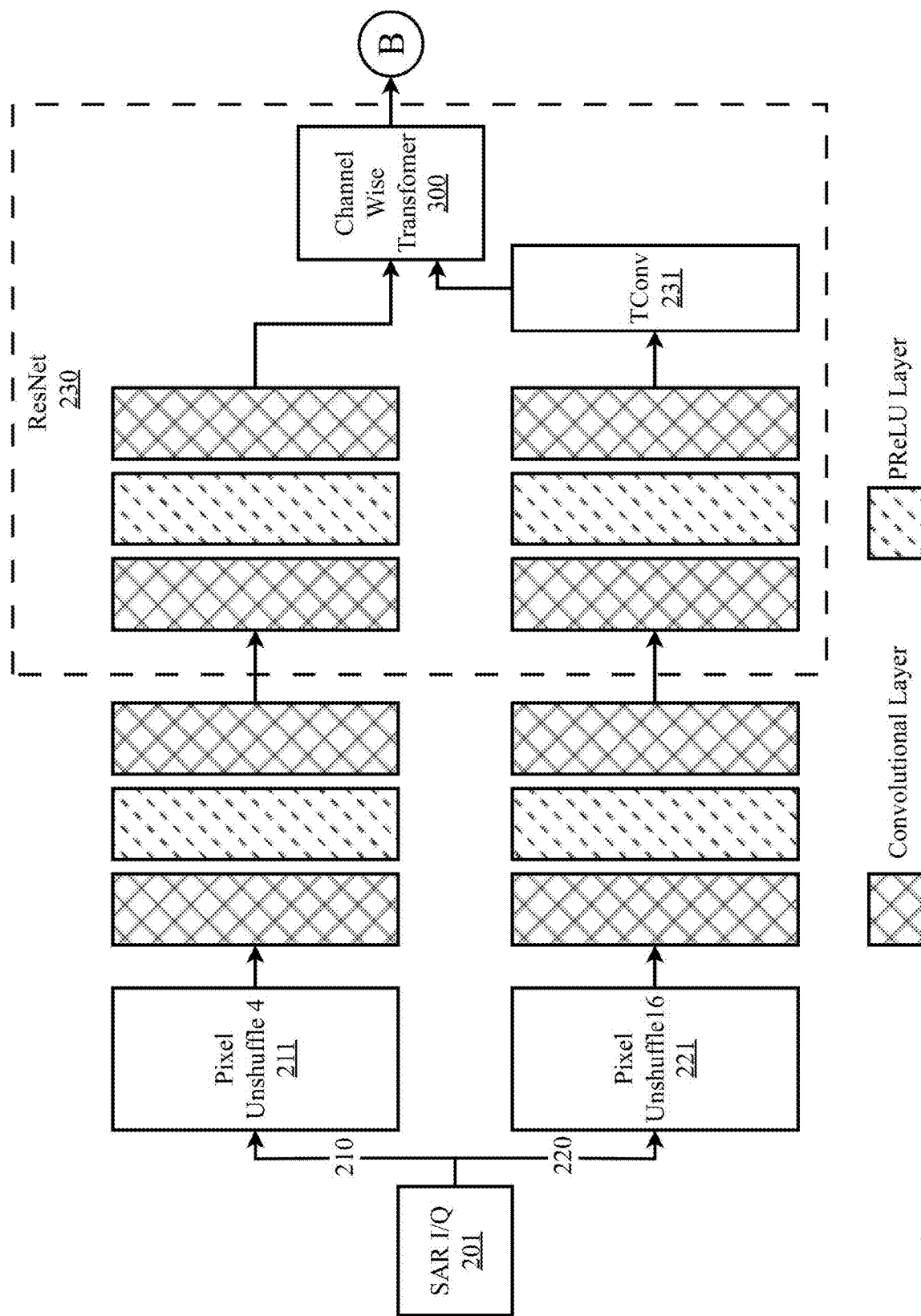
FIGS. 2A and 2B illustrate an exemplary architecture for an AI deblocking network configured to provide deblocking on dual-channel data stream comprising SAR I/Q data, according to an embodiment.
Figure 2B:
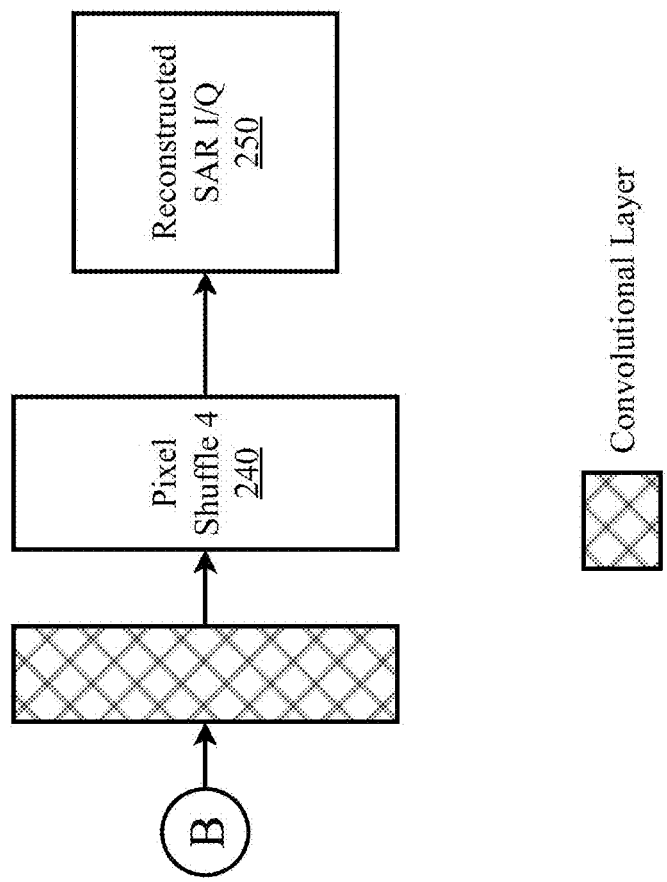

FIGS. 2A and 2B illustrate an exemplary architecture for an AI deblocking network configured to provide deblocking for dual-channel data stream comprising SAR I/Q data, according to an embodiment. In the context of this disclosure, dual-channel data refers to fact that SAR image signal can be represented as two (dual) components (i.e., I and Q) which are correlated to each other in some manner. In the case of I and Q, their correlation is that they can be transformed into phase and amplitude information and vice versa. AI deblocking network utilizes a deep learned neural network architecture for joint frequency and pixel domain learning. According to the embodiment, a network may be developed for joint learning across one or more domains. As shown, the top branch 210 is associated with the pixel domain learning and the bottom branch 220 is associated with the frequency domain learning. According to the embodiment, the AI deblocking network receives as input complex-valued SAR image I and Q channels 201 which, having been encoded via encoder 110, has subsequently been decompressed via decoder 120 before being passed to AI deblocking network for image enhancement via artifact removal. Inspired by the residual learning network and the MSAB attention mechanism, AI deblocking network employs resblocks that take two inputs. In some implementations, to reduce complexity the spatial resolution may be downsampled to one-half and one-fourth. During the final reconstruction the data may be upsampled to its original resolution. In one implementation, in addition to downsampling, the network employs deformable convolution to extract initial features, which are then passed to the resblocks. In an embodiment, the network comprises one or more resblocks and one or more convolutional filters. In an embodiment, the network comprises 8 resblocks and 64 convolutional filters.

Deformable convolution is a type of convolutional operation that introduces spatial deformations to the standard convolutional grid, allowing the convolutional kernel to adaptively sample input features based on the learned offsets. It's a technique designed to enhance the modeling of spatial relationships and adapt to object deformations in computer vision tasks. In traditional convolutional operations, the kernel's positions are fixed and aligned on a regular grid across the input feature map. This fixed grid can limit the ability of the convolutional layer to capture complex transformations, non-rigid deformations, and variations in object appearance. Deformable convolution aims to address this limitation by introducing the concept of spatial deformations. Deformable convolution has been particularly effective in tasks like object detection and semantic segmentation, where capturing object deformations and accurately localizing object boundaries are important. By allowing the convolutional kernels to adaptively sample input features from different positions based on learned offsets, deformable convolution can improve the model's ability to handle complex and diverse visual patterns.

According to an embodiment, the network may be trained as a two stage process, each utilizing specific loss functions. During the first stage, a mean squared error (MSE) function is used in the I/Q domain as a primary loss function for the AI deblocking network. The loss function of the SAR I/Q channel $L_{SAR}$ is defined as:

$$L_{SAR} = \mathbb{E}[\|I - I_{amp}\|_2]$$

Moving to the second stage, the network reconstructs the amplitude component and computes the amplitude loss using MSE as follows:

$$L_{amp} = \mathbb{E}[\|I_{amp} - I_{dec,amp}\|_2]$$

To calculate the overall loss, the network combines the SAR loss and the amplitude loss, incorporating a weighting factor, a, for the amplitude loss. The total loss is computed as:

$$L_{total} = L_{SAR} + \alpha \times L_{amp}$$

The weighting factor value may be selected based on the dataset used during network training. In an embodiment, the network may be trained using two different SAR datasets: the National Geospatial-Intelligence Agency (NGA) SAR dataset and the Sandia National Laboratories Mini SAR Complex Imagery dataset, both of which feature complex-valued SAR images. In an embodiment, the weighting factor is set to 0.0001 for the NGA dataset and 0.00005 for the Sandia dataset. By integrating both the SAR and amplitude losses in the total loss function, the system effectively guides the training process to simultaneously address the removal of the artifacts and maintain the fidelity of the amplitude information. The weighting factor, a, enables AI deblocking network to balance the importance of the SAR loss and the amplitude loss, ensuring comprehensive optimization of the network during the training stages. In some implementations, diverse data augmentation techniques may be used to enhance the variety of training data. For example, techniques such as horizontal and vertical flops and rotations may be implemented on the training dataset. In an embodiment, model optimization is performed using MSE loss and Adam optimizer with a learning rate initially set to $1 \times 10^{-4}$ and decreased by a factor of 2 at epochs 100, 200, and 250, with a total of 300 epochs. In an implementation, the batch size is set to 256×256 with each batch containing 16 images.

Both branches first pass through a pixel unshuffling layer 211, 221 which implements a pixel unshuffling process on the input data. Pixel unshuffling is a process used in image processing to reconstruct a high-resolution image from a low-resolution image by rearranging or "unshuffling" the pixels. The process can involve the following steps, low-resolution input, pixel arrangement, interpolation, and enhancement. The input to the pixel unshuffling algorithm is a low-resolution image (i.e., decompressed, quantized SAR I/Q data). This image is typically obtained by downscaling a higher-resolution image such as during the encoding process executed by encoder 110. Pixel unshuffling aims to estimate the original high-resolution pixel values by redistributing and interpolating the low-resolution pixel values. The unshuffling process may involve performing interpolation techniques, such as nearest-neighbor, bilinear, or more sophisticated methods like bicubic or Lanczos interpolation, to estimate the missing pixel values and generate a higher-resolution image.

The output of the unshuffling layers 211, 221 may be fed into a series of layers which can include one or more convolutional layers and one or more parametric rectified linear unit (PReLU) layers. A legend is depicted for both FIG. 2A and FIG. 2B which indicates the cross hatched block represents a convolutional layer and the dashed block represents a PRELU layer. Convolution is the first layer to extract features from an input image. Convolution preserves the relationship between pixels by learning image features using small squares of input data. It is a mathematical operation that takes two inputs such as an image matrix and a filter or kernel. The embodiment features a cascaded ResNet-like structure comprising 8 ResBlocks to effectively process the input data. The filter size associated with each convolutional layer may be different. The filter size used for the pixel domain of the top branch may be different than the filter size used for the frequency domain of the bottom branch.

A PRELU layer is an activation function used in neural networks. The PRELU activation function extends the ReLU by introducing a parameter that allows the slope for negative values to be learned during training. The advantage of PRELU over ReLU is that it enables the network to capture more complex patterns and relationships in the data. By allowing a small negative slope for the negative inputs, the PRELU can learn to handle cases where the output should not be zero for all negative values, as is the case with the standard ReLU. In other implementations, other non-linear functions such as tanh or sigmoid can be used instead of PRELU.

After passing through a series of convolutional and PRELU layers, both branches enter the resnet 230 which further comprises more convolutional and PRELU layers. The frequency domain branch is slightly different than the pixel domain branch once inside ResNet 230, specifically the frequency domain is processed by a transposed convolutional (TConv) layer 231. Transposed convolutions are a type of operation used in neural networks for tasks like image generation, image segmentation, and upsampling. They are used to increase the spatial resolution of feature maps while maintaining the learned relationships between features. Transposed convolutions aim to increase spatial dimensions of feature maps, effectively "upsampling" them. This is typically done by inserting zeros (or other values) between existing values to create more space for new values.

Inside ResBlock 230 the data associated with the pixel and frequency domains are combined back into a single stream by using the output of the Tconv 231 and the output of the top branch. The combined data may be used as input for a channel-wise transformer 300. In some embodiments, the channel-wise transformer may be implemented as a multi-scale attention block utilizing the attention mechanism. For more detailed information about the architecture and functionality of channel-wise transformer 300 refer to FIG. 3. The output of channel-wise transformer 300 may be a bit stream suitable for reconstructing the original SAR I/Q image. FIG. 2B shows the output of ResBlock 230 is passed through a final convolutional layer before being processed by a pixel shuffle layer 240 which can perform upsampling on the data prior to image reconstruction. The output of the AI deblocking network may be passed through a quantizer 124 for dequantization prior to producing a reconstructed SAR I/Q image 250.

Figure 3:
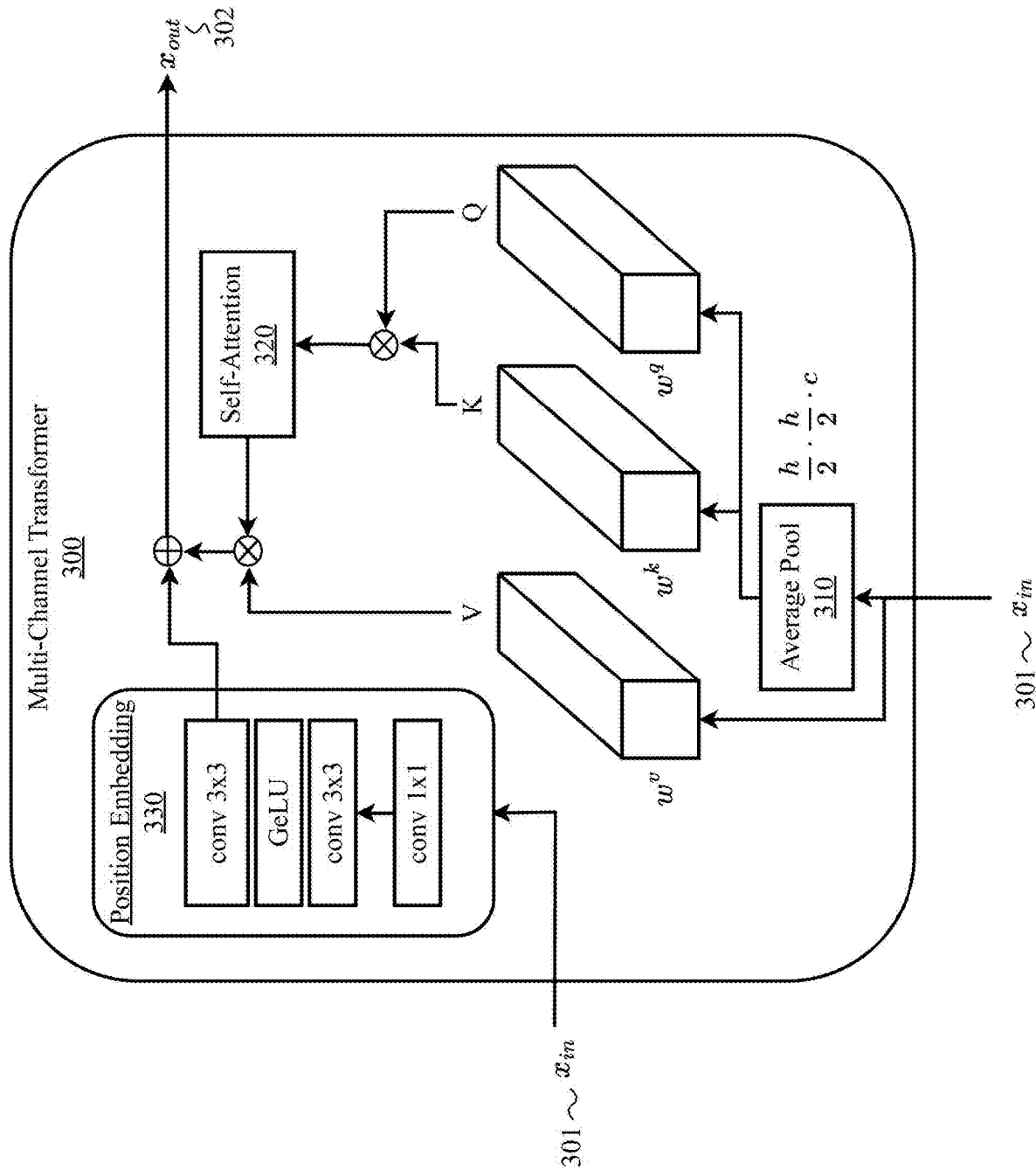
FIG. 3 is a block diagram illustrating an exemplary architecture for a component of the system for SAR image compression, the channel-wise transformer.

FIG. 3 is a block diagram illustrating an exemplary architecture for a component of the system for SAR image compression, the channel-wise transformer 300. According to the embodiment, channel-wise transformer receives an input signal, $x_{in}$ 301, the input signal comprising SAR I/Q data which is being processed by AI deblocking network 123. The input signal may be copied and follow two paths through multi-channel transformer 300.

A first path may process input data through a position embedding module 330 comprising series of convolutional layers as well as a Gaussian Error Linear Unit (GeLU). In traditional recurrent neural networks or convolutional neural networks, the order of input elements is inherently encoded through the sequential or spatial nature of these architectures. However, in transformer-based models, where the attention mechanism allows for non-sequential relationships between tokens, the order of tokens needs to be explicitly conveyed to the model. Position embedding module 330 may represent a feedforward neural network (position-wise feedforward layers) configured to add position embeddings to the input data to convey the spatial location or arrangement of pixels in an image. The output of position embedding module 330 may be added to the output of the other processing path the received input signal is processed through.

A second path may process the input data. It may first be processed via a channel-wise configuration and then through a self-attention layer 320. The signal may be copied/duplicated such that a copy of the received signal is passed through an average pool layer 310 which can perform a downsampling operation on the input signal. It may be used to reduce the spatial dimensions (e.g., width and height) of feature maps while retaining the most important information. Average pooling functions by dividing the input feature map into non-overlapping rectangular or square regions (often referred to as pooling windows or filters) and replacing each region with the average of the values within that region. This functions to downsample the input by summarizing the information within each pooling window.

Self-attention layer 320 may be configured to provide an attention to AI deblocking network 123. The self-attention mechanism, also known as intra-attention or scaled dot-product attention, is a fundamental building block used in various deep learning models, particularly in transformer-based models. It plays a crucial role in capturing contextual relationships between different elements in a sequence or set of data, making it highly effective for tasks involving sequential or structured data like complex-valued SAR I/Q channels. Self-attention layer 320 allows each element in the input sequence to consider other elements and weigh their importance based on their relevance to the current element. This enables the model to capture dependencies between elements regardless of their positional distance, which is a limitation in traditional sequential models like RNNs and LSTMs.

The input 301 and downsampled input sequence is transformed into three different representations: Query (Q), Key (K), and Value (V). These transformations ($w^V$, $w^K$, and $w^Q$) are typically linear projections of the original input. For each element in the sequence, the dot product between its Query and the Keys of all other elements is computed. The dot products are scaled by a factor to control the magnitude of the attention scores. The resulting scores may be normalized using a softmax function to get attention weights that represent the importance of each element to the current element. The Values (V) of all elements are combined using the attention weights as coefficients. This produces a weighted sum, where elements with higher attention weights contribute more to the final representation of the current element. The weighted sum is the output of the self-attention mechanism for the current element. This output captures contextual information from the entire input sequence.

The output of the two paths (i.e., position embedding module 330 and self-attention layer 320) may be combined into a single output data stream $x_{out}$ 302.

Figure 4:
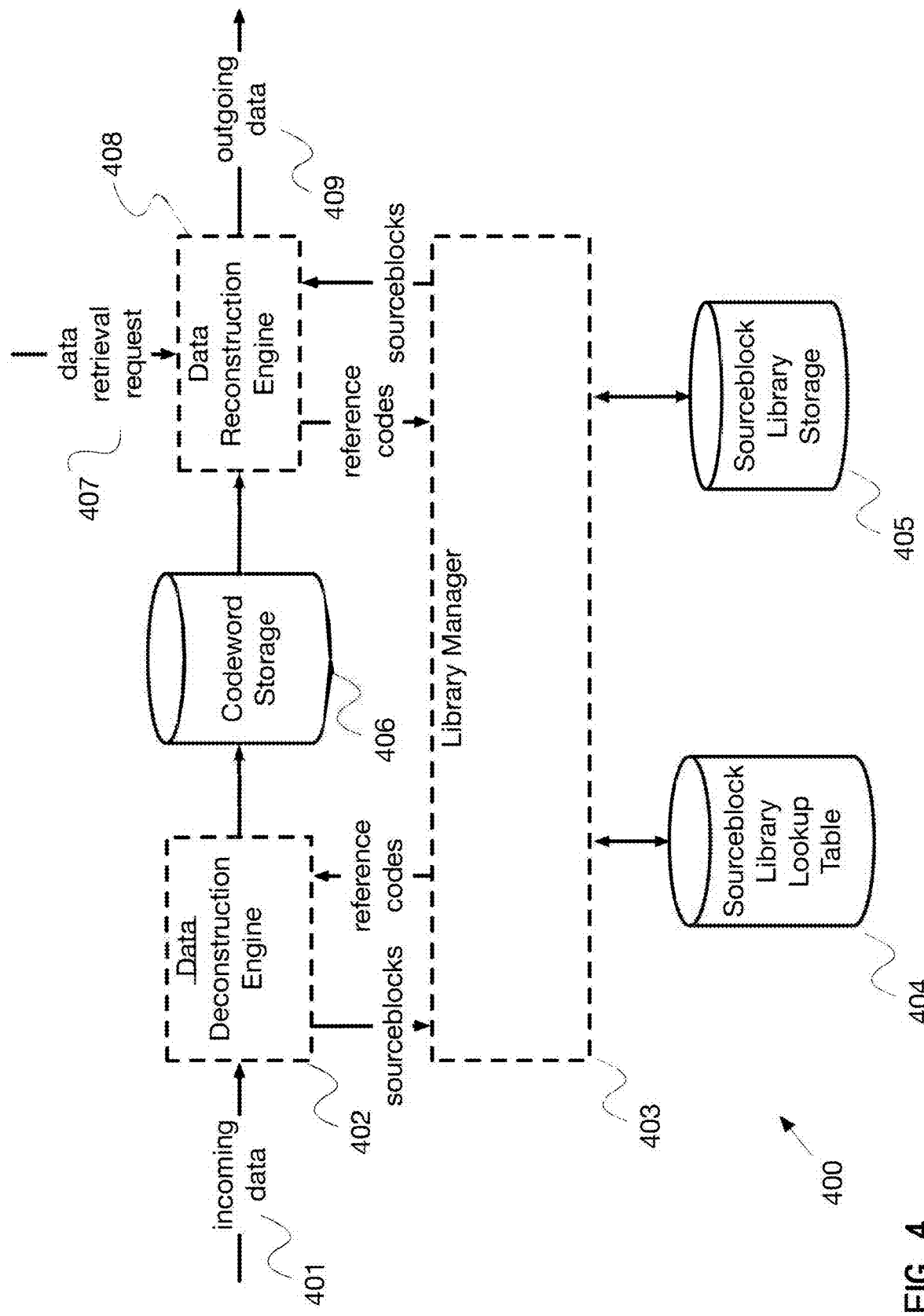
FIG. 4 is a block diagram illustrating an exemplary system architecture for providing lossless data compaction, according to an embodiment.

FIG. 4 is a block diagram illustrating an exemplary system architecture 400 for providing lossless data compaction, according to an embodiment. As incoming data 401 is received by data deconstruction engine 402. Data deconstruction engine 402 breaks the incoming data into sourceblocks, which are then sent to library manager 403. Using the information contained in sourceblock library lookup table 404 and sourceblock library storage 405, library manager 403 returns reference codes to data deconstruction engine 402 for processing into codewords, which are stored in codeword storage 106. When a data retrieval request 407 is received, data reconstruction engine 408 obtains the codewords associated with the data from codeword storage 406, and sends them to library manager 403. Library manager 403 returns the appropriate sourceblocks to data reconstruction engine 408, which assembles them into the proper order and sends out the data in its original form 409.

Figure 5:
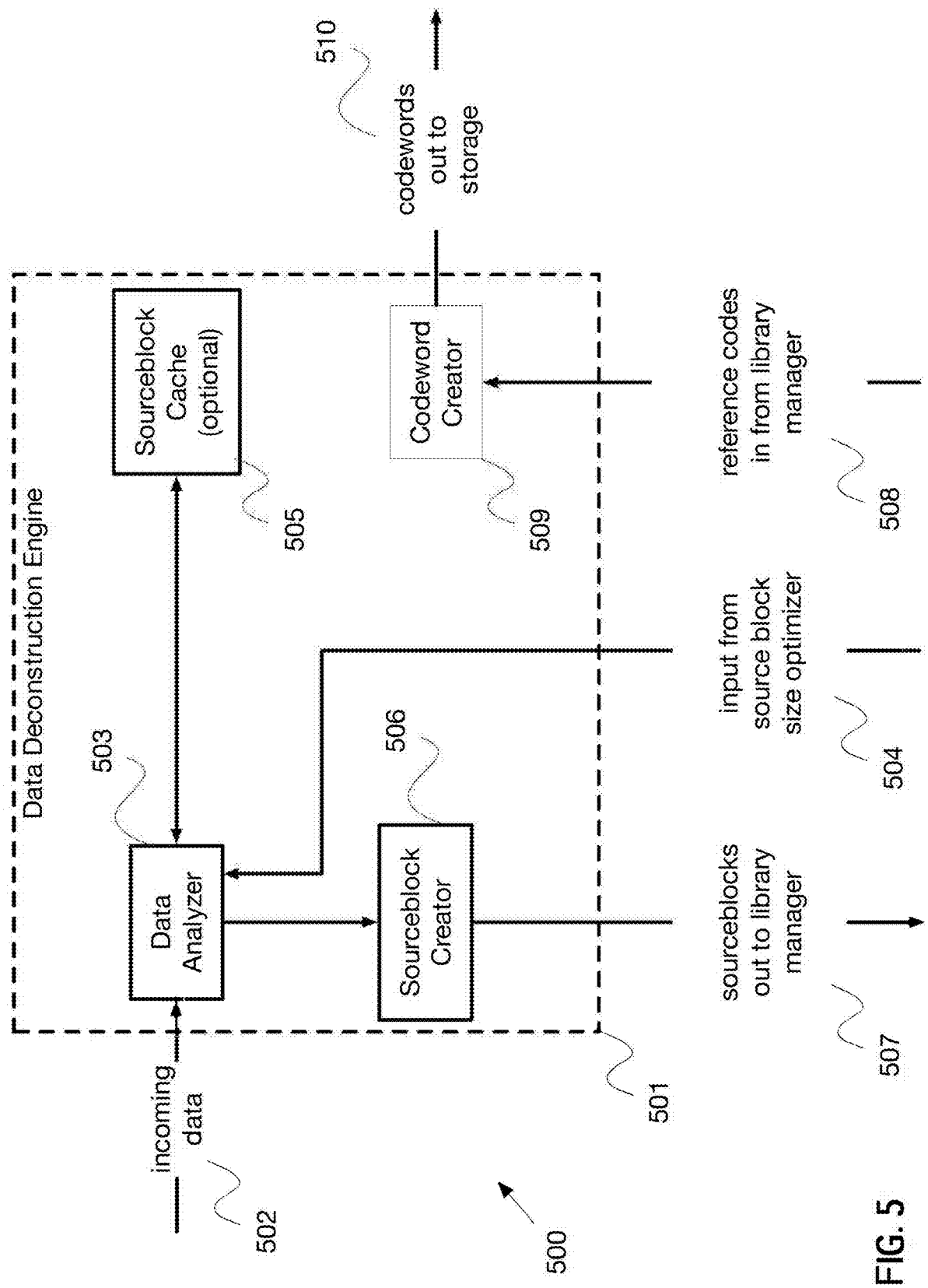
FIG. 5 is a diagram showing an embodiment of one aspect of the lossless data compaction system, specifically data deconstruction engine.

FIG. 5 is a diagram showing an embodiment of one aspect 500 of the system, specifically data deconstruction engine 501. Incoming data 502 is received by data analyzer 503, which optimally analyzes the data based on machine learning algorithms and input 504 from a sourceblock size optimizer, which is disclosed below. Data analyzer may optionally have access to a sourceblock cache 505 of recently processed sourceblocks, which can increase the speed of the system by avoiding processing in library manager 403. Based on information from data analyzer 503, the data is broken into sourceblocks by sourceblock creator 506, which sends sourceblocks 507 to library manager 403 for additional processing. Data deconstruction engine 501 receives reference codes 508 from library manager 403, corresponding to the sourceblocks in the library that match the sourceblocks sent by sourceblock creator 506, and codeword creator 509 processes the reference codes into codewords comprising a reference code to a sourceblock and a location of that sourceblock within the data set. The original data may be discarded, and the codewords representing the data are sent out to storage 510.

Figure 6:
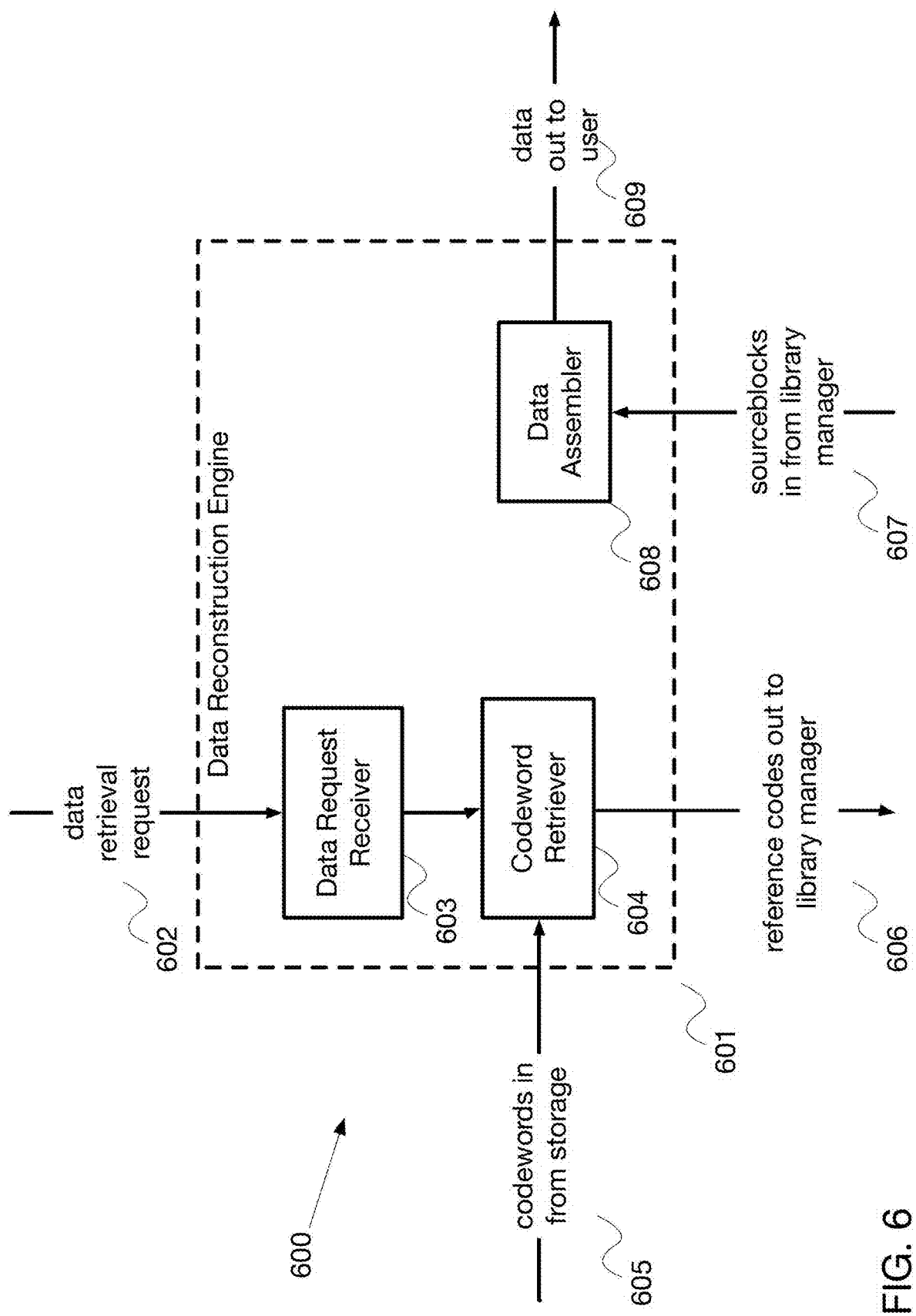
FIG. 6 is a diagram showing an embodiment of another aspect of lossless data compaction system, specifically data reconstruction engine.

FIG. 6 is a diagram showing an embodiment of another aspect of system 600, specifically data reconstruction engine 601. When a data retrieval request 602 is received by data request receiver 603 (in the form of a plurality of codewords corresponding to a desired final data set), it passes the information to data retriever 604, which obtains the requested data 605 from storage. Data retriever 604 sends, for each codeword received, a reference codes from the codeword 606 to library manager 403 for retrieval of the specific sourceblock associated with the reference code. Data assembler 608 receives the sourceblock 607 from library manager 403 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 609 in its original form.

Figure 7:
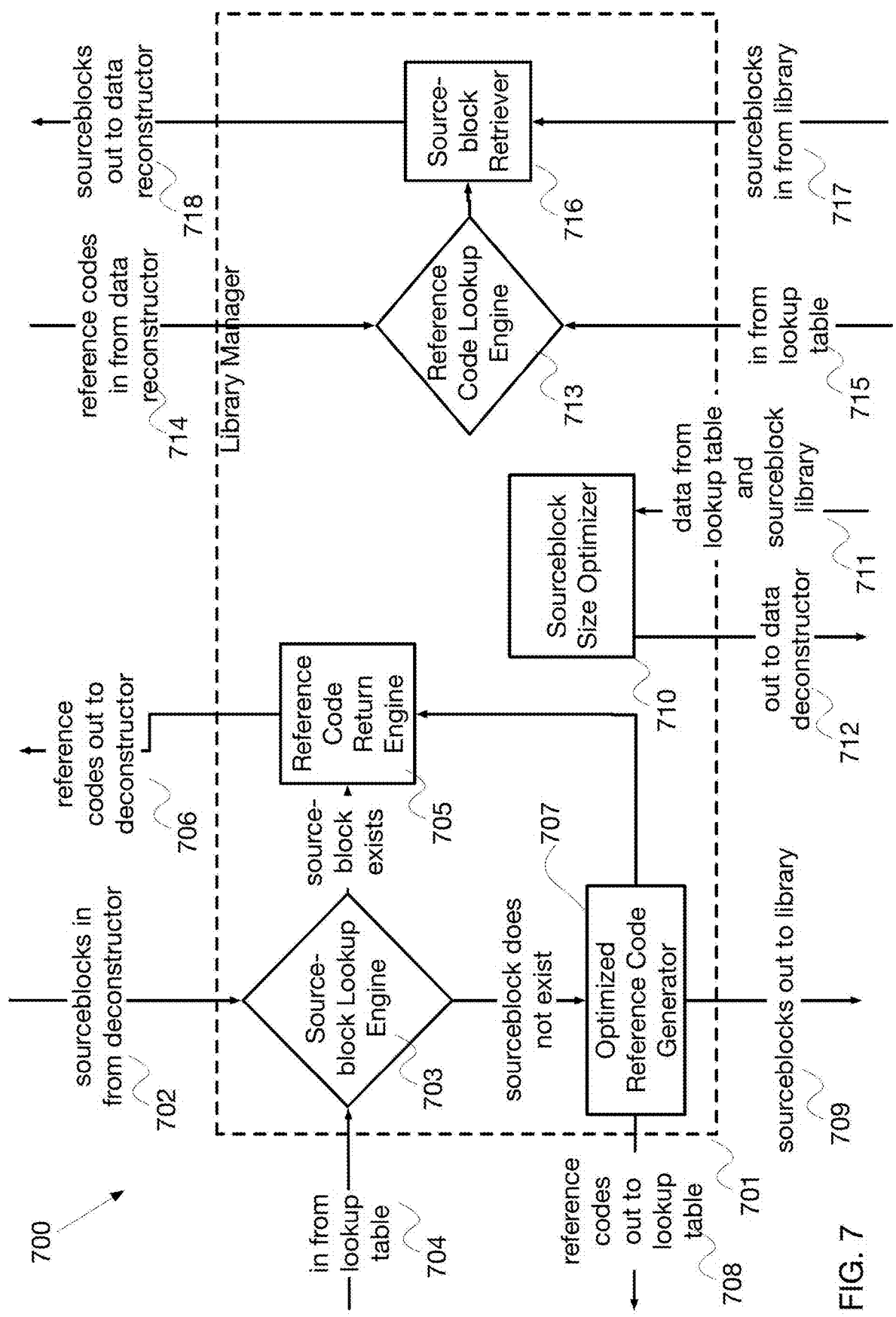
FIG. 7 is a diagram showing an embodiment of another aspect of lossless data compaction the system, specifically library manager.

FIG. 7 is a diagram showing an embodiment of another aspect of the system 700, specifically library manager 701. One function of library manager 701 is to generate reference codes from sourceblocks received from data deconstruction engine 701. As sourceblocks are received 702 from data deconstruction engine 501, sourceblock lookup engine 703 checks sourceblock library lookup table 704 to determine whether those sourceblocks already exist in sourceblock library storage 705. If a particular sourceblock exists in sourceblock library storage 105, reference code return engine 705 sends the appropriate reference code 706 to data deconstruction engine 601. If the sourceblock does not exist in sourceblock library storage 105, optimized reference code generator 407 generates a new, optimized reference code based on machine learning algorithms. Optimized reference code generator 707 then saves the reference code 708 to sourceblock library lookup table 704; saves the associated sourceblock 709 to sourceblock library storage 105; and passes the reference code to reference code return engine 705 for sending 706 to data deconstruction engine 501. Another function of library manager 701 is to optimize the size of sourceblocks in the system. Based on information 711 contained in sourceblock library lookup table 404, sourceblock size optimizer 410 dynamically adjusts the size of sourceblocks in the system based on machine learning algorithms and outputs that information 712 to data analyzer 603. Another function of library manager 701 is to return sourceblocks associated with reference codes received from data reconstruction engine 601. As reference codes are received 714 from data reconstruction engine 601, reference code lookup engine 713 checks sourceblock library lookup table 715 to identify the associated sourceblocks; passes that information to sourceblock retriever 716, which obtains the sourceblocks 717 from sourceblock library storage 405; and passes them 718 to data reconstruction engine 601.

Figure 19:
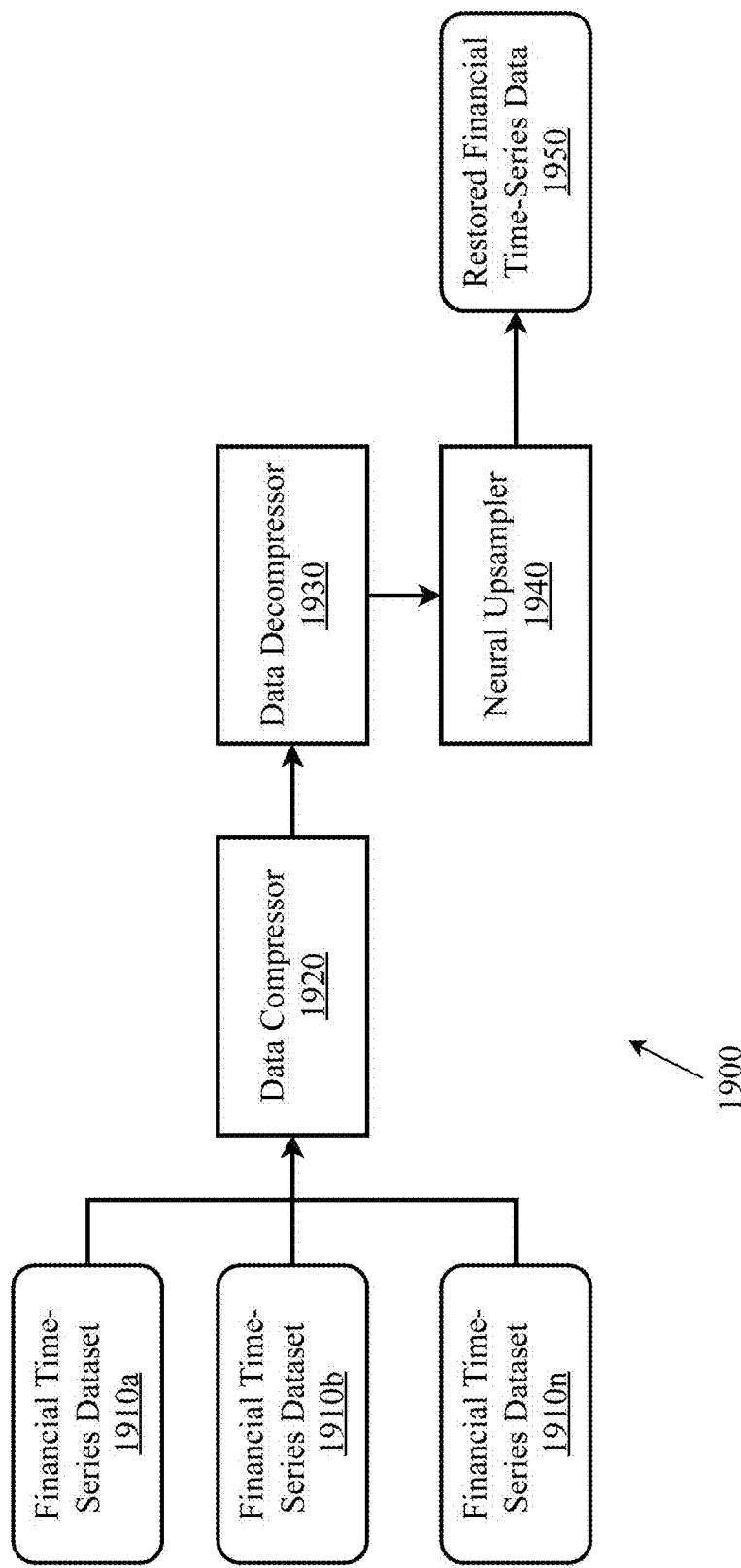
FIG. 19 is a block diagram illustrating an exemplary system architecture for neural upsampling of two or more financial time-series datasets, according to an embodiment.

FIG. 19 is a block diagram illustrating an exemplary system architecture for neural upsampling of two or more financial time-series datasets, according to an embodiment. Financial data 1910a-n may comprise, for example, any one or more of financial time series data related to a sequence of observations on financial market variables such as stock prices, interest rates, exchange rates, and other economic indicators. These exemplary datasets are often used in financial research, algorithmic trading, risk management, and other areas of finance for making informed decisions. Financial time series datasets can be correlated in various ways, reflecting relationships and interactions in the broader economic and financial environment. Understanding these correlations is crucial for investors, analysts, and policymakers to make informed decisions and manage risks effectively in the dynamic financial markets. Thus, it would be beneficial to have a system, method, and/or computer readable instructions capable of providing neural upsampling of financial time-series data which has undergone lossy compression, therefore nearly restoring all the lost data.

In an embodiment, financial time-series data 1910a-n may comprise (but is not limited to) stock prices, economic indicators, market indices, interest rates, bond yields, currency exchange rates, trade balances, commodities prices, inflation, options and future data, sentiment analysis, credit ratings, mergers and acquisition data, real estate prices, and VIX data. There are various sources of financial time-series data that provide information on market prices, economic indicators, and other financial variables. Some common sources can include, but are not limited, financial data providers (e.g., companies specializing in financial data offer comprehensive financial datasets covering a wide range of asset classes), stock exchanges, central banks, government agencies, financial new websites, Alpha Vantage is a financial data provider that offers a free API for accessing historical and real-time market data, investing websites, world bank, Federal Reserve Economic Data, and/or the like.

Furthermore, there are various types of correlations in financial data that can be exploited by the systems and methods described herein with respect to neural upsampling of compressed financial data such as, for example, market correlations, sector correlations, asset class correlations, individual stock correlations, economic indicator correlations, technical indicator correlations, international market correlations, correlation with economic events, and intraday correlations, to name a few. Some exemplary market correlations include correlations between: different stock markets (e.g., S&P 500 and FTSE 100), stock markets and bond markets, and stock markets and commodity markets (e.g., gold, oil), stock markets and currency exchange rates. Sector correlations can include, but is not limited to, correlation between: different sectors within a market (e.g., technology and healthcare), sectors across different markets (e.g., US technology sector and European technology sector), and sectors and commodity prices (e.g., energy sector and oil prices). Asset class correlations may comprise correlation between: different assets classes (e.g., stocks, bonds, real estate), asset classes and economic indicators (e.g., inflation, interest rates), and asset classes and market volatility (e.g., VIX index). Individual stock correlations may comprise correlation between: stocks within the same sector or industry, stocks with similar market capitalization or growth characteristics, and stocks and their respective market indices. Examples of economic indicator correlations include correlation between: stock markets and gross domestic product (GDP) growth, stock markets and inflation rates, stock markets and unemployment rates, and stock markets and consumer confidence indices.

Exemplary technical indicator correlations may comprise correlation between: price movements and trading volume, price movements and relative strength index (RSI), and price movements and moving averages (e.g., 50-day, 200-day, etc.). Correlation with economic events may comprise correlation between: stock markets and central bank announcements (e.g., interest rate decisions), stock markets and government policy changes (e.g., tax reforms), and stock markets and geopolitical events (e.g., elections, conflicts, etc.). Intraday correlations may involve correlation between: price movements and time of day (e.g., market open, market close), and price movements and trading volume during specific intraday periods.

These are just a few examples of the types of correlations that can be found in financial data. It's important to note that correlations can change over time and may be influenced by various factors such as market conditions, economic cycles, and investor sentiment.

There are several common data formats used for storing and transmitting financial time-series data, and which may be used in various implementations of the disclosed system and methods. These formats are designed to efficiently represent the vast amount of information generated through various financial services across various industries. One such format of genomic data which may be processed by system 1900 is comma separated values (CSV). CSV is a simple and widely used text format where each row represents a data entry, and columns are separated by commas. It's easy to read, edit, and widely supported by various data analysis tools. In another embodiment, the financial time-series data may be formatted according to JavaScript Object Notation (JSON) which is a lightweight data interchange format that is easy for humans to read and write. It's commonly used for representing structured data, and its flexibility makes it suitable for financial time-series data. In yet another embodiment, the financial time-series data may be processed in a Hierarchical Data Format version 5 (HDF5). HDF5 is a file format and set of tools for managing complex data. It supports the efficient storage of large and diverse datasets, making it suitable for financial time-series data with many variables. These are merely exemplary data formats which may be implemented in some embodiments and do not represent all possible formats which may be processed by system 1900.

The financial time-series data may be received at a data compressor 1920 which is present and configured to utilize one or more data compression methods on received financial data 1910a-n. Compression techniques are commonly used on financial time-series data to reduce storage requirements, speed up data transmission, and improve overall efficiency. According to an embodiment, the compression technique may be implemented as Run-Length Encoding (RLE) which is a simple compression technique that replaces sequences of identical elements with a single value and a count of the number of occurrences. In financial time-series data, where consecutive observations often have the same value, RLE can be effective in reducing redundancy. In yet another embodiment, the compression technique may be implemented as delta encoding which involves storing the difference between consecutive data points rather than the absolute values. In financial time-series data, where changes in values may be relatively small over time, delta encoding can result in more compact storage.

In an embodiment, the data may be compressed via differential pulse code modulation (DPCM). DPCM is a form of delta encoding that quantizes the difference between each data point and a predicted value based on the previous data point. It is commonly used in audio and video compression and can be adapted for financial time-series data. The provided compression techniques are exemplary only and are in no way limiting to the possible compression techniques which may be used in an embodiment of the disclosed system. The choice of compression technique depends on factors such as the nature of the data, the specific requirements of the application, and the trade-off between compression ratio and computational complexity. Different techniques may be suitable for different types of financial time-series data, and a combination of methods may be employed in practice. Lossy compression algorithms may filter or smooth the data to reduce redundancy or noise. While this can result in higher compression, it may lead to the loss of some information, especially in regions with lower sequencing quality.

Financial time-series data compressed by data compressor 1920 may then be sent to a data decompressor 1930 which can utilize one or more data decompression methods known to those with skill in the art. The output of data decompressor 1930 is a financial data stream(s) of decompressed data which is missing information due to the lossy nature of the compression/decompression methods used. The decompressed financial data stream(s) may be passed to neural upsampler 1940 which can utilize a trained neural network to restore most of the "lost" information associated with the decompressed financial data stream(s) by leveraging the learned correlation(s) between and among the various financial datasets. The output of neural upsampler 1940 is restored financial data 1950.

According to various embodiments, system 1900 utilizes a trained neural upsampler to leverage correlations in the received two or more financial datasets 1910*a-n* in order to restore lost data. In an aspect, neural upsampler 1940 may comprise a series of recurrent neural network layers, pooling layers, an n-channel transformer, and/or convolutional layers as described herein. In an embodiment, neural upsampler 1940 may be trained on a training dataset comprising a corpus of compressed financial data, wherein the compressed financial data is correlated. The neural upsampler may be trained to generate as output financial data, which is close to its original state, prior to undergoing lossy data compression. The financial data which was used to create the training dataset may be kept and used to validate the training output of neural upsampler, in this way the neural upsampler can be trained to generate output which nearly matches the original, uncompressed financial data.

Financial time series datasets can be correlated in various ways, reflecting relationships and interactions in the broader economic and financial environment. There are some ways in which distinct financial time-series datasets can be correlated, and which may be learned and leveraged by a trained neural upsampler 1940 to restore financial data which has been processed via lossy compression/decompression. For example, exchange rates can be correlated with trade balances. A country with a trade surplus may experience appreciation in its currency, while a trade deficit could lead to depreciation. As another example, stock prices and the VIX typically exhibit a negative correlation. During periods of market uncertainty or decline, the VIX tends to rise as investors seek protection, leading to lower stock prices. Yet another correlation that can be found among financial time-series datasets is that stock prices are often correlated with corporate earnings. Positive earnings reports can lead to higher stock prices, while disappointing earnings may result in stock market declines.

More examples of financial correlations which may be leveraged in one or more embodiments include interest rates and real estate prices, unemployment rates and consumer spending, inflation rates and gold prices, government bond yield and stock prices, oil prices and airline stocks, technology stocks and semiconductor sales, credit ratings and corporate bond yields, GDP (gross domestic product) growth and stock market performance, consumer confidence and retail sales, and/or the like. Of course, the financial time-series datasets may be correlated temporally such as, for example, the correlation between interest rate increase/decrease by a central bank and the influence on markets based on the change. A neural upsampler can use the learned correlations in financial datasets to be trained to restore lost data.

Detailed Description of Exemplary Aspects

Figure 8:
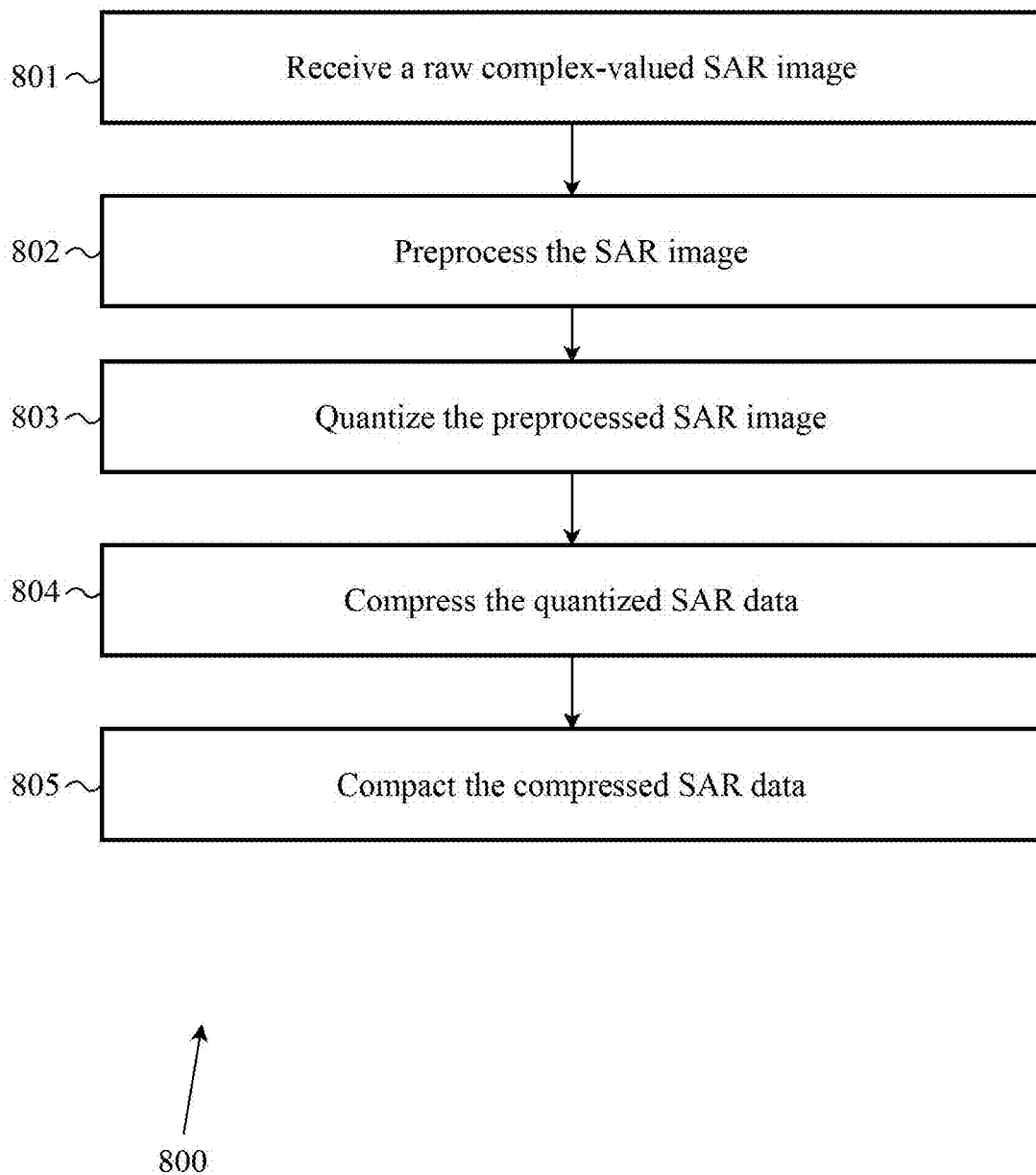
FIG. 8 is a flow diagram illustrating an exemplary method for complex-valued SAR image compression, according to an embodiment.

FIG. 8 is a flow diagram illustrating an exemplary method 800 for complex-valued SAR image compression, according to an embodiment. According to the embodiment, the process begins at step 801 when encoder 110 receives a raw complex-valued SAR image. The complex-valued SAR image comprises both I and Q components. In some embodiments, the I and Q components may be processed as separate channels. At step 802, the received SAR image may be preprocessed for further processing by encoder 110. For example, the input image may be clipped or otherwise transformed in order to facilitate further processing. As a next step 803, the preprocessed data may be passed to quantizer 112 which quantizes the data. The next step 804, comprises compressing the quantized SAR data using a compression algorithm known to those with skill in the art. In an embodiment, the compression algorithm may comprise HEVC encoding for both compression and decompression of SAR data. As a last step 805, the compressed data may be compacted. The compaction may be a lossless compaction technique, such as those described with reference to FIGS. 4-7. The output of method 800 is a compressed, compacted bit stream of SAR image data which can be stored in a database, requiring much less storage space than would be required to store the original, raw SAR image. The compressed and compacted bit stream may be transmitted to an endpoint for storage or processing. Transmission of the compressed and compacted data require less bandwidth and computing resources than transmitting raw SAR image data.

Figure 9:
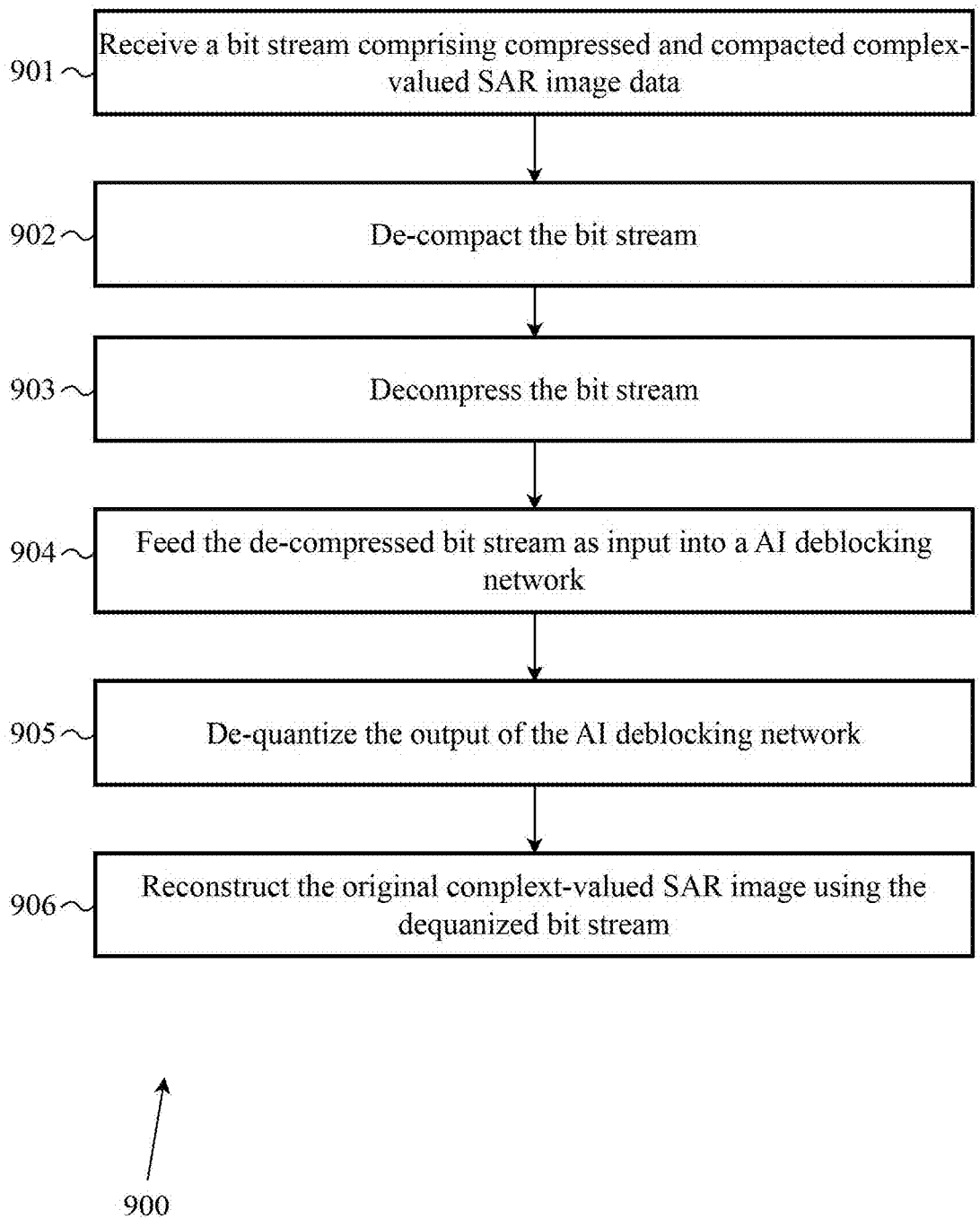
FIG. 9 is a flow diagram illustrating and exemplary method for decompression of a complex-valued SAR image, according to an embodiment.

FIG. 9 is a flow diagram illustrating and exemplary method 900 for decompression of a complex-valued SAR image, according to an embodiment. According to the embodiment, the process begins at step 901 when decoder 120 receives a bit stream comprising compressed and compacted complex-valued SAR image data. The compressed bit stream may be received from encoder 110 or from a suitable data storage device. At step 902, the received bit stream is first de-compacted to produce an encoded (compressed) bit stream. In some embodiments, data reconstruction engine 601 may be implemented as a system for de-compacting a received bit stream. The next step 903, comprising decompressing the de-compacted bit stream using a suitable compression algorithm known to those with skill in the art, such as HEVC encoding. At step 904, the de-compressed SAR data may be fed as input into AI deblocking network 123 for image enhancement via a trained deep learning network. The AI deblocking network may utilize a series of convolutional layers and/or ResBlocks to process the input data and perform artifact removal on the de-compressed SAR image data. AI deblocking network may be further configured to implement an attention mechanism for the model to capture dependencies between elements regardless of their positional distance. In an embodiment, during training of AI deblocking network, the amplitude loss in conjunction with the SAR loss may be computed and accounted for, further boosting the compression performance of system 100. The output of AI deblocking network 123 can be sent to a quantizer 124 which can execute step 905 by de-quantizing the output bit stream from AI deblocking network. As a last step 906, system can reconstruct the original complex-valued SAR image using the de-quantized bit stream.

Figure 10:
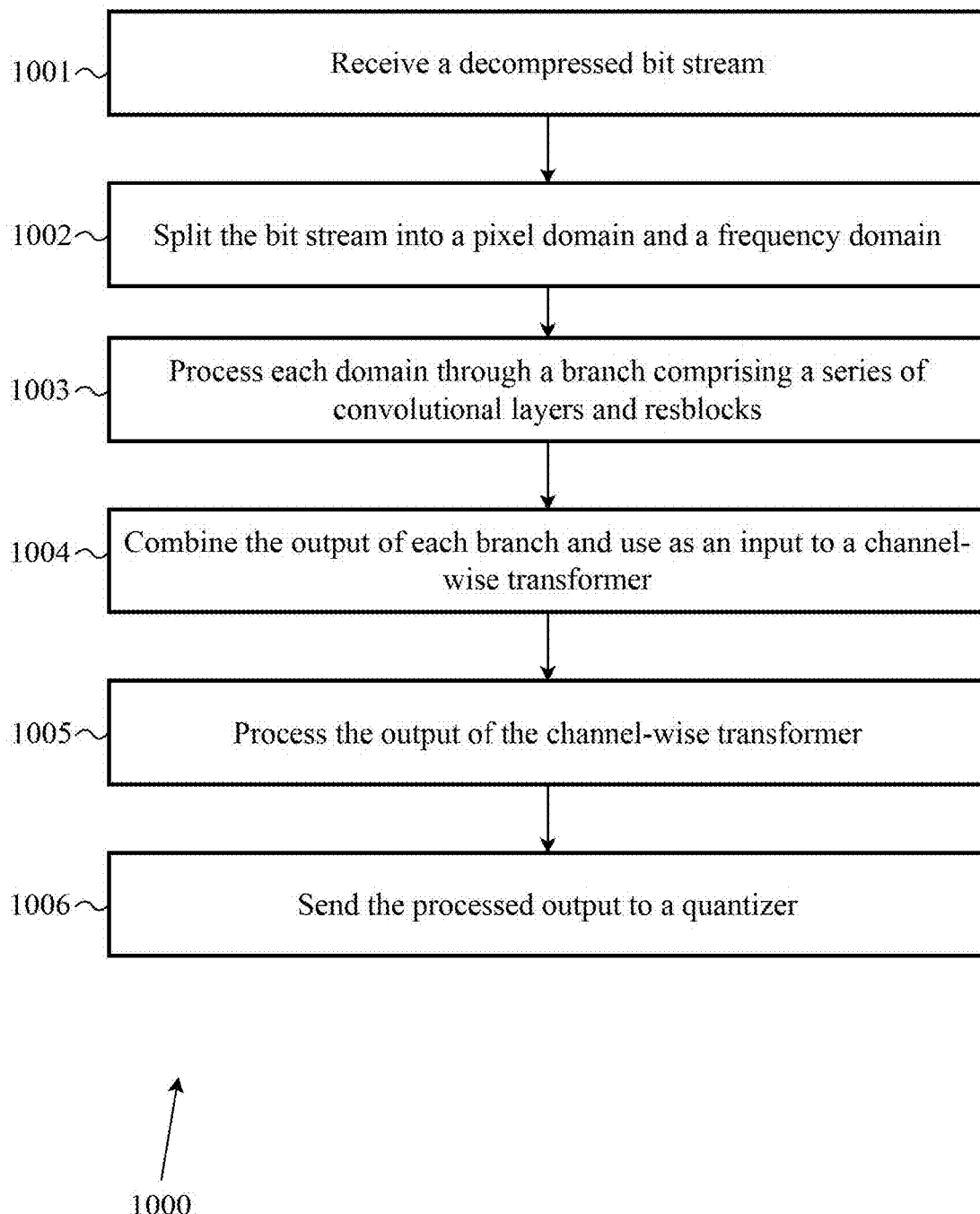
FIG. 10 is a flow diagram illustrating an exemplary method for deblocking using a trained deep learning algorithm, according to an embodiment.

FIG. 10 is a flow diagram illustrating an exemplary method for deblocking using a trained deep learning algorithm, according to an embodiment. According to the embodiment, the process begins at step 1001 wherein the trained deep learning algorithm (i.e., AI deblocking network 123) receives a decompressed bit stream comprising SAR I/Q image data. At step 1002, the bit stream is split into a pixel domain and a frequency domain. Each domain may pass through AI deblocking network, but have separate, almost similar processing paths. As a next step 1003, each domain is processed through its respective branch, the branch comprising a series of convolutional layers and ResBlocks. In some implementations, frequency domain may be further processed by a transpose convolution layer. The two branches are combined and used as input for a multi-channel transformer with attention mechanism at step 1004. Multi-channel transformer 300 may perform functions such as downsampling, positional embedding, and various transformations, according to some embodiments. Multi-channel transformer 300 may comprise one or more of the following components: channel-wise attention, transformer self-attention, and/or feedforward layers. In an implementation, the downsampling may be performed via average pooling. As a next step 1005, the AI deblocking network processes the output of the channel-wise transformer. The processing may include the steps of passing the output through one or more convolutional or PRELU layers and/or upsampling the output. As a last step 1006, the processed output may be forwarded to quantizer 124 or some other endpoint for storage or further processing.

Figure 11A:
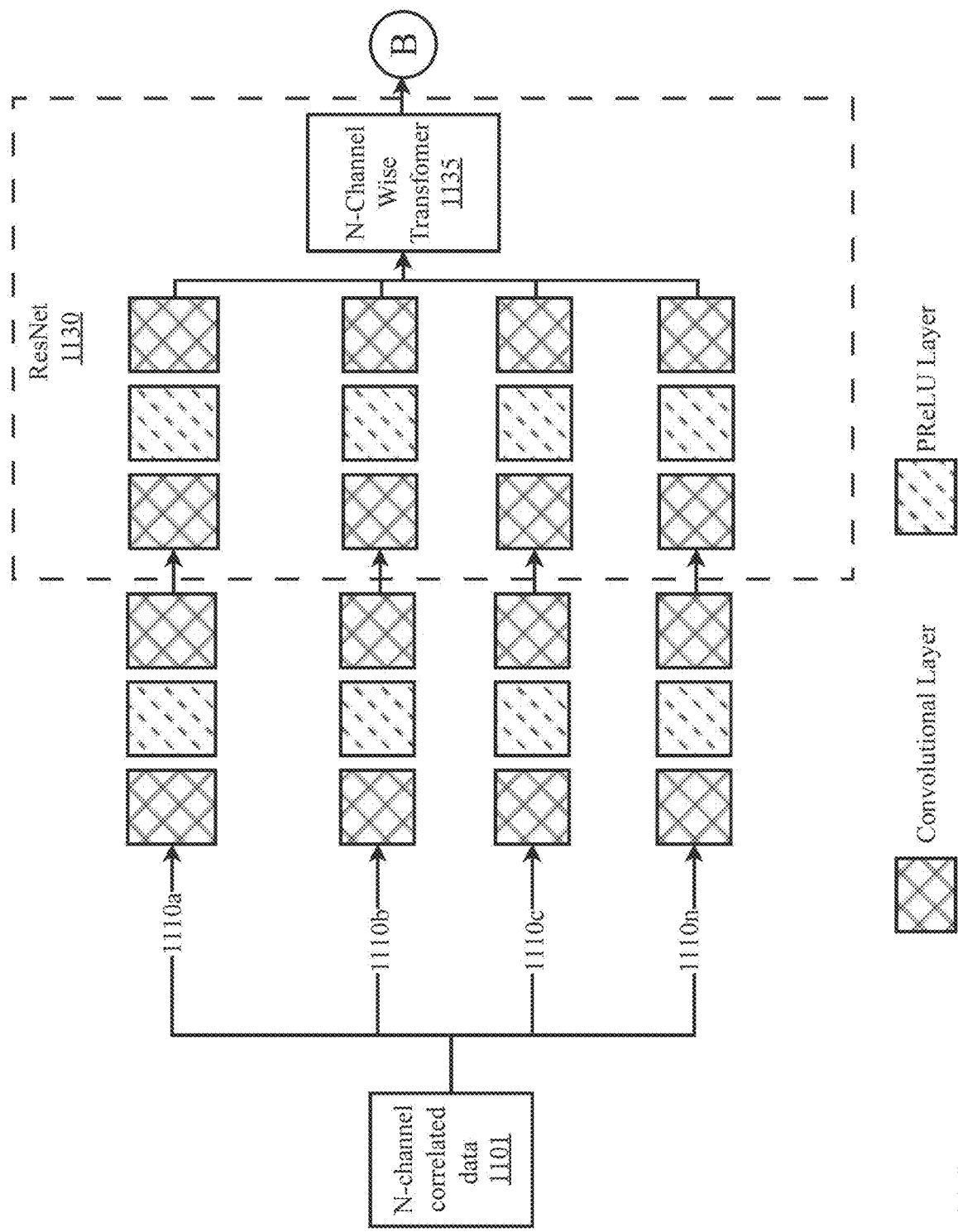
FIGS. 11A and 11B illustrate an exemplary architecture for an AI deblocking network configured to provide deblocking for a general N-channel data stream, according to an embodiment.
Figure 11B:
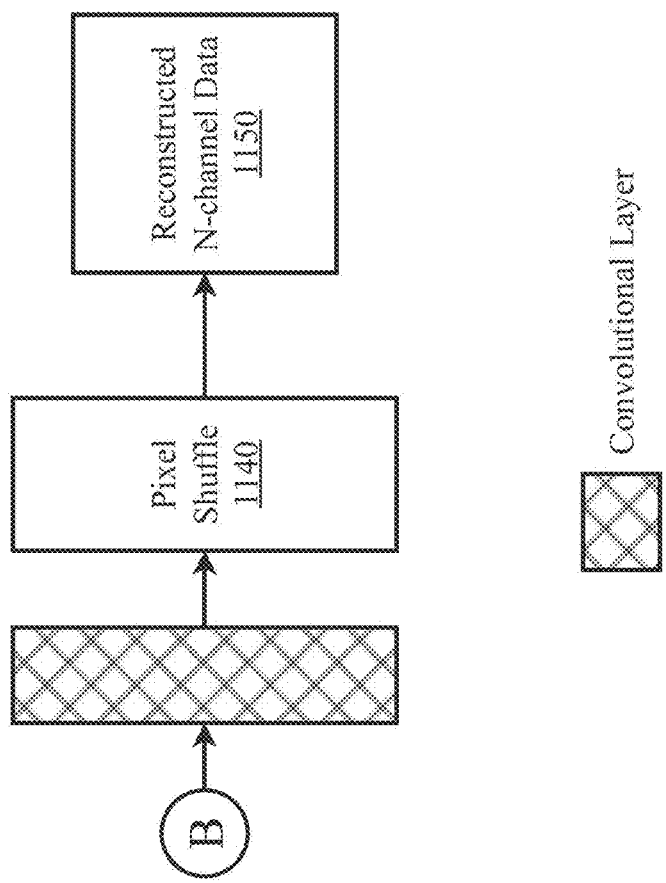

FIGS. 11A and 11B illustrate an exemplary architecture for an AI deblocking network configured to provide deblocking for a general N-channel data stream, according to an embodiment. The term "N-channel" refers to data that is composed of multiple distinct channels of modalities, where each channel represents a different aspect of type of information. These channels can exist in various forms, such as sensor readings, image color channels, or data streams, and they are often used together to provide a more comprehensive understanding of the underlying phenomenon. Examples of N-channel data 1101 include, but is not limited to, RGB images (e.g., in digital images, the red, green, and blue channels represent different color information; combining these channels allows for the representation of a wide range of colors), medical imaging (e.g., may include Magnetic Resonance Imaging scans with multiple channels representing different tissue properties, or Computed Tomography scans with channels for various types of X-ray attenuation), audio data (e.g., stereo or multi-channel audio recordings where each channel corresponds to a different microphone or audio source), radar and lidar (e.g., in autonomous vehicles, radar and lidar sensors provide multi-channel data, with each channel capturing information about objects' positions, distances, and reflectivity) SAR image data, text data (e.g., in natural language processing, N-channel data might involve multiple sources of text, such as social media posts and news articles, each treated as a separate channel to capture different textual contexts), sensor networks (e.g., environmental monitoring systems often employ sensor networks with multiple sensors measuring various parameters like temperature, humidity, air quality, wherein each sensor represents a channel), climate data, financial data, and social network data.

The disclosed AI deblocking network may be trained to process any type of N-channel data, if the N-channel data has a degree of correlation. More correlation between and among the multiple channels yields a more robust and accurate AI deblocking network capable of performing high quality compression artifact removal on the N-channel data stream. A high degree of correlation implies a strong relationship between channels. Using SAR image data has been used herein as an exemplary use case for an AI deblocking network for a N-channel data stream comprising 2 channels, the In-phase and Quadrature components (i.e., I and Q, respectively).

Exemplary data correlations that can be exploited in various implementations of AI deblocking network can include, but are not limited to, spatial correlation, temporal correlation, cross-sectional correlation (e.g., This occurs when different variables measured at the same point in time are related to each other), longitudinal correlation, categorical correlation, rank correlation, time-space correlation, functional correlation, and frequency domain correlation, to name a few.

As shown, an N-channel AI deblocking network may comprise a plurality of branches 1110a-n. The number of branches is determined by the number of channels associated with the data stream. Each branch may initially be processed by a series of convolutional and PRELU layers. Each branch may be processed by resnet 1130 wherein each branch is combined back into a single data stream before being input to N-channel wise transformer 1135, which may be a specific configuration of transformer 300. The output of N-channel wise transformer 1135 may be sent through a final convolutional layer before passing through a last pixel shuffle layer 1140. The output of AI deblocking network for N-channel video/image data is the reconstructed N-channel data 1150.

As an exemplary use case, video/image data may be processed as a 3-channel data stream comprising Green (G), Red (R), and Blue (B) channels. An AI deblocking network may be trained that provides compression artifact removal of video/image data. Such a network would comprise 3 branches, wherein each branch is configured to process one of the three channels (R,G, or B). For example, branch 1110a may correspond to the R-channel, branch 1110b to the G-channel, and branch 1110c to the B-channel. Each of these channels may be processed separately via their respective branches before being combined back together inside resnet 1130 prior to being processed by N-channel wise transformer 1135.

As another exemplary use case, a sensor network comprising a half dozen sensors may be processed as a 6-channel data stream. The exemplary sensor network may include various types of sensors collecting different types of, but still correlated, data. For example, sensor network can include a pressure sensor, a thermal sensor, a barometer, a wind speed sensor, a humidity sensor, and an air quality sensor. These sensors may be correlated to one another in at least one way.

For example, the six sensors in the sensor network may be correlated both temporally and spatially, wherein each sensor provides a time series data stream which can be processed by one of the 6 channels 1110*a-n* of AI deblocking network. As long as AI deblocking network is trained on N-channel data with a high degree of correlation and which is representative of the N-channel data it will encounter during model deployment, it can reconstruct the original data using the methods described herein.

Figure 12:
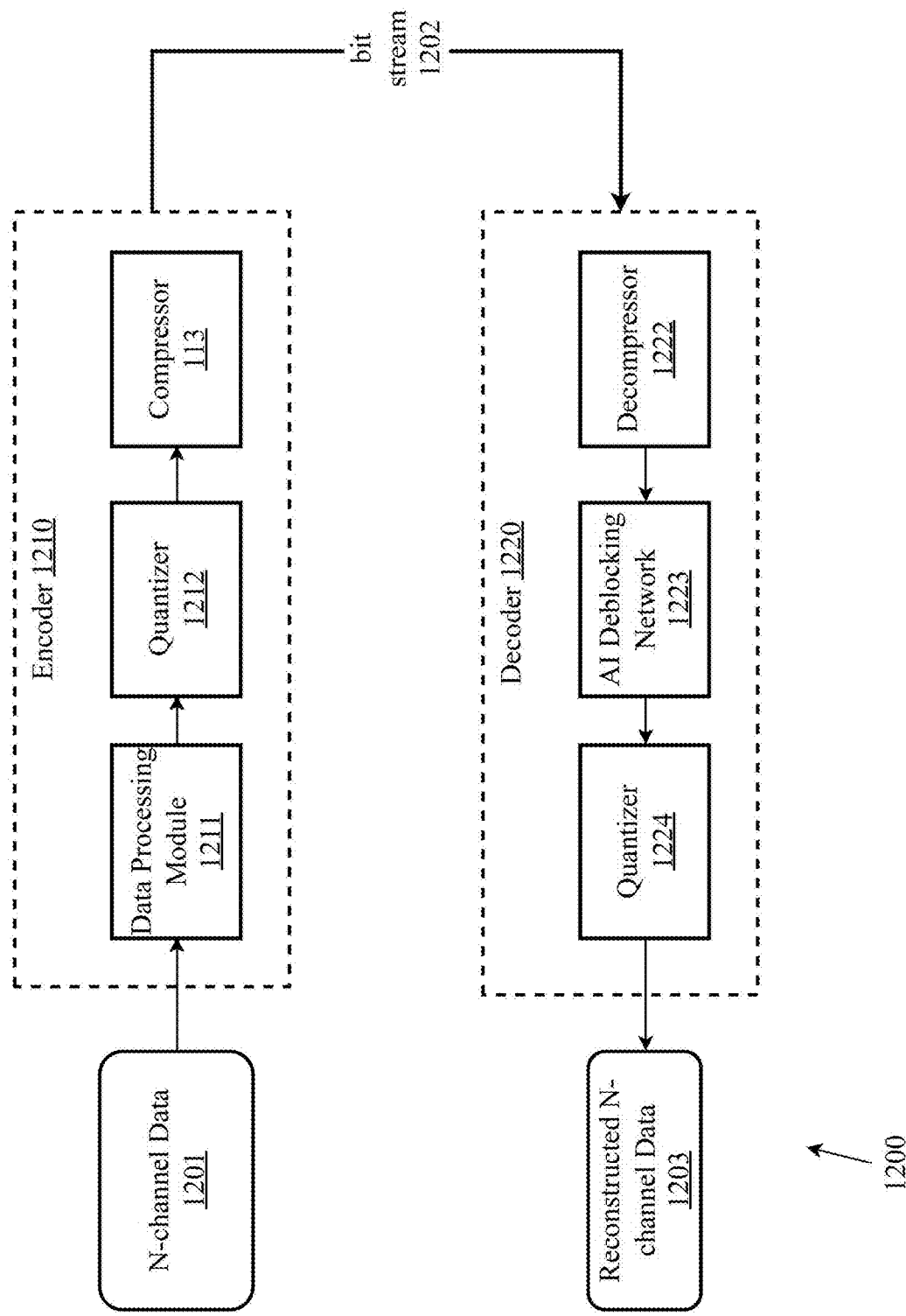
FIG. 12 is a block diagram illustrating an exemplary system architecture for N-channel data compression with predictive recovery, according to an embodiment.

FIG. 12 is a block diagram illustrating an exemplary system architecture 1200 for N-channel data compression with predictive recovery, according to an embodiment. According to the embodiment, the system 1200 comprises an encoder module 1210 configured to receive as input N-channel data 1201 and compress and compact the input data into a bitstream 102, and a decoder module 120 configured to receive and decompress the bitstream 1202 to output a reconstructed N-channel data 1203.

A data processor module 1211 may be present and configured to apply one or more data processing techniques to the raw input data to prepare the data for further processing by encoder 1210. Data processing techniques can include (but are not limited to) any one or more of data cleaning, data transformation, encoding, dimensionality reduction, data slitting, and/or the like.

After data processing, a quantizer 1212 performs uniform quantization on the n-number of channels. Quantization is a process used in various fields, including signal processing, data compression, and digital image processing, to represent continuous or analog data using a discrete set of values. It involves mapping a range of values to a smaller set of discrete values. Quantization is commonly employed to reduce the storage requirements or computational complexity of digital data while maintaining an acceptable level of fidelity or accuracy. Compressor 1213 may be configured to perform data compression on quantized N-channel data using a suitable conventional compression algorithm.

The resulting encoded bitstream may then be (optionally) input into a lossless compressor (not shown) which can apply data compaction techniques on the received encoded bitstream. An exemplary lossless data compression system which may be integrated in an embodiment of system 1200 is illustrated with reference to FIG. 4-7. For example, lossless compactor may utilize an embodiment of data deconstruction engine 501 and library manager 403 to perform data compaction on the encoded bitstream. The output of the compactor is a compacted bitstream 1202 which can be stored in a database, requiring much less space than would have been necessary to store the raw N-channel data, or it can be transmitted to some other endpoint.

At the endpoint which receives the transmitted compacted bitstream 1202 may be decoder module 1220 configured to restore the compacted data into the original SAR image by essentially reversing the process conducted at encoder module 1210. The received bitstream may first be (optionally) passed through a lossless compactor which de-compacts the data into an encoded bitstream. In an embodiment, a data reconstruction engine 601 may be implemented to restore the compacted bitstream into its encoded format. The encoded bitstream may flow from compactor to decompressor 1222 wherein a data compaction technique may be used to decompress the encoded bitstream into the I/Q channels. It should be appreciated that lossless compactor components are optional components of the system, and may or may not be present in the system, dependent upon the embodiment.

According to the embodiment, an Artificial Intelligence (AI) deblocking network 1223 is present and configured to utilize a trained deep learning network to provide compression artifact removal as part of the decoding process. AI deblocking network 1223 may leverage the relationship demonstrated between the various N-channels of a data stream to enhance the reconstructed N-channel data 1203. Effectively, AI deblocking network 1223 provides an improved and novel method for removing compression artifacts that occur during lossy compression/decompression using a network designed during the training process to simultaneously address the removal of artifacts and maintain fidelity of the original N-channel data signal, ensuring a comprehensive optimization of the network during the training stages.

The output of AI deblocking network 1223 may be dequantized by quantizer 1224, restoring the n-channels to their initial dynamic range. The dequantized n-channel data may be reconstructed and output 1203 by decoder module 1220 or stored in a database.

Figure 13:
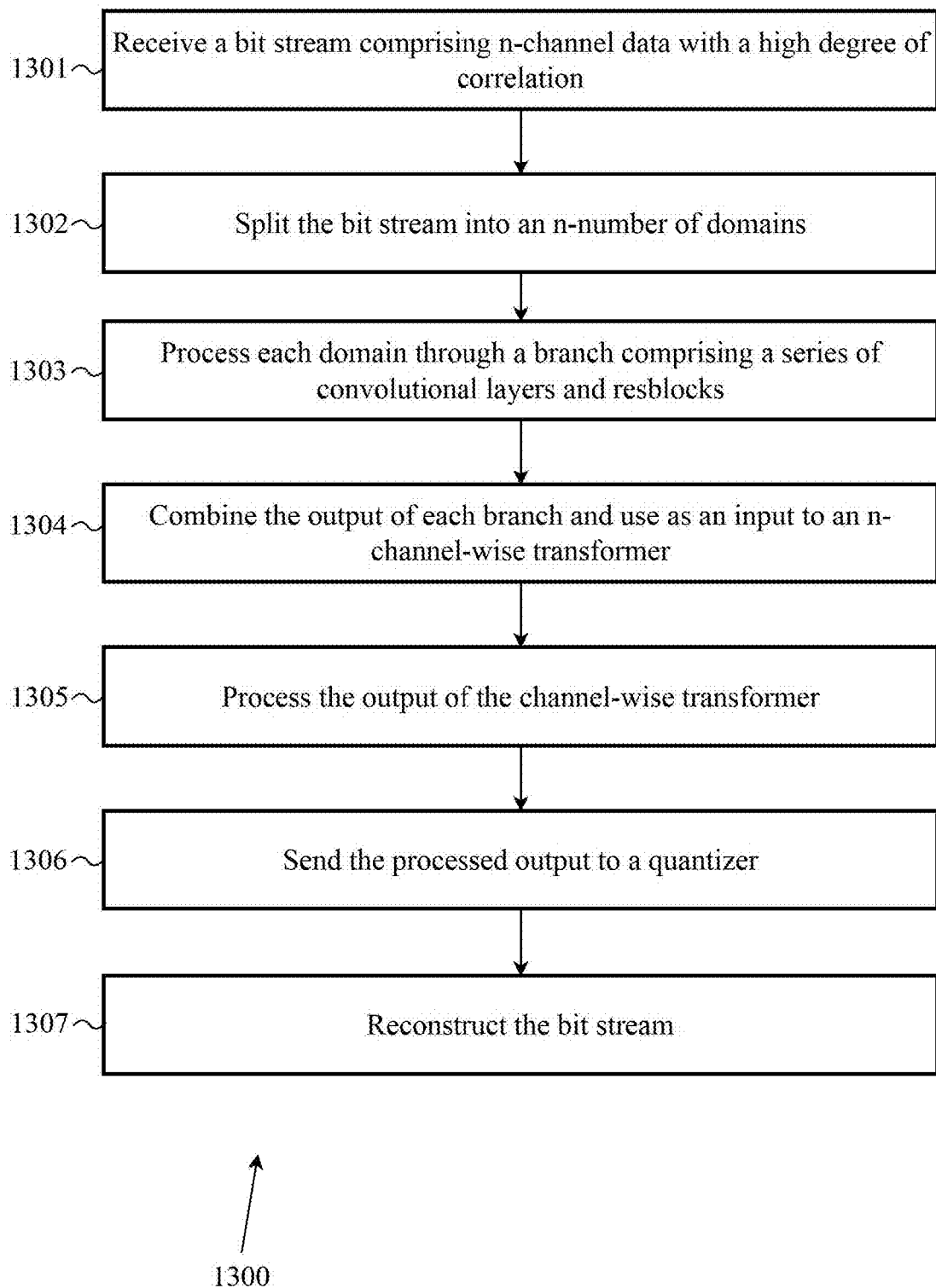
FIG. 13 is a flow diagram illustrating an exemplary method for processing a compressed n-channel bit stream using an AI deblocking network, according to an embodiment.

FIG. 13 is a flow diagram illustrating an exemplary method for processing a compressed n-channel bit stream using an AI deblocking network, according to an embodiment. According to the embodiment, the process begins at step 1301 when a decoder module 1220 receives, retrieves, or otherwise obtains a bit stream comprising n-channel data with a high degree of correlation. At step 1302, the bit stream is split into an n-number of domains. For example, if the received bit stream comprises image data in the form of R-,G,- and B-channels, then the bit stream would be split into 3 domains, one for each color (RGB). At step 1303, each domain is processed through a branch comprising a series of convolutional layers and ResBlocks. The number of layers and composition of said layers may depend upon the embodiment and the n-channel data being processed. At step 1304, the output of each branch is combined back into a single bitstream and used as an input into an n-channel wise transformer 1135. At step 1305, the output of the channel-wise transformer may be processed through one or more convolutional layers and/or transformation layers, according to various implementations. At step 1306, the processed output may be sent to a quantizer for upscaling and other data processing tasks. As a last step 1307, the bit stream may be reconstructed into its original uncompressed form.

Figure 14:
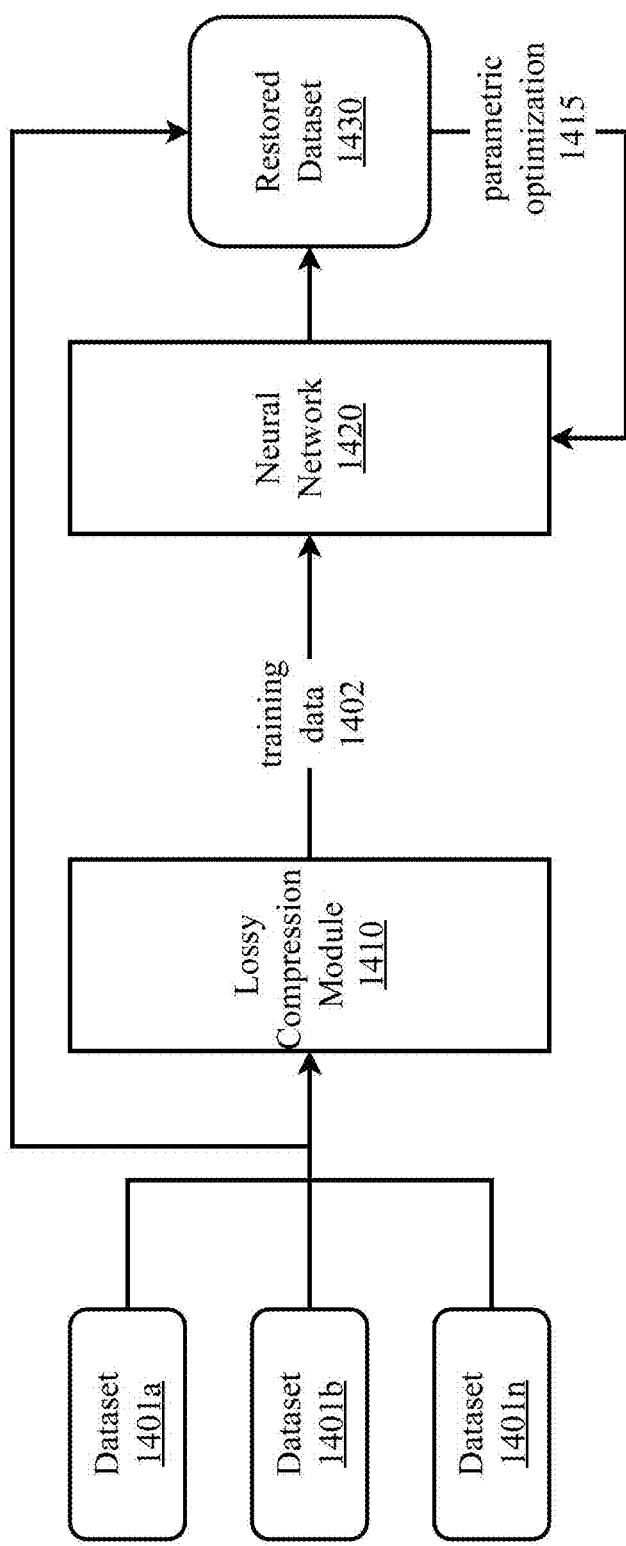
FIG. 14 is a block diagram illustrating a system for training a neural network to perform upsampling of decompressed data after lossy compression, according to an embodiment.

FIG. 14 is a block diagram illustrating a system for training a neural network to perform upsampling of decompressed data after lossy compression, according to an embodiment. The neural network may be referred to herein as a neural upsampler. According to the embodiment, a neural upsampler 1430 may be trained by taking training data 1402 which may comprise sets of two or more correlated datasets 101*a-n* and performing whatever processing that is done to compress the data. This processing is dependent upon the type of data and may be different in various embodiments of the disclosed system and methods. For example, in the SAR imagery use case, the processing and lossy compression steps used quantization and HEVC compression of the I and Q images. The sets of compressed data may be used as input training data 1402 into the neural network 1420 wherein the target output is the original uncompressed data. Because there is correlation between the two or more datasets, the neural upsampler learns how to restore "lost" data by leveraging the cross-correlations.

For each type of input data, there may be different compression techniques used, and different data conditioning for feeding into the neural upsampler. For example, if the input datasets 101*a-n* comprise a half dozen correlated time series from six sensors arranged on a machine, then delta encoding or a swinging door algorithm may be implemented for data compression and processing.

The neural network 1420 may process the training data 1402 to generate model training output in the form of restored dataset 1430. The neural network output may be compared against the original dataset to check the model's precision and performance. If the model output does not satisfy a given criteria or some performance threshold, then parametric optimization 1415 may occur wherein the training parameters and/or network hyperparameters may be updated and applied to the next round of neural network training.

Figure 15:
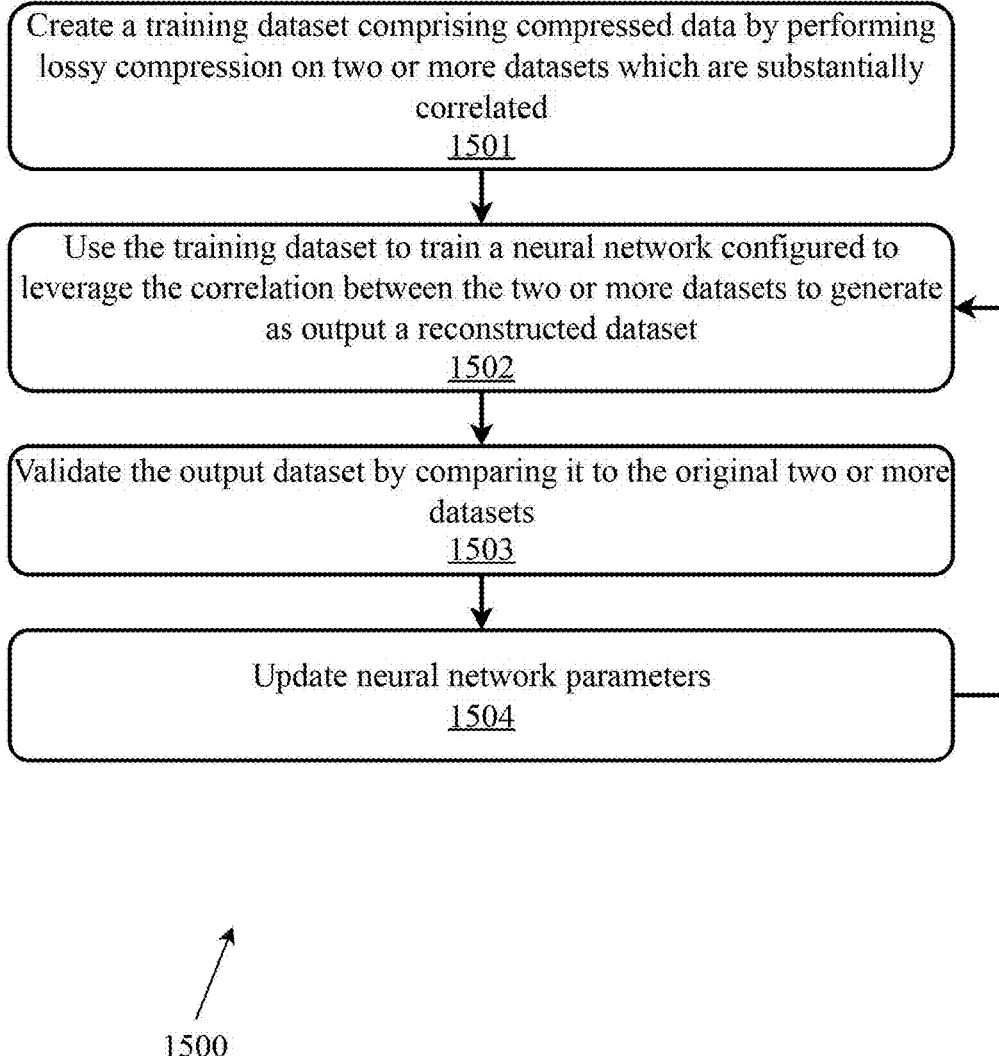
FIG. 15 is a flow diagram illustrating an exemplary method for training a neural network to perform upsampling of decompressed data after lossy compression, according to an embodiment.

FIG. 15 is a flow diagram illustrating an exemplary method 1500 for training a neural network to perform upsampling of decompressed data after lossy compression, according to an embodiment. According to an embodiment, the process begins at step 1501 by creating a training dataset comprising compressed data by performing lossy compression on two or more datasets which are substantially correlated. As a next step 1502, the training dataset is used to train a neural network (i.e., neural upsampler) configured to leverage the correlation between the two or more datasets to generate as output a reconstructed dataset. At step 1503, the output of the neural network is compared to the original two more datasets to determine if the performance of the neural network at reconstructing the compressed data. If the model performance is not satisfactory, which may be determined by a set of criteria or some performance metric or threshold, then the neural network model parameters and/or hyperparameters may be updated 1504 and applied to the next round of training as the process moves to step 1502 and iterates through the method again.

Figure 16:
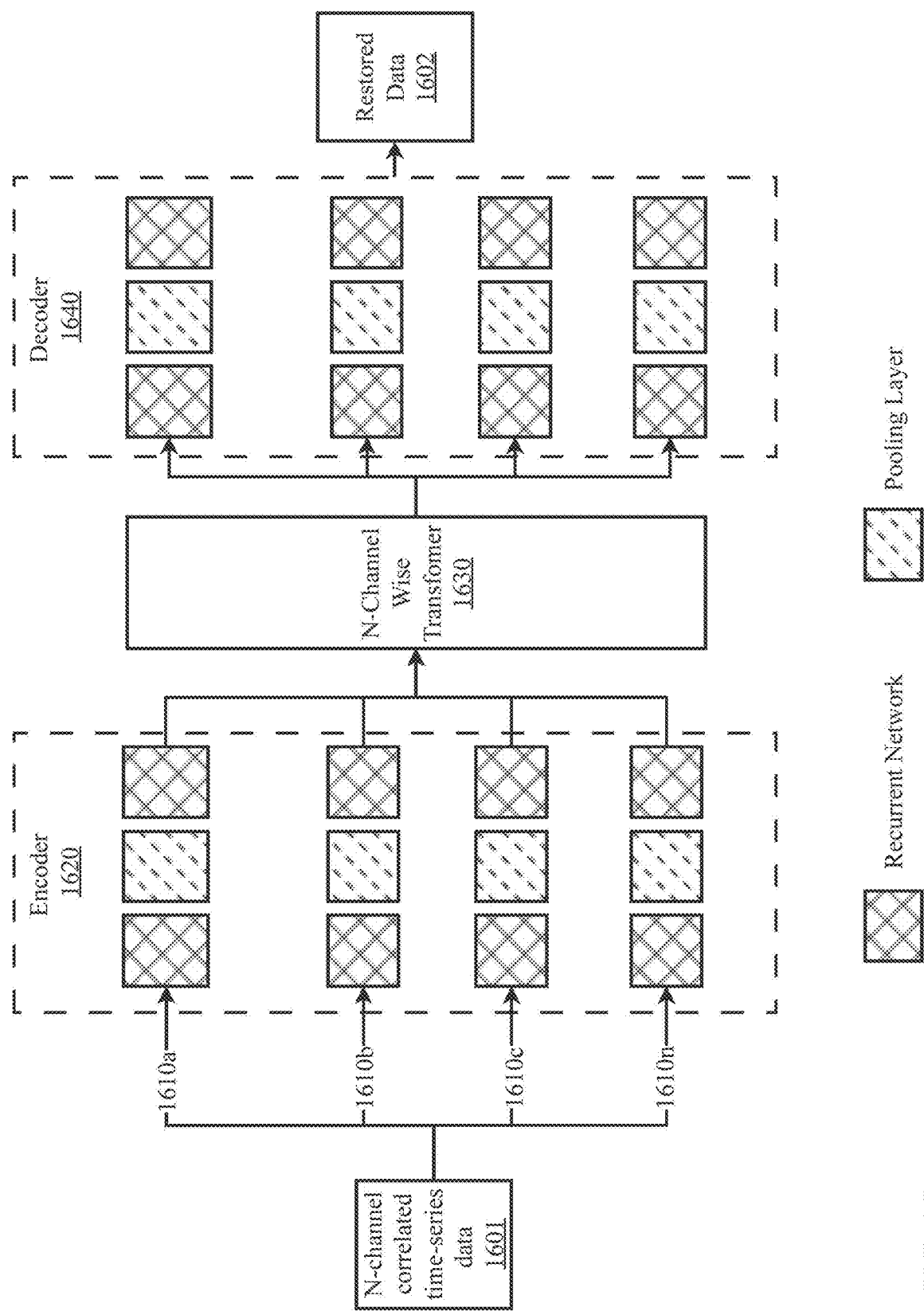
FIG. 16 is a block diagram illustrating an exemplary architecture for a neural upsampler configured to process N-channel time-series data, according to an embodiment.

FIG. 16 is a block diagram illustrating an exemplary architecture for a neural upsampler configured to process N-channel time-series data, according to an embodiment. The neural upsampler may comprise a trained deep learning algorithm. According to the embodiment, a neural upsampler configured to process time-series data may comprise a recurrent autoencoder with an n-channel transformer attention network. In such an embodiment, the neural upsampler may be trained to process decompressed time-series data wherein the output of the upsampler is restored time-series data (i.e., restore most of the lost data due to the lossy compression). The upsampler may receive decompressed n-channel time-series data comprising two or more data sets of time-series data which are substantially correlated. For example, the two or more data sets may comprise multiple sets of Internet of Things (IoT) sensor data from sensors that are likely to be temporally correlated. For instance, consider a large number of sensors on a single complex machine (e.g., a combine tractor, a 3D printer, construction equipment, etc.) or a large number of sensors in a complex systems such as a pipeline or refinery.

The n-channel time-series data 1601 may be received and split into separate channels 1610*a-n* to be processed individually by encoder 1620. In some embodiments, encoder 1620 may employ a series of various data processing layers which may comprise recurrent neural network (RNN) layers, pooling layers, PRELU layers, and/or the like. In some implementations, one or more of the RNN layers may comprise a Long Short-Term Memory (LSTM) network. In some implementations, one or more of the RNN layers may comprise a sequence-to-sequence model. In yet another implementation, the one or more RNN layer may comprise a gate recurrent unit (GRU). Each channel may be processed by its own series of network layers wherein the encoder 1620 can learn a representation of the input data which can be used to determine the defining features of the input data. Each individual channel then feeds into an n-channel wise transformer 1630 which can learn the interdependencies between the two or more channels of correlated time-series data. The output of the n-channel wise transformer 1630 is fed into the decoder 1640 component of the recurrent autoencoder in order to restore missing data lost due to a lossy compression implemented on the time-series data. N-channel wise transformer 1630 is designed so that it can weigh the importance of different parts of the input data and then capture long-range dependencies between and among the input data. The decoder may process the output of the n-channel wise transformer 1630 into separate channels comprising various layers as described above. The output of decoder 1640 is the restored time-series data 1602, wherein most of the data which was "lost" during lossy compression can be recovered using the neural upsampler which leverages the interdependencies hidden within correlated datasets.

In addition to RNNs and their variants, other neural network architectures like CNNs and hybrid models that combine CNNs and RNNs can also be implemented for processing time series and sensor data, particularly when dealing with sensor data that can be structured as images or spectrograms. For example, if you had, say, 128 time series streams, it could be structured as two 64×64 pixel images (64 times series each, each with 64 time steps), and then use the same approach as the described above with respect to the SAR image use case. In an embodiment, a one-dimensional CNN can be used as a data processing layer in encoder 1620 and/or decoder 1640. The selection of the neural network architecture for time series data processing may be based on various factors including, but not limited to, the length of the input sequences, the frequency and regularity of the data points, the need to handle multivariate input data, the presence of exogenous variables or covariates, the computational resources available, and/or the like.

The exemplary time-series neural upsampler described in FIG. 16 may be trained on a training dataset comprising a plurality of compressed time-series data sourced from two or more datasets which are substantially correlated. For example, in a use case directed towards neural upsampling of IoT sensor data, the neural upsampler may be trained on a dataset comprising compressed IoT sensor data. During training, the output of the neural upsampler may be compared against the non-compressed version of the IoT sensor data to determine the neural upsampler's performance on restoring lost information.

Figure 17:
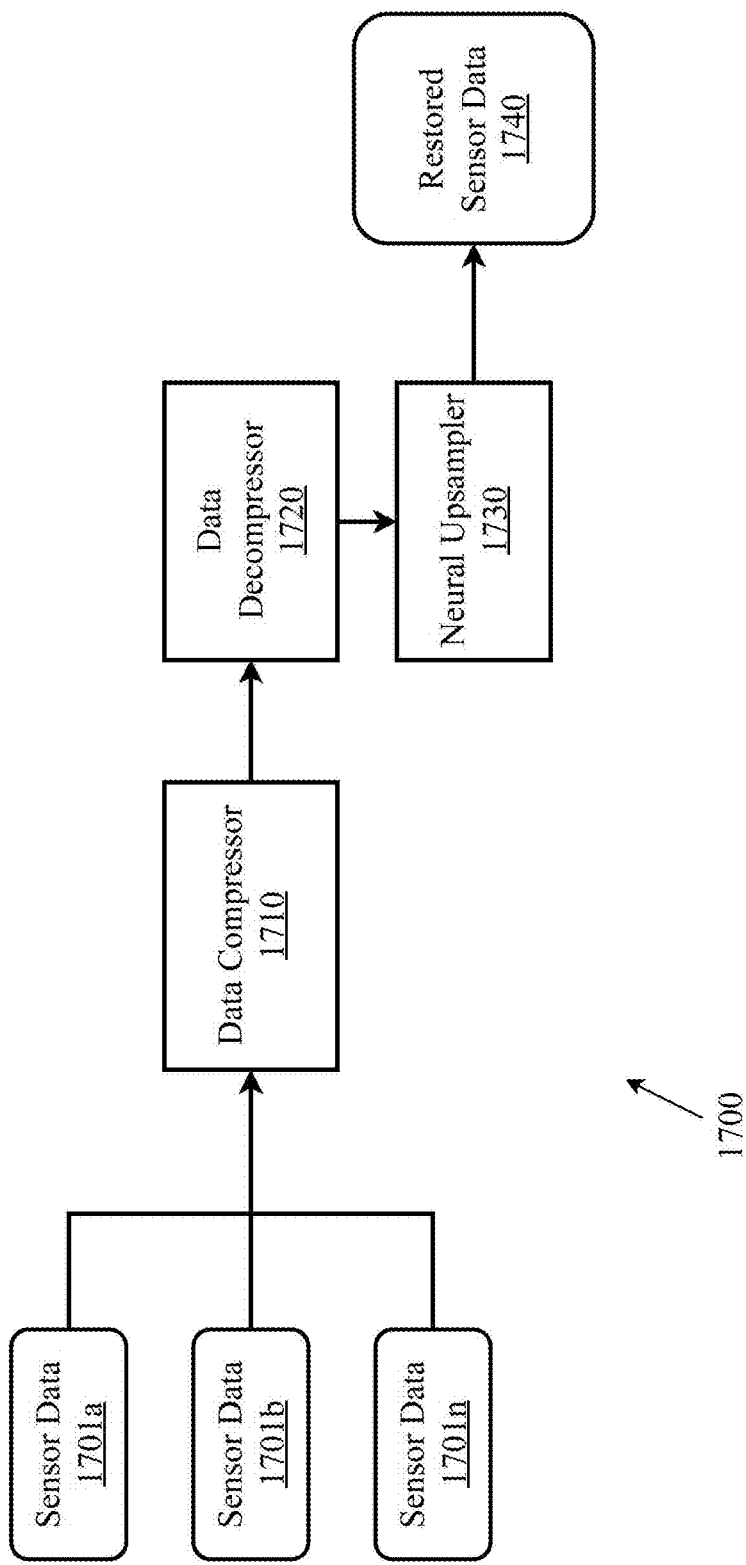
FIG. 17 is a block diagram illustrating an exemplary system architecture for upsampling of decompressed sensor data after lossy compression using a neural network, according to an embodiment.

FIG. 17 is a block diagram illustrating an exemplary system architecture 1700 for upsampling of decompressed sensor data after lossy compression using a neural network, according to an embodiment. According to the embodiment, a neural upsampler 1730 is present and configured to receive decompressed sensor data (e.g., time-series data obtained from an IoT device) and restore the decompressed data by leveraging learned data correlations and inter- and intra-dependencies. According to an embodiment, the system may receive a plurality of sensor data 1701*a-n* from two or more sensors/devices, wherein the sensor data are substantially correlated. In an embodiment, the plurality of sensor data 1701*a-n* comprises time-series data. Time-series data received from two or more sensors may be temporally correlated, for example, IoT data from a personal fitness device and a blood glucose monitoring device during the time when a user of both devices is exercising may be correlated in time and by heart rate. As another example, a large number of sensors used to monitor a manufacturing facility may be correlated temporally.

A data compressor 1710 is present and configured to utilize one or more data compression methods on received sensor data 1701*a-n*. The data compression method chosen must be a lossy compression method. Exemplary types of lossy compression that may be used in some embodiments may be directed towards image or audio compression such as JPEG and MP3, respectively. For time series data lossy compression methods that may be implemented include (but is not limited to) one or more of the following: delta encoding, swinging door algorithm, batching, data aggregation, feature extraction. In an implementation, data compressor 1710 may implement network protocols specific for IoT such as message queuing telemetry transport (MQTT) for supporting message compression on the application layer and/or constrained application protocol (CoAP) which supports constrained nodes and networks and can be used with compression.

The compressed multi-channel sensor data 1701*a-n* may be decompressed by a data decompressor 1720 which can utilize one or more data decompression methods known to those with skill in the art. The output of data decompressor 1720 is a sensor data stream(s) of decompressed data which is missing information due to the lossy nature of the compression/decompression methods used. The decompressed sensor data stream(s) may be passed to neural upsampler 1730 which can utilize a trained neural network to restore most of the "lost" information associated with the decompressed sensor data stream(s) by leveraging the learned correlation(s) between and among the various sensor data streams. The output of neural upsampler 1730 is restored sensor data 1740.

Figure 18:
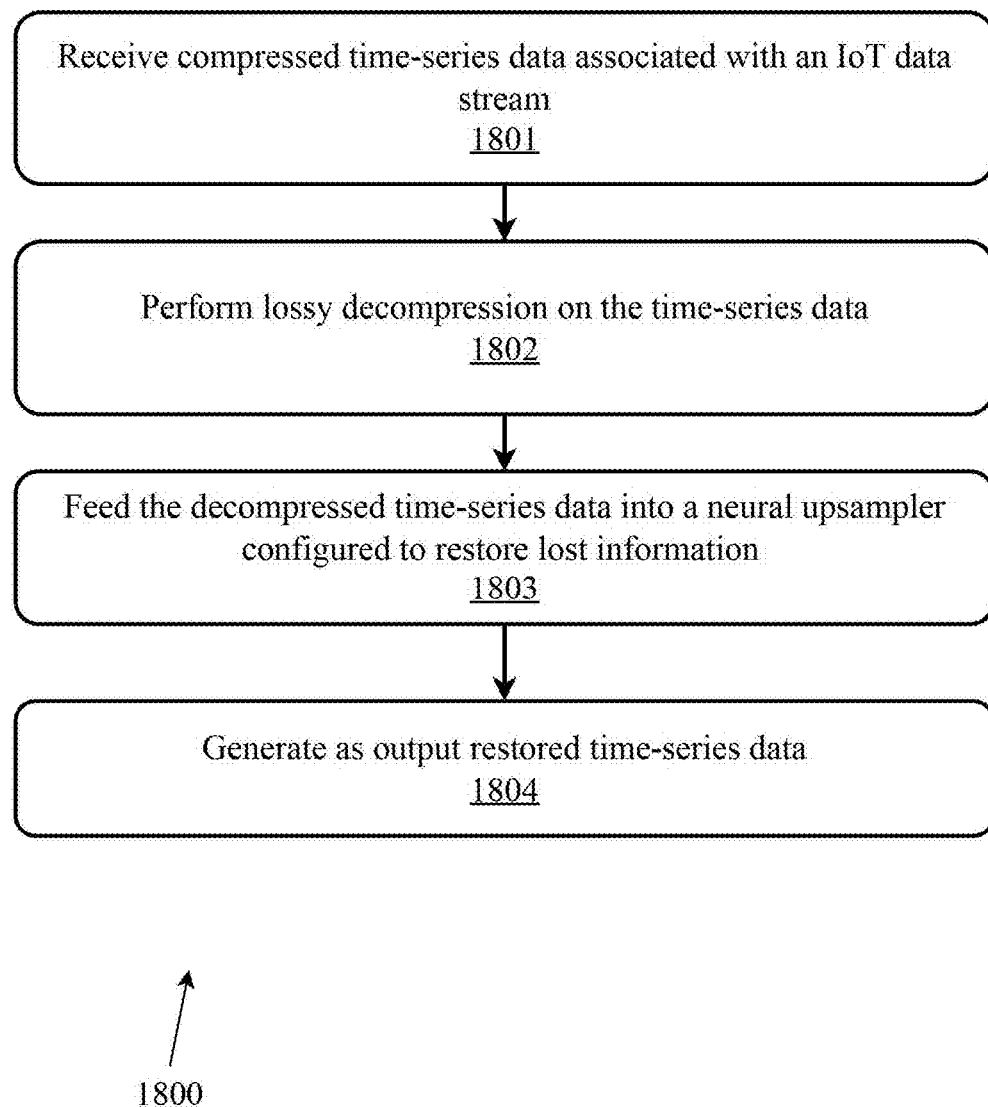
FIG. 18 is a flow diagram illustrating an exemplary method for performing neural upsampling of two or more time-series data streams, according to an embodiment.

FIG. 18 is a flow diagram illustrating an exemplary method 1800 for performing neural upsampling of two or more time-series data streams, according to an embodiment. In this example, the two or more time-series streams may be associated with large sets of IoT sensors/devices. The two or more time-series streams are substantially correlated. The two or more time-series data streams may be temporally correlated. For example, a plurality of IoT sensors may be time-synchronized to better understand cause-and-effect relationships.

A neural upsampler which has been trained on compressed time-series data associated with one or more IoT sensor channels is present and configured to restore time-series data which has undergone lossy data compression and decompression by leveraging the correlation between the sensor data streams. A non-exhaustive list of time-series data correlations that may be used by an embodiment of the system and method can include cross-correlation and autocorrelation.

The two or more time-series data streams may be processed by a data compressor 1710 employing a lossy compression method. The lossy compression method may implement a lossy compression algorithm appropriate for compressing time-series data. The choice of compression implementation may be based on various factors including, but not limited to, the type of data being processed, the computational resources and time required, and the use case of the upsampler. Exemplary time-series data compression techniques which may be used include, but are not limited to, delta encoding, swinging door algorithm data aggregation, feature extraction, and batching, to name a few. The compressed time series data may be store in a database and/or transmitted to an endpoint. The compressed time-series data may be sent to a data decompressor 1720 which may employ a lossy decompression technique on the compressed time-series data. The decompressed data may be sent to the neural upsampler which can restore the decompressed data to nearly its original state by leveraging the temporal (and/or other) correlation between the time-series IoT sensor data streams. The compressed time-series data is received by data decompressor 1720 at step 1801. At data decompressor 1720 the compressed time-series data may be decompressed via a lossy decompression algorithm at step 1802.

A neural upsampler for restoration of time-series (e.g., IoT sensor data) data received from two or more data channels may be trained using two or more datasets comprising compressed time-series data which is substantially correlated. For example, the two or more datasets may comprise time-series data from a plurality of sensors affixed to a long-haul semi-truck and configured to monitor various aspects of the vehicles operation and maintenance and report the monitored data to a central data processing unit which can compress and transmit the data for storage or further processing. The two or more sensor channels are correlated in various ways such as temporally. In various embodiments, each channel of the received time-series data may be fed into its own neural network comprising a series of convolutional and/or recurrent and ReLU and/or pooling layers which can be used to learn latent correlations in the feature space that can be used to restore data which has undergone lossy compression. A multi-channel transformer may be configured to receive the output of each of the neural networks produce, learn from the latent correlation in the feature space, and produce reconstructed time-series data. At step 1803, the decompressed time-series data may be used as input to the trained neural upsampler configured to restore the lost information of the decompressed time-series data. The neural upsampler can process the decompressed data to generate as output restored time-series data at step 1804.

Figure 20:
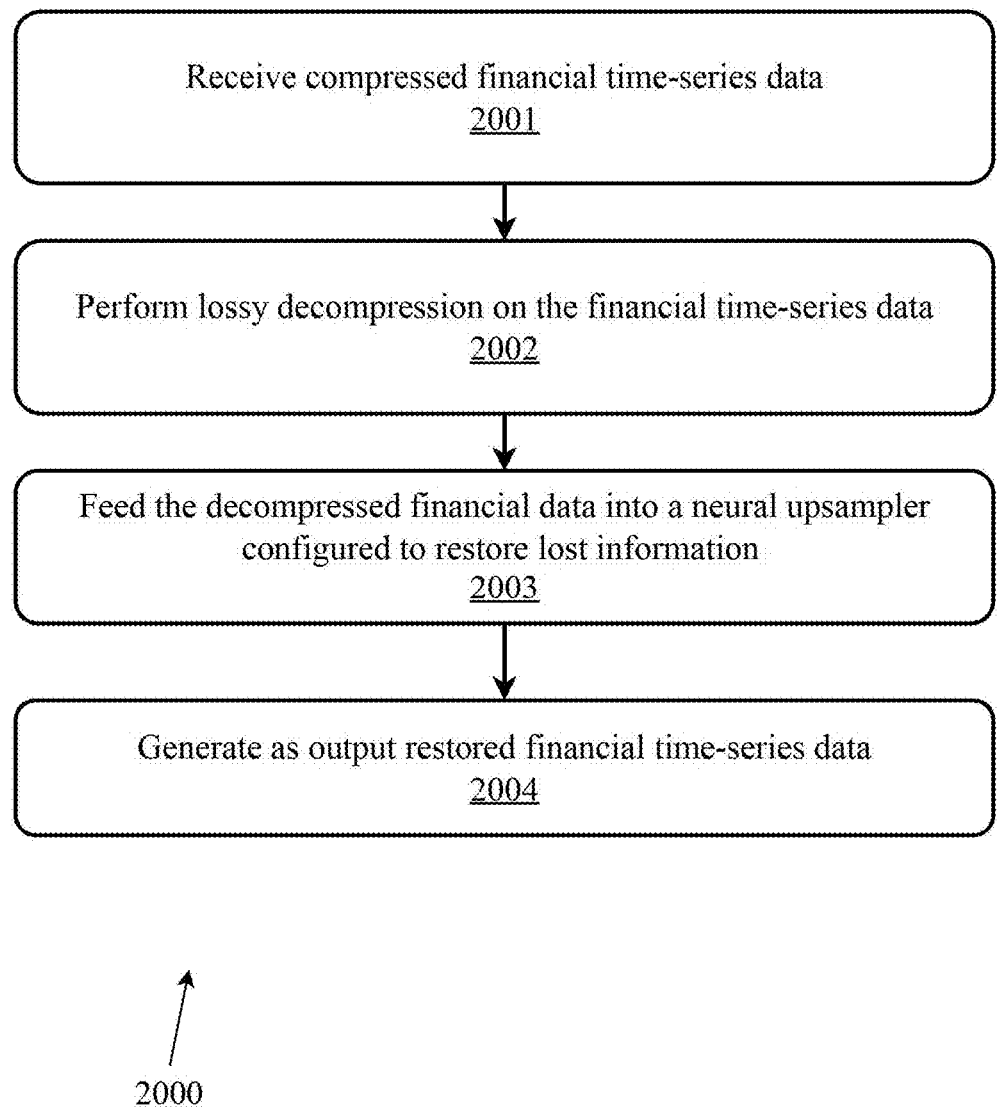
FIG. 20 is a flow diagram illustrating an exemplary method for performing neural upsampling of two or more financial time-series datasets, according to an embodiment.

FIG. 20 is a flow diagram illustrating an exemplary method 2000 for performing neural upsampling of two or more financial time-series datasets, according to an embodiment. In this example, the two or more financial datasets (also referred to as data streams) may be associated with interest rates and bond yields. The two or more financial datasets are substantially correlated as described herein. For example, when interest rates rise, bond prices tend to fall, leading to an inverse correlation between interest rates and bond yields. Furthermore, the datasets may also be temporally correlated.

A neural upsampler which has been trained on compressed financial time-series data is present and configured to restore time-series data which has undergone lossy data compression and decompression by leveraging the correlation between the genomic datasets. A non-exhaustive list of genomic data correlations that may be used by an embodiment of the system and method can include genetic variation and linkage disequilibrium, and haplotype blocks.

The two or more genomic datasets may be processed by a data compressor 1920 employing a lossy compression method. The lossy compression method may implement a lossy compression algorithm appropriate for compressing genomic data. The choice of compression implementation may be based on various factors including, but not limited to, the type of data being processed, the computational resources and time required, and the use case of the upsampler. Exemplary genomic data compression techniques which may be used include, but are not limited to, quality score quantization, reference-based compression, subsampling, and genomic data transformation, to name a few. The compressed genomic data may be stored in a database and/or transmitted to an endpoint. The compressed genomic data may be sent to a data decompressor 1930 which may employ a lossy decompression technique on the compressed genomic data. The decompressed data may be sent to the neural upsampler which can restore the decompressed data to nearly its original state by leveraging the genetic variation (and/or other) correlation between the genomic datasets. The compressed genomic data is received by data decompressor 1930 at step 2001. At data decompressor 1930 the compressed genomic data may be decompressed via a lossy decompression algorithm at step 2002.

A neural upsampler for restoration of financial time-series (e.g., sequence of observations on financial market variables such as stock prices, interest rates, exchange rates, and other economic indicators) data received from two or more data channels may be trained using two or more datasets comprising compressed financial time-series data which is substantially correlated. For example, the two or more datasets may comprise financial time-series data related to unemployment rates and consumer spending. In various embodiments, each channel of the received financial time-series data may be fed into its own neural network comprising a series of convolutional and/or recurrent and ReLU and/or pooling layers which can be used to learn latent correlations in the feature space that can be used to restore data which has undergone lossy compression. A multi-channel transformer may be configured to receive the output that each of the neural networks produce, learn from the latent correlation in the feature space, and produce reconstructed financial time-series data. At step 2003, the decompressed financial time-series data may be used as input to the trained neural upsampler configured to restore the lost information of the decompressed financial time-series data. The neural upsampler can process the decompressed data to generate as output restored financial time-series data at step 2004.

Figure 26:
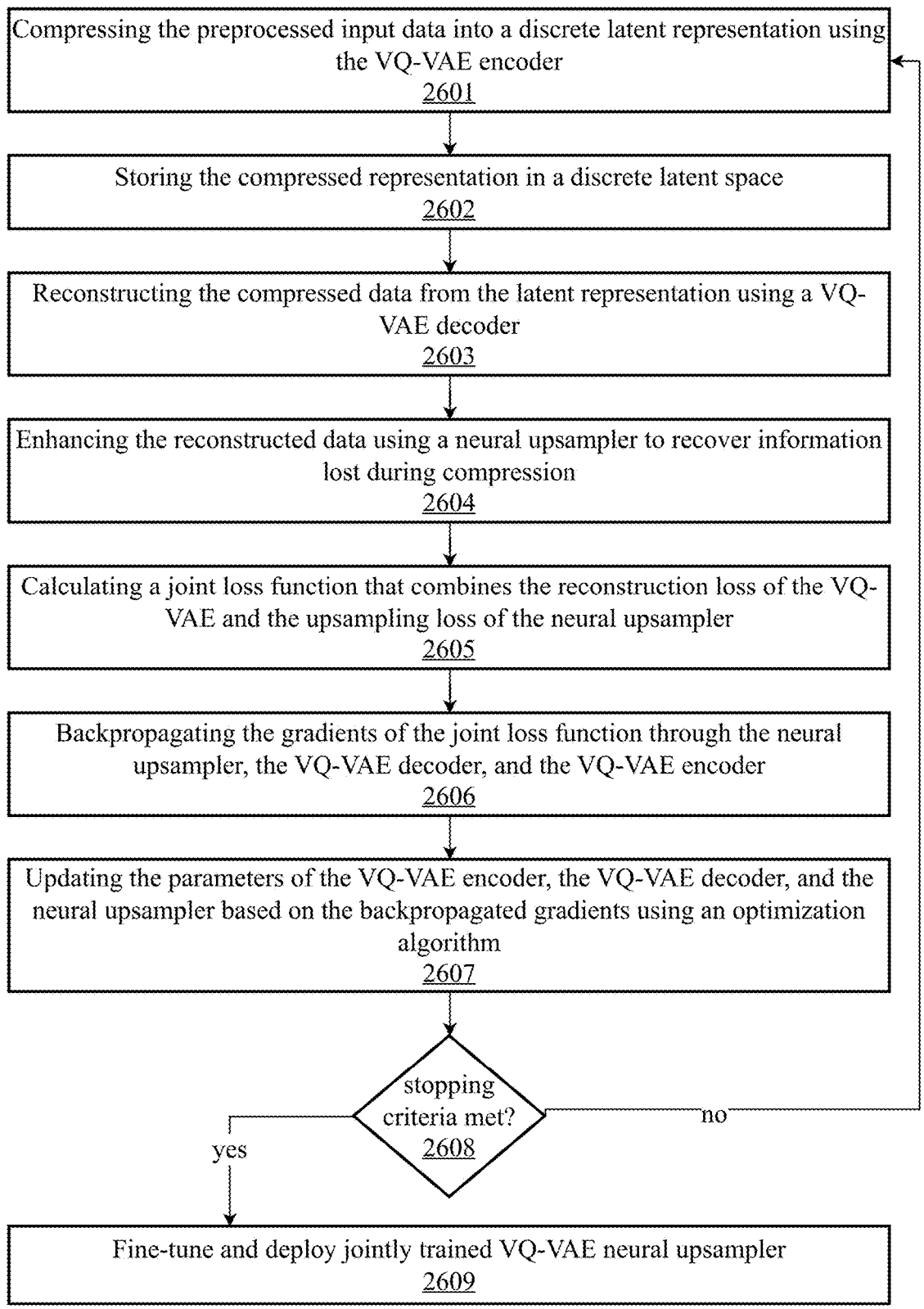
FIG. 26 is a flow diagram illustrating an exemplary method for jointly training a VQ-VAE neural upsampler, according to an embodiment.

FIG. 26 is a flow diagram illustrating an exemplary method for jointly training a VQ-VAE neural upsampler, according to an embodiment. Various parameters of the VQ-VAE encoder, VQ-VAE decoder, and neural upsampler may be initialized prior to training. A plurality of training input data may be preprocessed to ensure it is in a suitable format for model training. At step 2601, the jointly trained system begins training by compressing the preprocessed input data into a discrete latent representation using the VQ-VAE encoder. At step 2602, the system stores the compressed representation in a discrete latent space. At step 2603, the system reconstructs the compressed data from the latent representation using the VQ-VAE decoder. At step 2604, the joint system enhances the reconstructed data using the neural upsampler to recover information lost during compression. At step 2605, the joint system calculates a joint loss function that combines the reconstruction loss of the VQ-VAE and the upsampling loss of the neural upsampler, wherein the reconstruction loss measures the difference between the original input data and the reconstructed data, and the upsampling loss measures the difference between the original input data and the enhanced data. At step 2606, the joint system backpropagates the gradients of the joint loss function through the neural upsampler, the VQ-VAE decoder, and the VQ-VAE encoder. The joint system can then update the parameters of the VQ-VAE encoder, the VQ-VAE decoder, and the neural upsampler based on the backpropagated gradients using an optimization algorithm at step 2607. Step 2601-2607 may be iteratively performed until a stopping criterion is met at check 2608. If the stopping criterion is met, then the process proceeds to step 2609 wherein the joint system fine-tunes the jointly trained VQ-VAE neural upsampler on a validation dataset to improve its performance and generalization ability and saves the jointly trained VQ-VAE neural upsampler for future use in upsampling compressed data.

Figure 27:
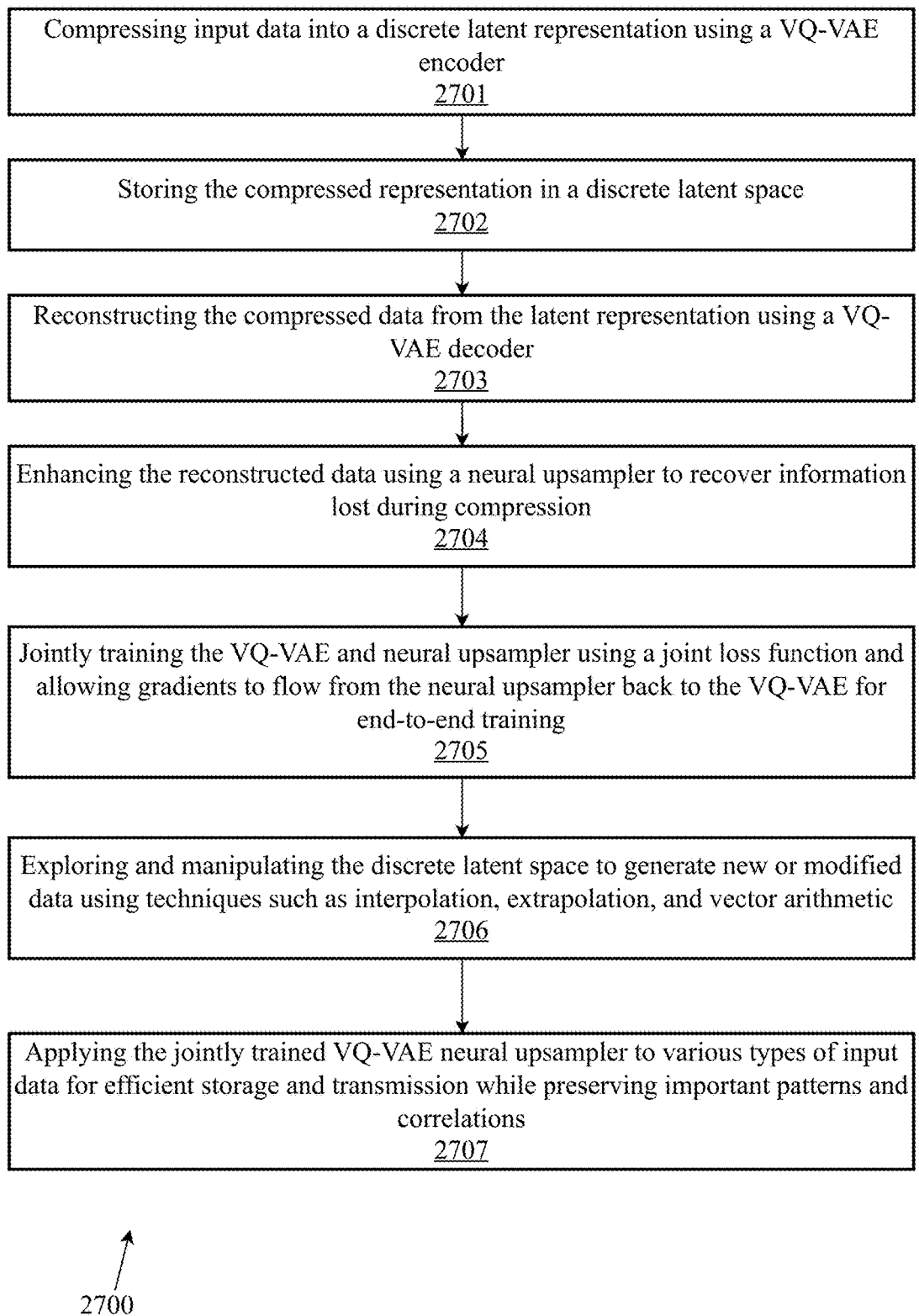
FIG. 27 is a flow diagram illustrating an exemplary method for upsampling compressed data using a jointly trained VQ-VAE neural upsampler, according to an embodiment.

FIG. 27 is a flow diagram illustrating an exemplary method 2700 for upsampling compressed data using a jointly trained VQ-VAE neural upsampler, according to an embodiment. According to the embodiment, the process begins at step 2701 by compressing input data into a discrete latent representation using a VQ-VAE encoder and then storing the compressed representation in a discrete latent space at step 2702. At step 2703 the performs reconstructing the compressed data from the latent representation using a VQ-VAE decoder. At step 2704, the system performs enhancing the reconstructed data using a neural upsampler to recover information lost during compression. As a next step 2705, the system performs jointly training the VQ-VAE and neural upsampler using a joint loss function and allowing gradients to flow from the neural upsampler back to the VQ-VAE for end-to-end training. At step 2706, the system explores and manipulates the discrete latent space to generate new or modified data using techniques such as interpolation, extrapolation, and vector arithmetic. As a last step 2707, the system performs applying the jointly trained VQ-VAE neural upsampler to various types of input data for efficient storage and transmission while preserving important patterns and correlations.

Figure 28:
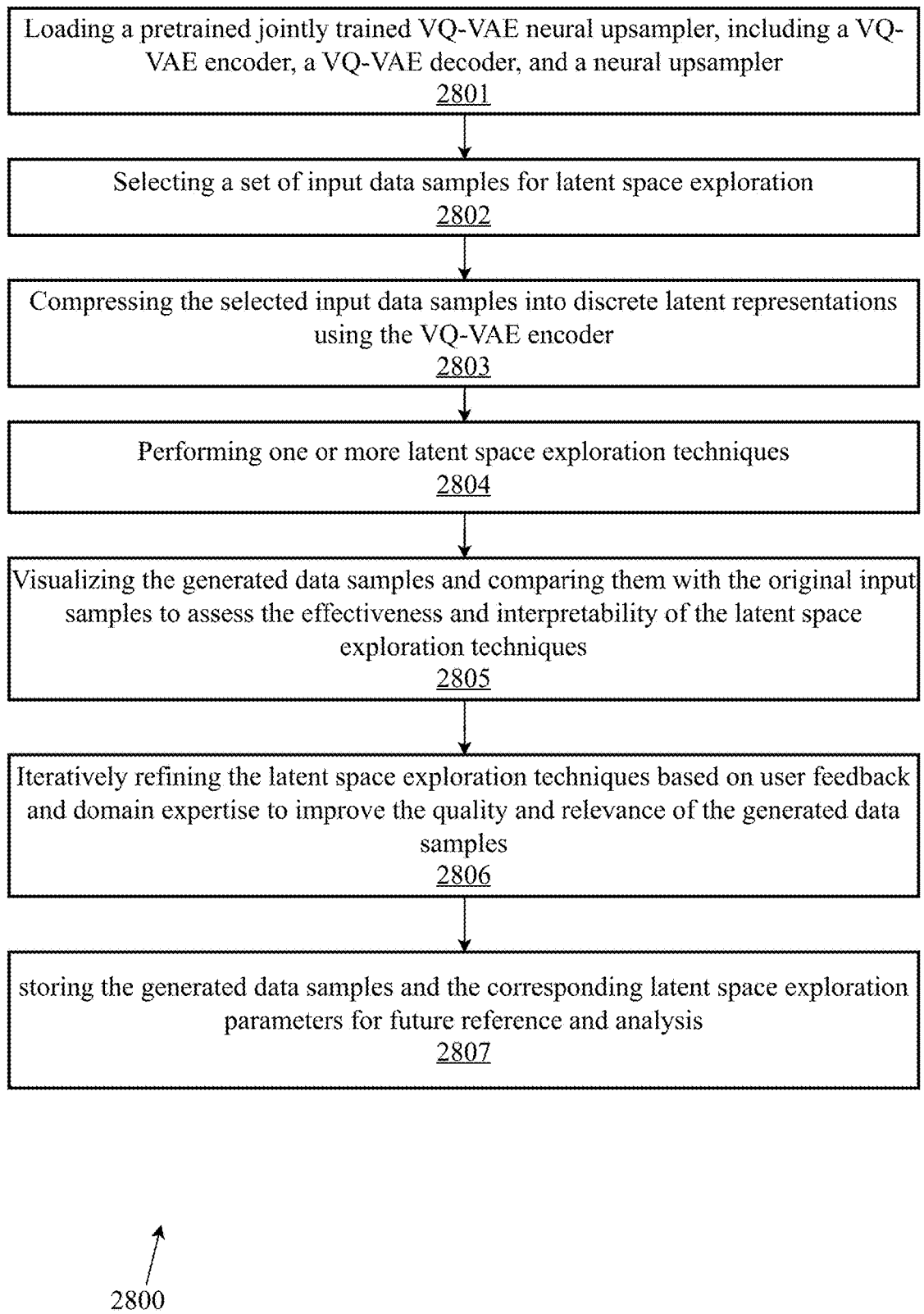
FIG. 28 is a flow diagram illustrating an exemplary method for latent space exploration using a jointly trained VQ-VAE neural upsampler, according to an embodiment.

FIG. 28 is a flow diagram illustrating an exemplary method 2800 for latent space exploration using a jointly trained VQ-VAE neural upsampler, according to an embodiment. According to the embodiment, the process begins at step 2801 by loading a pretrained jointly trained VQ-VAE neural upsampler into a computing system or device, including a VQ-VAE encoder, a VQ-VAE decoder, and a neural upsampler. At step 2802, the system performs selecting a set of input data samples for latent space exploration.

At step 2803, the system performs compressing the selected input data samples into discrete latent representations using the VQ-VAE encoder; At step 2804, performing one or more latent space exploration techniques, comprising one or more of: interpolating between two or more latent representations by computing weighted averages of the corresponding latent vectors, and decoding the interpolated latent vectors using the VQ-VAE decoder and the neural upsampler to generate new data samples that combine the characteristics of the original input samples; extrapolating beyond the range of existing latent representations by extending the latent vectors in specific directions, and decoding the extrapolated latent vectors using the VQ-VAE decoder and the neural upsampler to generate new data samples that extend the patterns or trends present in the original input samples; performing vector arithmetic operations on the latent representations, such as addition or subtraction, to combine or isolate specific attributes or features, and decoding the resulting latent vectors using the VQ-VAE decoder and the neural upsampler to generate new data samples that exhibit the desired characteristics; and modifying specific dimensions or subspaces of the latent representations based on domain knowledge or learned interpretations, and decoding the modified latent vectors using the VQ-VAE decoder and the neural upsampler to generate new data samples that reflect the intended changes.

At step 2804, the system performs visualizing the generated data samples and comparing them with the original input samples to assess the effectiveness and interpretability of the latent space exploration techniques. At step 2805, the system iteratively refines the latent space exploration techniques based on user feedback and domain expertise to improve the quality and relevance of the generated data samples. At step 2806, the system performs storing the generated data samples and the corresponding latent space exploration parameters for future reference and analysis.

Exemplary Computing Environment

Figure 29:
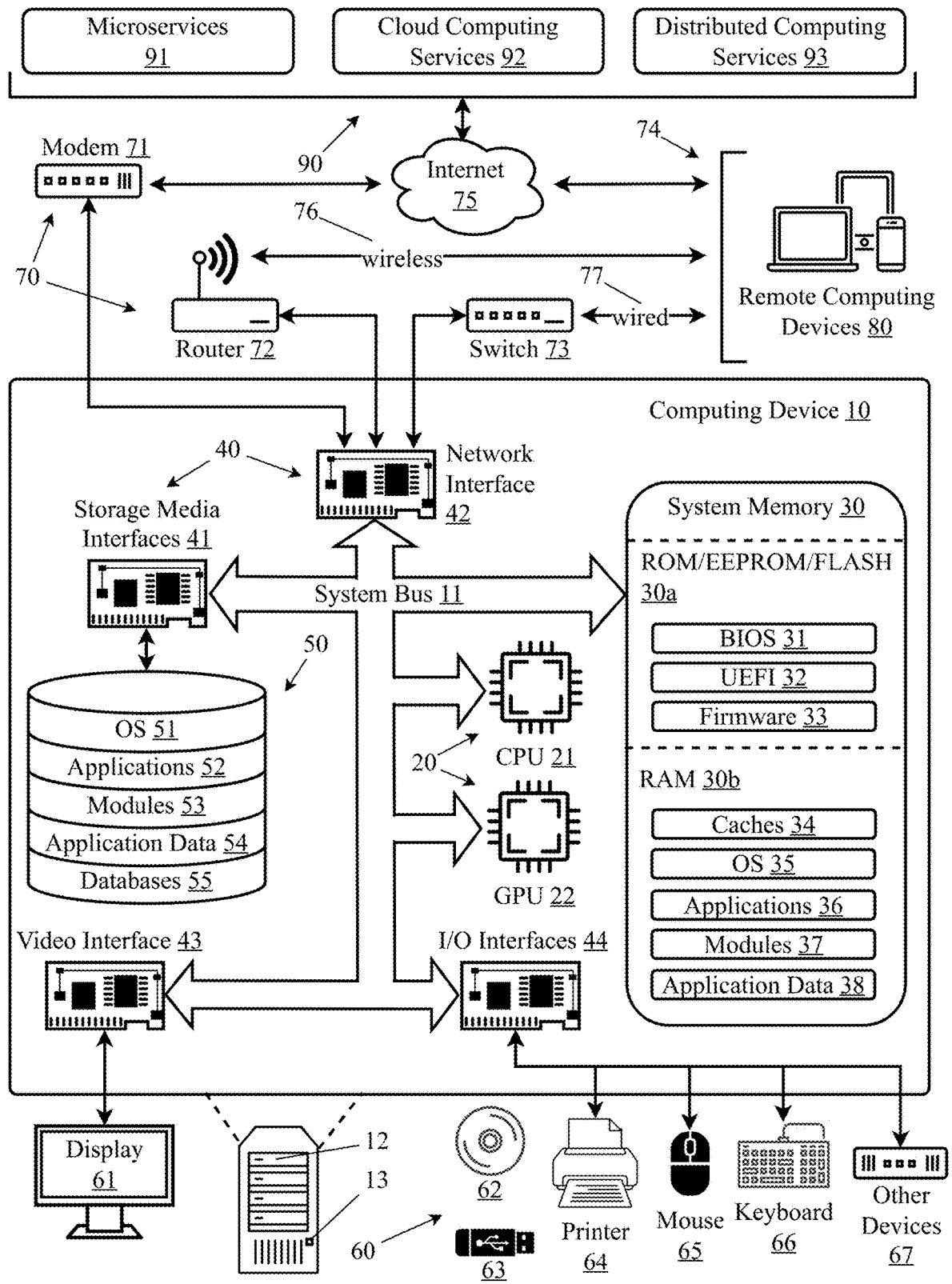
FIG. 29 illustrates an exemplary computing environment on which an embodiment described herein may be implemented, in full or in part.

FIG. 29 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random-access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system.

Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for upsampling compressed data using a jointly trained vector quantized variational autoencoder (VQ-VAE) neural upsampler, comprising:
   a computing device comprising at least a memory and a processor;
   a plurality of programming instructions stored in the memory and operable on the processor, wherein the plurality of programming instructions, when operating on the processor, cause the computing device to:
   compress input data into a discrete latent representation using a VQ-VAE encoder;
   store the compressed representation in a discrete latent space;
   reconstruct the compressed data from the latent representation using a VQ-VAE decoder;
   enhance the reconstructed data using a neural upsampler to recover information lost during compression;
   jointly train the VQ-VAE and neural upsampler by iteratively updating their parameters based on a joint loss function that combines the reconstruction loss of the VQ-VAE and the upsampling loss of the neural upsampler; and
   explore and manipulate the discrete latent space learned by the VQ-VAE to generate new or modified data using techniques comprising interpolation, extrapolation, and vector arithmetic.

2. The system of claim 1, wherein the input data comprises financial time-series data, the financial time-series data comprising stock prices, economic indicators, and other relevant data.

3. The system of claim 1, wherein the input data comprises one or more of image data, audio data, video data, sensor data, or text data.

4. The system of claim 1, wherein the joint training allows gradients to flow from the neural upsampler back to the VQ-VAE, enabling end-to-end training of the entire system.

5. The system of claim 1, wherein the joint loss function takes into account both compression efficiency and reconstruction quality.

6. The system of claim 1, wherein the VQ-VAE encoder comprises one or more convolutional layers, one or more pooling layers, and one or more fully connected layers.

7. The system of claim 1, wherein the VQ-VAE decoder comprises one or more transposed convolutional layers, one or more upsampling layers, and one or more fully connected layers.

8. The system of claim 1, wherein the neural upsampler comprises one or more convolutional layers, one or more residual blocks, and one or more attention mechanisms.

9. The system of claim 1, wherein the discrete latent space is learned using a vector quantization technique that maps the continuous latent representations to a finite set of discrete codes.

10. The system of claim 1, wherein the system further comprises a data preprocessing module for normalizing, scaling, and transforming the input data before compression.

11. A method for upsampling compressed data using a jointly trained vector quantized variational autoencoder (VQ-VAE) neural upsampler, comprising the steps of:
    compressing input data into a discrete latent representation using a VQ-VAE encoder;
    storing the compressed representation in a discrete latent space;
    reconstructing the compressed data from the latent representation using a VQ-VAE decoder;
    enhancing the reconstructed data using a neural upsampler to recover information lost during compression;
    jointly training the VQ-VAE and neural upsampler by iteratively updating their parameters based on a joint loss function that combines the reconstruction loss of the VQ-VAE and the upsampling loss of the neural upsampler; and
    exploring and manipulating the discrete latent space learned by the VQ-VAE to generate new or modified data using techniques comprising interpolation, extrapolation, and vector arithmetic.

12. The method of claim 11, wherein the input data comprises financial time-series data, the financial time-series data comprising stock prices, economic indicators, and other relevant data.

13. The method of claim 11, wherein the input data comprises one or more of image data, audio data, video data, sensor data, or text data.

14. The method of claim 11, wherein the joint training allows gradients to flow from the neural upsampler back to the VQ-VAE, enabling end-to-end training of the entire system.

15. The method of claim 11, wherein the joint loss function takes into account both compression efficiency and reconstruction quality.

16. The method of claim 11, wherein the VQ-VAE encoder comprises one or more convolutional layers, one or more pooling layers, and one or more fully connected layers.

17. The method of claim 11, wherein the VQ-VAE decoder comprises one or more transposed convolutional layers, one or more upsampling layers, and one or more fully connected layers.

18. The method of claim 11, wherein the neural upsampler comprises one or more convolutional layers, one or more residual blocks, and one or more attention mechanisms.

19. The method of claim 11, wherein the discrete latent space is learned using a vector quantization technique that maps the continuous latent representations to a finite set of discrete codes.

20. The method of claim 11, further comprising the step of normalizing, scaling, and transforming the input data before compression.

* * * * *